(12) United States Patent
Hendricks et al.

(10) Patent No.: US 7,865,567 B1
(45) Date of Patent: Jan. 4, 2011

(54) VIRTUAL ON-DEMAND ELECTRONIC BOOK

(75) Inventors: John S. Hendricks, Potomac, MD (US); John S. McCoskey, Castle Rock, CO (US)

(73) Assignee: Discovery Patent Holdings, LLC, Silver Spring, MD (US)

( * ) Notice: Subject to any disclaimer, the term of this patent is extended or adjusted under 35 U.S.C. 154(b) by 0 days.

(21) Appl. No.: 09/427,938

(22) Filed: Oct. 27, 1999

Related U.S. Application Data

(63) Continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927, and a continuation-in-part of application No. 08/906,469, filed on Aug. 5, 1997, now Pat. No. 6,408,437, which is a continuation of application No. 08/160,281, filed on Dec. 2, 1993, now Pat. No. 5,798,785, which is a continuation of application No. 09/237,828, filed on Jan. 27, 1999, which is a continuation of application No. 09/237,827, filed on Jan. 27, 1999, which is a continuation of application No. 09/289,958, filed on Apr. 13, 1999, which is a continuation of application No. 09/289,957, filed on Apr. 13, 1999, which is a continuation of application No. 09/289,956, filed on Apr. 13, 1999.

(51) Int. Cl.
*G06F 15/167* (2006.01)

(52) U.S. Cl. ........................................ 709/214; 709/219

(58) Field of Classification Search ................. 709/206, 709/214, 217–219; 710/54; 705/26
See application file for complete search history.

(56) References Cited

U.S. PATENT DOCUMENTS 3,860,873 A  1/1975  Ringstad
(Continued)

FOREIGN PATENT DOCUMENTS

CA   2044574   12/1992
(Continued)

OTHER PUBLICATIONS

Soloviev, Valery; ("Prefetching in segmented disck cache for multi-disk systems") Proceedings of the fourth workshop on I/O in parallel and distributed systems: part of the federated computing research conference; May 1996.*

(Continued)

*Primary Examiner*—Patrice Winder
(74) *Attorney, Agent, or Firm*—Arent Fox LLP

(57) ABSTRACT

An electronic book selection and delivery system distributes text to subscribers. The system provides for on-demand and virtual on-demand delivery of electronic books. Specified electronic books may be broadcast to a set of subscribers. Alternatively, a first section of the specified electronic books may be broadcast. A second section of each of the electronic books is then available for later delivery, upon order by a subscriber. The second sections, as well as first sections, and true on-demand electronic books may be loaded into one or more queues. The queues may then be emptied based on a priority model. Electronic books in an on-demand queue may be given priority for delivery over electronic books in other queues.

15 Claims, 53 Drawing Sheets

U.S. PATENT DOCUMENTS

| | | | |
|---|---|---|---|
| 3,869,873 A | 3/1975 | Thomas | |
| 3,891,792 A | 6/1975 | Kimura | |
| 3,978,470 A | 8/1976 | McGuire | |
| 4,023,408 A | 5/1977 | Ryan et al. | |
| 4,071,697 A | 1/1978 | Bushnell et al. | |
| 4,159,417 A | 6/1979 | Rubincam | |
| 4,160,242 A | 7/1979 | Fowler | |
| 4,179,212 A | 12/1979 | Lahr | |
| 4,197,590 A | 4/1980 | Sukonick et al. | |
| 4,251,671 A | 2/1981 | Alter et al. | |
| 4,272,819 A * | 6/1981 | Katsumata et al. | 710/22 |
| 4,298,793 A | 11/1981 | Melis et al. | |
| 4,302,193 A | 11/1981 | Haynes | |
| 4,361,848 A | 11/1982 | Poigner et al. | |
| 4,381,522 A | 4/1983 | Lambert | 348/143 |
| 4,398,216 A | 8/1983 | Field et al. | |
| 4,405,829 A | 9/1983 | Rivest et al. | |
| 4,406,626 A | 9/1983 | Anderson et al. | |
| 4,429,385 A | 1/1984 | Cichelli et al. | |
| 4,455,570 A | 6/1984 | Saeki et al. | |
| 4,484,217 A | 11/1984 | Block et al. | |
| 4,488,179 A | 12/1984 | Kruger et al. | |
| 4,513,390 A | 4/1985 | Walter et al. | |
| 4,517,598 A | 5/1985 | Van Valkenburg et al. | |
| 4,528,589 A | 7/1985 | Block et al. | |
| 4,528,643 A | 7/1985 | Freeny, Jr. | |
| 4,532,540 A | 7/1985 | Wine | |
| 4,533,948 A | 8/1985 | McNamara et al. | |
| 4,546,382 A | 10/1985 | McKenna et al. | |
| 4,567,512 A | 1/1986 | Abraham | |
| 4,578,531 A | 3/1986 | Everhart et al. | |
| 4,579,533 A | 4/1986 | Anderson et al. | |
| 4,587,520 A | 5/1986 | Astle | |
| 4,602,279 A | 7/1986 | Freeman et al. | |
| 4,604,710 A | 8/1986 | Amezcua et al. | |
| 4,605,964 A | 8/1986 | Chard | |
| 4,613,901 A | 9/1986 | Gilhousen et al. | |
| 4,616,263 A | 10/1986 | Eichelberger | |
| 4,621,282 A | 11/1986 | Ahern | |
| 4,625,076 A | 11/1986 | Okamoto et al. | |
| 4,625,235 A | 11/1986 | Watson | |
| 4,633,462 A | 12/1986 | Stifle et al. | |
| 4,639,225 A | 1/1987 | Washizuka | |
| 4,644,470 A | 2/1987 | Feigenbaum et al. | |
| 4,653,100 A | 3/1987 | Barnett et al. | |
| 4,668,218 A | 5/1987 | Virtanen | |
| 4,668,246 A | 5/1987 | Wollenberg | |
| 4,673,976 A | 6/1987 | Wreford-Howard | |
| 4,688,218 A | 8/1987 | Blineau et al. | |
| 4,688,245 A | 8/1987 | Schenk | |
| 4,688,246 A | 8/1987 | Eilers et al. | |
| 4,691,109 A | 9/1987 | Magee et al. | |
| 4,694,483 A * | 9/1987 | Cheung | 379/265.06 |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,716,543 A | 12/1987 | Ogawa et al. | |
| 4,724,491 A | 2/1988 | Lambert | |
| 4,731,840 A | 3/1988 | Mniszewski et al. | |
| 4,739,510 A | 4/1988 | Jeffers et al. | |
| 4,742,543 A | 5/1988 | Frederiksen | |
| 4,751,578 A | 6/1988 | Reiter et al. | |
| 4,768,087 A | 8/1988 | Taub et al. | |
| 4,774,655 A | 9/1988 | Kollin et al. | |
| 4,776,011 A | 10/1988 | Busby | |
| 4,792,972 A | 12/1988 | Cook, Jr. | |
| 4,796,220 A | 1/1989 | Wolfe | |
| 4,805,014 A | 2/1989 | Sahara et al. | |
| 4,816,901 A | 3/1989 | Music et al. | |
| 4,816,904 A | 3/1989 | McKenna et al. | |
| 4,820,167 A | 4/1989 | Nobles et al. | |
| D301,037 S | 5/1989 | Matsuda | |
| 4,829,372 A | 5/1989 | McCalley et al. | |
| 4,829,558 A | 5/1989 | Welsh | |
| 4,829,569 A | 5/1989 | Seth-Smith et al. | |
| 4,835,607 A | 5/1989 | Keith | |
| 4,854,878 A | 8/1989 | Malvino | |
| 4,855,725 A * | 8/1989 | Fernandez | 345/173 |
| 4,860,379 A | 8/1989 | Schoenberger et al. | |
| 4,866,770 A | 9/1989 | Seth-Smith | |
| 4,868,866 A | 9/1989 | Williams, Jr. | |
| 4,876,736 A | 10/1989 | Kiewit | |
| 4,885,803 A | 12/1989 | Hermann et al. | |
| 4,890,319 A | 12/1989 | Seth-Smith et al. | |
| 4,890,321 A | 12/1989 | Seth-Smith | |
| 4,891,838 A | 1/1990 | Faber | |
| 4,899,292 A | 2/1990 | Montagna | |
| 4,920,432 A | 4/1990 | Eggers et al. | |
| 4,924,513 A | 5/1990 | Herbison et al. | |
| 4,928,168 A | 5/1990 | Iwashita | |
| 4,928,177 A | 5/1990 | Martinez | |
| 4,930,160 A | 5/1990 | Vogel | |
| 4,941,089 A | 7/1990 | Fischer | |
| 4,941,125 A | 7/1990 | Boyne | |
| 4,947,244 A | 8/1990 | Fenwick et al. | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,819 A | 10/1990 | Kannes | |
| 4,965,825 A | 10/1990 | Harvey et al. | |
| 4,975,951 A | 12/1990 | Bennett | |
| 4,977,455 A | 12/1990 | Young | |
| 4,982,344 A | 1/1991 | Jordan | |
| 4,985,697 A | 1/1991 | Boulton | 707/500.1 |
| D314,383 S | 2/1991 | Hafner | |
| 4,995,078 A | 2/1991 | Monslow et al. | |
| 4,996,597 A | 2/1991 | Duffield | |
| 4,997,455 A | 3/1991 | Herbstman et al. | |
| 5,001,554 A | 3/1991 | Johnson et al. | |
| 5,003,384 A * | 3/1991 | Durden et al. | 725/104 |
| 5,003,591 A | 3/1991 | Kauffman et al. | |
| 5,010,499 A | 4/1991 | Yee | |
| 5,014,125 A | 5/1991 | Pocock et al. | 725/93 |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,862 A | 9/1991 | Dao | |
| 5,049,990 A | 9/1991 | Kondo et al. | |
| 5,054,984 A | 10/1991 | Chan et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,089,956 A | 2/1992 | MacPhail | |
| 5,091,782 A | 2/1992 | Krause et al. | |
| 5,093,718 A | 3/1992 | Hoarty et al. | 725/120 |
| 5,099,319 A | 3/1992 | Esch et al. | |
| 5,099,331 A | 3/1992 | Truong | |
| D325,581 S | 4/1992 | Schwartz | |
| 5,103,314 A | 4/1992 | Keenan | |
| 5,104,125 A | 4/1992 | Wilson | |
| 5,105,268 A | 4/1992 | Yamanouchi et al. | |
| D326,446 S | 5/1992 | Wong | |
| 5,115,426 A | 5/1992 | Spanke | |

| Patent | Date | Name |
|---|---|---|
| 5,121,476 A | 6/1992 | Yee |
| 5,124,980 A | 6/1992 | Maki |
| 5,128,662 A | 7/1992 | Failla |
| 5,130,792 A | 7/1992 | Tindell et al. |
| 5,130,924 A | 7/1992 | Barker et al. |
| 5,132,789 A | 7/1992 | Ammon et al. |
| 5,132,992 A | 7/1992 | Yurt et al. |
| 5,133,079 A | 7/1992 | Ballantyne et al. |
| 5,140,419 A | 8/1992 | Galumbeck et al. |
| D329,238 S | 9/1992 | Grasso et al. |
| 5,144,663 A | 9/1992 | Kudelski et al. ............ 380/230 |
| 5,144,665 A | 9/1992 | Takaragi et al. |
| 5,146,552 A | 9/1992 | Cassorla et al. |
| 5,146,600 A | 9/1992 | Sugiura |
| 5,150,118 A | 9/1992 | Finkle |
| 5,151,782 A | 9/1992 | Ferraro |
| 5,151,789 A | 9/1992 | Young |
| 5,152,011 A | 9/1992 | Schwob |
| 5,155,590 A | 10/1992 | Beyers, II et al. |
| 5,155,591 A | 10/1992 | Wachob |
| 5,157,783 A | 10/1992 | Anderson |
| 5,159,452 A | 10/1992 | Kinoshita et al. |
| 5,159,669 A | 10/1992 | Trigg et al. |
| 5,166,886 A | 11/1992 | Molnar et al. |
| D331,760 S | 12/1992 | Renk, Jr. |
| 5,172,413 A | 12/1992 | Bradley et al. |
| 5,173,051 A | 12/1992 | May et al. |
| 5,182,639 A | 1/1993 | Jutamulia et al. |
| 5,185,667 A | 2/1993 | Zimmermann et al. |
| 5,195,181 A | 3/1993 | Bryant et al. |
| 5,199,104 A | 3/1993 | Hirayama |
| 5,202,129 A | 4/1993 | Samejima et al. |
| 5,202,817 A | 4/1993 | Koenck et al. |
| 5,204,947 A | 4/1993 | Bernstein et al. |
| 5,206,722 A | 4/1993 | Kwan |
| 5,206,929 A | 4/1993 | Langford et al. ............ 345/723 |
| 5,206,954 A | 4/1993 | Inoue et al. |
| 5,208,665 A | 5/1993 | McCalley et al. |
| 5,208,745 A | 5/1993 | Quentin et al. |
| 5,210,611 A | 5/1993 | Yee et al. |
| 5,212,553 A | 5/1993 | Maruoka |
| 5,216,515 A | 6/1993 | Steele et al. |
| 5,220,438 A | 6/1993 | Yamamoto |
| 5,220,649 A | 6/1993 | Forcier |
| 5,221,962 A | 6/1993 | Backus et al. |
| 5,222,136 A | 6/1993 | Rasmussen et al. |
| 5,223,924 A | 6/1993 | Strubbe |
| 5,231,631 A * | 7/1993 | Buhrke et al. ............... 370/230 |
| 5,233,333 A | 8/1993 | Borsuk |
| 5,235,419 A | 8/1993 | Krause et al. |
| 5,235,619 A | 8/1993 | Beyers et al. |
| 5,235,680 A | 8/1993 | Bijnagte |
| 5,237,311 A | 8/1993 | Mailey et al. |
| 5,237,610 A | 8/1993 | Gammie et al. |
| 5,237,614 A | 8/1993 | Weiss |
| 5,239,665 A * | 8/1993 | Tsuchiya .................... 715/776 |
| 5,241,671 A | 8/1993 | Reed et al. |
| 5,242,770 A | 9/1993 | Chen et al. |
| 5,247,347 A | 9/1993 | Litteral et al. |
| 5,247,575 A | 9/1993 | Sprague et al. |
| 5,251,324 A | 10/1993 | McMullan |
| 5,253,066 A | 10/1993 | Vogel |
| 5,253,275 A | 10/1993 | Yurt et al. |
| 5,253,341 A | 10/1993 | Rozmanith et al. |
| 5,256,067 A | 10/1993 | Gildea |
| 5,257,185 A | 10/1993 | Farley et al. |
| 5,260,778 A | 11/1993 | Kauffman et al. |
| 5,260,788 A | 11/1993 | Takano et al. |
| 5,262,875 A | 11/1993 | Mincer et al. |
| 5,282,028 A | 1/1994 | Johnson et al. |
| 5,282,206 A | 1/1994 | Ishihara et al. |
| 5,283,639 A | 2/1994 | Esch et al. |
| 5,285,272 A | 2/1994 | Bradley et al. |
| 5,289,271 A | 2/1994 | Watson |
| 5,289,288 A | 2/1994 | Silverman et al. |
| 5,291,554 A | 3/1994 | Morales |
| 5,293,540 A | 3/1994 | Trani et al. |
| 5,293,633 A | 3/1994 | Robbins |
| 5,301,172 A | 4/1994 | Richards et al. |
| D346,620 S | 5/1994 | McSorley |
| 5,315,711 A | 5/1994 | Barone et al. |
| 5,318,450 A | 6/1994 | Carver |
| 5,319,454 A | 6/1994 | Schutte |
| 5,319,455 A | 6/1994 | Hoarty et al. ................. 725/34 |
| 5,319,542 A | 6/1994 | King et al. |
| 5,319,649 A | 6/1994 | Raghavan et al. |
| 5,319,707 A | 6/1994 | Wasilewski et al. |
| 5,321,846 A | 6/1994 | Yokota et al. |
| 5,323,240 A | 6/1994 | Amano et al. |
| 5,327,554 A | 7/1994 | Palazzi, III et al. |
| 5,329,590 A | 7/1994 | Pond |
| D349,923 S | 8/1994 | Billings et al. |
| 5,339,091 A | 8/1994 | Yamazaki et al. |
| 5,339,239 A | 8/1994 | Manabe et al. |
| 5,339,315 A | 8/1994 | Maeda et al. |
| 5,341,166 A | 8/1994 | Garr et al. |
| 5,341,425 A | 8/1994 | Wasilewski et al. |
| 5,341,426 A | 8/1994 | Barney et al. |
| 5,341,474 A | 8/1994 | Gelman et al. |
| 5,343,239 A | 8/1994 | Lappington |
| 5,343,516 A | 8/1994 | Callele et al. |
| 5,345,580 A * | 9/1994 | Tamaru et al. ................ 703/28 |
| 5,345,594 A | 9/1994 | Tsuda |
| 5,349,638 A | 9/1994 | Pitroda et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,365,265 A | 11/1994 | Shibata et al. |
| 5,365,434 A | 11/1994 | Figliuzzi |
| 5,367,330 A | 11/1994 | Haave et al. |
| 5,367,571 A | 11/1994 | Bowen et al. |
| 5,367,621 A | 11/1994 | Cohen et al. |
| 5,367,643 A * | 11/1994 | Chang et al. .................. 710/62 |
| 5,371,532 A | 12/1994 | Gelman et al. |
| 5,372,507 A | 12/1994 | Goleh |
| 5,373,324 A | 12/1994 | Kuroda et al. |
| 5,375,068 A | 12/1994 | Palmer et al. |
| 5,375,160 A | 12/1994 | Guidon et al. |
| 5,379,057 A | 1/1995 | Clough et al. |
| 5,383,112 A | 1/1995 | Clark |
| 5,384,588 A | 1/1995 | Martin et al. |
| 5,388,101 A | 2/1995 | Dinkins |
| 5,388,196 A | 2/1995 | Pajak et al. |
| 5,390,348 A | 2/1995 | Magin et al. |
| 5,392,387 A | 2/1995 | Fitzpatrick |
| 5,396,546 A | 3/1995 | Remillard ................. 379/93.24 |
| 5,400,401 A | 3/1995 | Wasilewski et al. |
| 5,404,393 A | 4/1995 | Remillard ................. 379/93.25 |
| 5,404,505 A * | 4/1995 | Levinson ..................... 707/10 |
| 5,407,357 A | 4/1995 | Cutler |
| 5,408,258 A | 4/1995 | Kolessar |
| 5,408,465 A * | 4/1995 | Gusella et al. .............. 370/231 |
| 5,410,326 A | 4/1995 | Goldstein |
| 5,410,344 A | 4/1995 | Graves et al. |
| 5,412,416 A | 5/1995 | Nemirofsky |
| 5,414,426 A | 5/1995 | O'Donnell et al. |
| 5,416,508 A | 5/1995 | Sakuma et al. |
| 5,417,575 A | 5/1995 | McTaggart |
| 5,418,559 A | 5/1995 | Blahut |
| 5,418,957 A | 5/1995 | Narayan |
| 5,420,474 A | 5/1995 | Schmitt, Jr. et al. |
| 5,420,974 A | 5/1995 | Morris et al. |
| 5,424,770 A | 6/1995 | Schmelzer et al. |
| 5,425,102 A | 6/1995 | Moy |
| 5,426,594 A | 6/1995 | Wright et al. |

| | | | |
|---|---|---|---|
| 5,428,529 A | 6/1995 | Hartrick et al. | |
| 5,432,542 A | 7/1995 | Thibadeau et al. | |
| 5,432,561 A | 7/1995 | Strubbe | |
| 5,437,552 A | 8/1995 | Baer et al. | |
| 5,438,372 A | 8/1995 | Tsumori et al. | 348/565 |
| 5,440,632 A | 8/1995 | Bacon et al. | |
| 5,442,390 A | 8/1995 | Hooper et al. | |
| 5,442,626 A | 8/1995 | Wei | |
| 5,444,853 A * | 8/1995 | Lentz | 711/123 |
| 5,446,488 A | 8/1995 | Vogel | |
| 5,446,490 A | 8/1995 | Blahut et al. | 725/97 |
| 5,446,919 A | 8/1995 | Wilkins | |
| D362,429 S | 9/1995 | Lande et al. | |
| 5,453,796 A | 9/1995 | Duffield | |
| 5,459,507 A | 10/1995 | Sakuma et al. | |
| 5,461,667 A | 10/1995 | Remillard | |
| 5,465,213 A | 11/1995 | Ross | |
| 5,465,401 A | 11/1995 | Thompson | |
| 5,466,158 A | 11/1995 | Smith, III | |
| 5,467,102 A | 11/1995 | Kuno et al. | |
| 5,469,206 A | 11/1995 | Strubbe et al. | |
| 5,473,362 A | 12/1995 | Fitzgerald et al. | |
| 5,475,398 A | 12/1995 | Yamazaki et al. | |
| 5,475,399 A | 12/1995 | Borsuk | |
| 5,475,585 A | 12/1995 | Bush | |
| 5,475,682 A * | 12/1995 | Choudhury et al. | 370/229 |
| 5,477,262 A | 12/1995 | Banker et al. | 725/38 |
| 5,477,263 A | 12/1995 | O'Callaghan et al. | |
| 5,479,268 A | 12/1995 | Young et al. | 386/83 |
| 5,479,508 A | 12/1995 | Bestler et al. | |
| 5,479,615 A * | 12/1995 | Ishii et al. | 710/54 |
| 5,481,294 A | 1/1996 | Thomas et al. | |
| 5,481,296 A | 1/1996 | Cragun et al. | 725/136 |
| 5,481,542 A | 1/1996 | Logston | |
| 5,483,278 A | 1/1996 | Strubbe et al. | |
| 5,484,292 A | 1/1996 | McTaggart | |
| 5,485,176 A | 1/1996 | Ohara | |
| 5,485,221 A | 1/1996 | Banker et al. | |
| 5,486,686 A | 1/1996 | Zdybel, Jr. et al. | |
| 5,495,581 A | 2/1996 | Tsai | |
| 5,497,187 A | 3/1996 | Banker et al. | |
| 5,497,459 A * | 3/1996 | Tanihira et al. | 714/30 |
| 5,499,330 A | 3/1996 | Lucas et al. | |
| 5,500,794 A | 3/1996 | Fujita et al. | 700/83 |
| 5,502,576 A | 3/1996 | Ramsay et al. | |
| 5,506,902 A | 4/1996 | Kubota | |
| 5,509,074 A | 4/1996 | Choudhury et al. | |
| 5,512,934 A | 4/1996 | Kochanski | |
| 5,515,098 A | 5/1996 | Carles | |
| 5,517,254 A | 5/1996 | Monta et al. | |
| 5,519,780 A | 5/1996 | Woo et al. | |
| 5,521,631 A | 5/1996 | Budow et al. | |
| 5,524,193 A | 6/1996 | Covington et al. | |
| 5,524,201 A | 6/1996 | Shwarts et al. | |
| 5,526,035 A | 6/1996 | Lappington et al. | |
| 5,526,469 A | 6/1996 | Brindle et al. | |
| 5,528,281 A * | 6/1996 | Grady et al. | 725/93 |
| 5,528,490 A | 6/1996 | Hill | |
| 5,530,235 A | 6/1996 | Stefik | |
| 5,531,227 A | 7/1996 | Schneider | |
| 5,531,600 A | 7/1996 | Baer | |
| 5,532,920 A * | 7/1996 | Hartrick et al. | 715/500 |
| 5,534,888 A | 7/1996 | Lebby et al. | |
| 5,538,430 A | 7/1996 | Smith | |
| 5,544,320 A | 8/1996 | Konrad | |
| 5,544,342 A * | 8/1996 | Dean | 711/119 |
| 5,550,863 A | 8/1996 | Yurt et al. | |
| 5,553,216 A | 9/1996 | Yoshioka et al. | |
| 5,555,441 A * | 9/1996 | Haddad | 725/93 |
| 5,557,722 A | 9/1996 | DeRose et al. | |
| 5,557,744 A * | 9/1996 | Kobayakawa et al. | 709/232 |
| 5,561,708 A | 10/1996 | Remillard | |
| 5,561,803 A * | 10/1996 | Kilis | 717/159 |
| 5,564,043 A | 10/1996 | Siefert | |
| 5,565,908 A | 10/1996 | Ahmad | |
| 5,565,999 A | 10/1996 | Takahashi | |
| 5,570,126 A | 10/1996 | Blahut et al. | 725/93 |
| 5,572,625 A | 11/1996 | Raman et al. | |
| 5,572,652 A | 11/1996 | Robusto | |
| 5,579,055 A | 11/1996 | Hamilton et al. | |
| 5,579,057 A | 11/1996 | Banker et al. | |
| 5,581,560 A | 12/1996 | Shimada et al. | |
| 5,581,686 A | 12/1996 | Koppolu et al. | |
| 5,585,858 A | 12/1996 | Harper et al. | |
| 5,586,235 A | 12/1996 | Kauffman et al. | |
| 5,587,724 A | 12/1996 | Matsuda | |
| 5,596,697 A | 1/1997 | Foster et al. | |
| 5,598,209 A | 1/1997 | Cortjens et al. | |
| 5,598,279 A * | 1/1997 | Ishii et al. | 358/402 |
| 5,598,351 A | 1/1997 | Chater et al. | |
| 5,598,523 A | 1/1997 | Fujita | |
| 5,600,368 A | 2/1997 | Matthews, III | 348/143 |
| 5,600,573 A | 2/1997 | Hendricks et al. | |
| 5,602,596 A | 2/1997 | Claussen et al. | |
| 5,604,824 A | 2/1997 | Chui et al. | |
| 5,608,449 A | 3/1997 | Swafford et al. | |
| 5,613,109 A | 3/1997 | Yamauchi et al. | |
| 5,621,456 A | 4/1997 | Florin et al. | |
| 5,621,658 A | 4/1997 | Jackson et al. | |
| 5,624,265 A | 4/1997 | Redford et al. | |
| 5,625,833 A | 4/1997 | Levine et al. | |
| 5,630,103 A | 5/1997 | Smith et al. | |
| 5,630,125 A | 5/1997 | Zellweger | |
| 5,631,693 A | 5/1997 | Wunderlich et al. | |
| 5,631,694 A | 5/1997 | Aggarwal et al. | |
| 5,632,022 A | 5/1997 | Warren et al. | |
| 5,634,064 A | 5/1997 | Warnock et al. | |
| 5,635,918 A | 6/1997 | Tett | |
| 5,636,036 A | 6/1997 | Ashbey | |
| 5,638,443 A | 6/1997 | Stefik | |
| 5,640,193 A | 6/1997 | Wellner | |
| 5,640,196 A | 6/1997 | Behrens et al. | |
| 5,644,354 A | 7/1997 | Thompson et al. | 725/138 |
| 5,646,675 A | 7/1997 | Copriviza et al. | |
| 5,649,230 A * | 7/1997 | Lentz | 710/52 |
| 5,657,414 A | 8/1997 | Lett et al. | |
| 5,661,516 A | 8/1997 | Carles | |
| 5,663,748 A | 9/1997 | Huffman | |
| 5,663,757 A | 9/1997 | Morales | 725/5 |
| 5,666,493 A | 9/1997 | Wojcik et al. | |
| 5,682,206 A | 10/1997 | Wehmeyer | |
| 5,689,641 A | 11/1997 | Ludwig et al. | |
| 5,689,648 A | 11/1997 | Diaz et al. | |
| 5,689,663 A | 11/1997 | Williams | |
| 5,691,777 A | 11/1997 | Kassatly | |
| 5,696,906 A | 12/1997 | Peters et al. | |
| 5,696,982 A | 12/1997 | Tanigawa et al. | |
| 5,697,793 A | 12/1997 | Huffman et al. | |
| 5,708,960 A | 1/1998 | Kamisaka | |
| 5,710,887 A | 1/1998 | Chelliah et al. | |
| 5,715,314 A | 2/1998 | Payne et al. | |
| 5,715,515 A | 2/1998 | Akins, III | |
| 5,721,832 A | 2/1998 | Westrope et al. | |
| 5,721,908 A | 2/1998 | Lagarde et al. | |
| 5,721,956 A | 2/1998 | Martin et al. | |
| 5,722,418 A | 3/1998 | Bro | |
| 5,724,091 A | 3/1998 | Freeman et al. | 725/138 |
| 5,724,521 A | 3/1998 | Dedrick | |
| 5,726,909 A | 3/1998 | Krikorian | |
| 5,727,065 A | 3/1998 | Dillon | |
| 5,734,719 A * | 3/1998 | Tsevdos et al. | 700/234 |
| 5,734,823 A | 3/1998 | Saigh et al. | |
| 5,734,891 A | 3/1998 | Saigh | |
| 5,737,725 A | 4/1998 | Case | |
| 5,737,747 A * | 4/1998 | Vishlitzky et al. | 711/118 |
| 5,739,814 A | 4/1998 | Ohara et al. | |

| Patent | Date | Inventor(s) |
|---|---|---|
| 5,740,549 A | 4/1998 | Reily et al. |
| 5,742,680 A | 4/1998 | Wilson |
| 5,745,711 A | 4/1998 | Kitahara et al. |
| 5,748,441 A | 5/1998 | Loritz et al. |
| 5,749,735 A | 5/1998 | Redford |
| 5,754,172 A | 5/1998 | Kubota et al. |
| 5,758,257 A | 5/1998 | Herz et al. |
| 5,760,771 A | 6/1998 | Blonder |
| 5,761,468 A * | 6/1998 | Emberson .................. 712/207 |
| 5,761,485 A | 6/1998 | Munyan ..................... 345/839 |
| 5,761,606 A | 6/1998 | Wolzien |
| 5,761,681 A | 6/1998 | Huffman |
| 5,764,276 A | 6/1998 | Martin et al. |
| 5,767,896 A | 6/1998 | Nemirofsky |
| 5,768,521 A | 6/1998 | Dedrick |
| 5,771,354 A | 6/1998 | Crawford |
| 5,774,109 A | 6/1998 | Winksy et al. |
| 5,774,170 A | 6/1998 | Hite et al. |
| 5,778,374 A | 7/1998 | Dang et al. |
| 5,784,565 A | 7/1998 | Lewine |
| 5,786,521 A | 7/1998 | Darsow |
| 5,787,171 A | 7/1998 | Kubota et al. |
| 5,787,254 A | 7/1998 | Maddalozzo et al. |
| 5,788,504 A | 8/1998 | Rice et al. |
| 5,790,176 A * | 8/1998 | Craig ......................... 725/115 |
| 5,790,935 A * | 8/1998 | Payton ........................ 725/91 |
| 5,793,414 A | 8/1998 | Shaffer ....................... 725/133 |
| 5,796,954 A | 8/1998 | Hanif |
| 5,798,785 A * | 8/1998 | Hendricks et al. ............. 725/46 |
| 5,799,071 A | 8/1998 | Azar et al. |
| 5,799,157 A | 8/1998 | Escallon ...................... 705/27 |
| 5,802,465 A | 9/1998 | Hamalainen et al. |
| 5,802,526 A | 9/1998 | Fawcett et al. |
| 5,805,204 A | 9/1998 | Thompson et al. |
| 5,815,662 A | 9/1998 | Ong |
| 5,815,671 A | 9/1998 | Morrison |
| 5,819,301 A | 10/1998 | Rowe et al. |
| 5,835,732 A | 11/1998 | Kikinis et al. |
| 5,844,600 A | 12/1998 | Kerr |
| 5,844,890 A | 12/1998 | Delp et al. |
| 5,850,218 A | 12/1998 | LaJoie et al. |
| 5,850,520 A | 12/1998 | Griebenow et al. |
| 5,850,629 A | 12/1998 | Holm et al. |
| 5,859,594 A | 1/1999 | King et al. |
| 5,862,325 A | 1/1999 | Reed et al. |
| 5,862,329 A | 1/1999 | Aras et al. |
| 5,864,823 A | 1/1999 | Levitan |
| 5,870,717 A | 2/1999 | Wiecha |
| 5,870,767 A | 2/1999 | Kraft, IV |
| 5,877,755 A | 3/1999 | Hellhake |
| 5,877,801 A | 3/1999 | Martin et al. |
| 5,881,269 A * | 3/1999 | Dobbelstein ................. 703/21 |
| 5,884,288 A | 3/1999 | Chang |
| 5,887,801 A | 3/1999 | Stevens |
| 5,890,122 A | 3/1999 | Van Kleeck et al. |
| 5,890,177 A | 3/1999 | Moody et al. |
| 5,892,900 A | 4/1999 | Ginter et al. |
| 5,892,915 A * | 4/1999 | Duso et al. .................. 709/219 |
| 5,893,109 A | 4/1999 | DeRose et al. |
| 5,893,132 A | 4/1999 | Huffman et al. |
| 5,898,852 A * | 4/1999 | Petolino et al. ............. 712/214 |
| 5,903,319 A | 5/1999 | Busko et al. |
| 5,903,652 A | 5/1999 | Mital |
| 5,903,901 A * | 5/1999 | Kawakura et al. ........ 715/501.1 |
| 5,906,397 A | 5/1999 | MacWilliams |
| 5,914,706 A | 6/1999 | Kono |
| 5,917,543 A | 6/1999 | Uehara |
| 5,917,915 A | 6/1999 | Hirose |
| 5,918,213 A | 6/1999 | Bernard et al. |
| 5,923,656 A * | 7/1999 | Duan et al. ............... 370/395.4 |
| 5,926,624 A * | 7/1999 | Katz et al. .................. 709/217 |
| 5,929,848 A | 7/1999 | Albukerk et al. |
| 5,930,768 A | 7/1999 | Hooban |
| 5,933,498 A | 8/1999 | Schneck et al. |
| 5,937,162 A | 8/1999 | Funk et al. |
| 5,940,073 A | 8/1999 | Klosterman et al. ......... 345/721 |
| 5,956,034 A | 9/1999 | Sachs et al. |
| 5,956,483 A | 9/1999 | Grate et al. |
| 5,957,695 A | 9/1999 | Redford et al. |
| 5,957,697 A | 9/1999 | Iggulden et al. |
| 5,959,945 A | 9/1999 | Kleiman |
| 5,963,246 A | 10/1999 | Kato |
| 5,978,841 A * | 11/1999 | Berger ........................ 709/217 |
| 5,986,677 A * | 11/1999 | Jones et al. .................. 345/531 |
| 5,986,690 A * | 11/1999 | Hendricks .................... 725/60 |
| 5,990,927 A * | 11/1999 | Hendricks et al. ........... 725/132 |
| 5,991,594 A | 11/1999 | Froeber |
| 5,999,214 A | 12/1999 | Inagaki |
| 6,009,401 A | 12/1999 | Horstmann |
| 6,012,890 A | 1/2000 | Celorio |
| 6,014,184 A | 1/2000 | Knee et al. |
| 6,016,484 A | 1/2000 | Williams et al. |
| 6,025,837 A | 2/2000 | Matthews, III et al. |
| 6,025,871 A | 2/2000 | Kantor et al. |
| 6,029,045 A | 2/2000 | Picco et al. |
| 6,029,141 A | 2/2000 | Bezos et al. |
| 6,029,176 A | 2/2000 | Cannon |
| 6,034,680 A * | 3/2000 | Kessenich et al. ........... 715/733 |
| 6,044,385 A | 3/2000 | Gross et al. |
| 6,052,717 A * | 4/2000 | Reynolds et al. ............ 709/218 |
| 6,055,544 A | 4/2000 | DeRose et al. |
| 6,061,504 A | 5/2000 | Tzelnic et al. |
| 6,072,463 A | 6/2000 | Glaser |
| 6,091,823 A | 7/2000 | Hosomi et al. |
| 6,091,930 A | 7/2000 | Mortimer et al. |
| 6,101,485 A | 8/2000 | Fortenberry et al. |
| 6,112,049 A | 8/2000 | Sonnenfeld |
| 6,115,040 A * | 9/2000 | Bladow et al. ............... 715/741 |
| 6,115,482 A | 9/2000 | Sears et al. |
| 6,132,789 A | 10/2000 | Sprott et al. |
| 6,161,093 A | 12/2000 | Watari et al. |
| 6,163,796 A | 12/2000 | Yokomizo |
| 6,167,435 A | 12/2000 | Druckenmiller et al. |
| 6,173,335 B1 | 1/2001 | Culbert |
| 6,177,936 B1 | 1/2001 | Cragun |
| 6,195,667 B1 | 2/2001 | Duga et al. |
| 6,204,885 B1 | 3/2001 | Kwoh ......................... 348/564 |
| 6,229,694 B1 | 5/2001 | Kono |
| 6,243,071 B1 | 6/2001 | Shwarts et al. |
| 6,249,785 B1 | 6/2001 | Paepke |
| 6,252,876 B1* | 6/2001 | Brueckheimer et al. ...... 370/394 |
| 6,252,879 B1* | 6/2001 | Zhang ........................ 370/401 |
| 3,260,024 A1 | 7/2001 | Shkedy |
| 6,260,024 B1 | 7/2001 | Shkedy |
| 6,269,483 B1 | 7/2001 | Broussard |
| 6,279,017 B1 | 8/2001 | Walker |
| 6,281,986 B1* | 8/2001 | Form .......................... 358/403 |
| 6,295,542 B1 | 9/2001 | Corbin |
| 6,298,441 B1 | 10/2001 | Handelman et al. |
| 6,301,584 B1 | 10/2001 | Ranger |
| 6,313,828 B1 | 11/2001 | Chombo |
| 6,314,474 B1 | 11/2001 | Walter et al. |
| 6,320,591 B1 | 11/2001 | Griencewic |
| 6,331,865 B1 | 12/2001 | Sachs et al. |
| 6,331,867 B1 | 12/2001 | Eberhard et al. |
| 6,334,109 B1 | 12/2001 | Kanevsky et al. |
| 6,335,678 B1 | 1/2002 | Heutschi |
| 6,339,842 B1 | 1/2002 | Sunga Fernandez et al. |
| 6,344,853 B1 | 2/2002 | Knight |
| 6,351,750 B1 | 2/2002 | Duga et al. |
| 6,363,418 B1 | 3/2002 | Conboy et al. |
| 6,385,614 B1 | 5/2002 | Vellandi |
| 6,411,973 B1 | 6/2002 | Yianilos |
| 6,415,316 B1 | 7/2002 | Van Der Meer |
| 6,418,214 B1 | 7/2002 | Smythe et al. |
| 6,438,233 B1 | 8/2002 | Yoshimune et al. |

| | | | | | | |
|---|---|---|---|---|---|---|
| 6,452,614 B1 | 9/2002 | King et al. | | CA | 2458355 | 11/2005 |
| 6,452,933 B1 | 9/2002 | Duffield et al. | | CA | 2458337 | 12/2005 |
| 6,460,036 B1 | 10/2002 | Herz | | CA | 2458317 | 3/2006 |
| 6,462,729 B2 | 10/2002 | Morita | | CA | 2459063 | 3/2006 |
| 6,486,895 B1 | 11/2002 | Robertson | | CA | 2361371 | 7/2006 |
| 6,493,734 B1 | 12/2002 | Sachs et al. | | CA | 2458258 | 10/2006 |
| 6,507,342 B1 | 1/2003 | Hirayama | | CA | 2459048 | 10/2006 |
| 6,510,531 B1 | 1/2003 | Gibbons | | CA | 2458317 | 11/2006 |
| 6,535,505 B1* | 3/2003 | Hwang et al. ............... 370/352 | | CA | 2458355 | 11/2006 |
| 6,546,016 B1 | 4/2003 | Gerszberg et al. | | CA | 2459063 | 12/2006 |
| 6,556,561 B1* | 4/2003 | Himbeault et al. .......... 370/352 | | CA | 2458337 | 1/2007 |
| 6,557,173 B1 | 4/2003 | Hendricks | | CA | 2459059 | 5/2007 |
| 6,585,776 B1 | 7/2003 | Bates et al. | | CA | 2458379 | 6/2007 |
| 6,597,314 B1 | 7/2003 | Beezer | | CA | 2459048 | 6/2007 |
| 6,606,603 B1 | 8/2003 | Joseph | | CA | 2459529 | 6/2007 |
| 6,611,531 B1* | 8/2003 | Chen et al. ................. 370/458 | | CA | 2361371 | 10/2007 |
| 6,634,028 B2 | 10/2003 | Handelman | | CA | 2458307 | 10/2007 |
| 6,639,225 B2 | 10/2003 | Kirschstein et al. | | CA | 2458355 | 11/2007 |
| 6,654,754 B1 | 11/2003 | Knauft et al. | | CA | 2459779 | 11/2007 |
| 6,657,654 B2 | 12/2003 | Narayanaswami | | CA | 2459780 | 11/2007 |
| 6,675,384 B1 | 1/2004 | Block et al. | | CA | 2459059 | 3/2008 |
| 6,683,631 B2 | 1/2004 | Carroll | | CA | 2458317 | 5/2008 |
| 6,714,238 B2 | 3/2004 | Urisaka et al. | | CA | 2459063 | 5/2008 |
| 6,725,203 B1 | 4/2004 | Seet et al. | | CA | 2359690 | 9/2008 |
| 6,813,249 B1* | 11/2004 | Lauffenburger et al. ..... 370/253 | | CA | 2459779 | 1/2009 |
| 6,847,403 B1 | 1/2005 | Forsberg, Jr. et al. | | CA | 2459780 | 1/2009 |
| 6,886,000 B1 | 4/2005 | Aggarwal et al. | | CA | 2385097 | 2/2009 |
| 6,891,551 B2 | 5/2005 | Keely et al. | | CA | 2458307 | 2/2009 |
| 6,976,028 B2 | 12/2005 | Fenton | | CA | 2361371 | 4/2009 |
| 6,990,464 B1 | 1/2006 | Pirillo | | CA | 2369779 | 4/2009 |
| 7,020,663 B2 | 3/2006 | Hay | | CA | 2459059 | 4/2009 |
| 7,039,643 B2 | 5/2006 | Sena et al. | | DE | 3423846 | 1/1986 |
| 7,051,351 B2 | 5/2006 | Goldman et al. | | DE | 3935294 | 4/1991 |
| 7,181,468 B2 | 2/2007 | Spring | | DE | 42 12 184 | 10/1993 |
| 7,181,692 B2 | 2/2007 | Siegel | | EP | 0103438 | 3/1984 |
| 7,185,274 B1 | 2/2007 | Rubin et al. | | EP | 140302 | 5/1985 |
| 7,350,704 B2 | 4/2008 | Barsness | | EP | 0145063 | 6/1985 |
| 7,401,286 B1 | 7/2008 | Hendricks et al. | | EP | 0149536 | 7/1985 |
| 2002/0034296 A1 | 3/2002 | Yoshimune | | EP | 0158548 | 10/1985 |
| 2002/0087555 A1 | 7/2002 | Murata | | EP | 0158767 | 10/1985 |
| 2002/0120635 A1 | 8/2002 | Joao | | EP | 0167237 | 1/1986 |
| 2002/0144133 A1* | 10/2002 | Krasinski et al. ............ 713/189 | | EP | 0243312 | 10/1987 |
| 2003/0018543 A1 | 1/2003 | Alger et al. | | EP | 0277014 | 8/1988 |
| 2003/0093336 A1 | 5/2003 | Ukita et al. | | EP | 0281293 | 9/1988 |
| 2003/0093382 A1 | 5/2003 | Himeno et al. | | EP | 0299830 | 1/1989 |
| 2003/0124502 A1 | 7/2003 | Chou | | EP | 0314572 | 5/1989 |
| 2003/0198932 A1 | 10/2003 | Stuppy | | EP | 0328440 | 8/1989 |
| 2003/0200145 A1 | 10/2003 | Krassner et al. | | EP | 0340643 | 11/1989 |
| 2003/0236836 A1 | 12/2003 | Borthwick | | EP | 0355 697 | 2/1990 |
| 2004/0039934 A1 | 2/2004 | Land et al. | | EP | 0377334 | 7/1990 |
| 2004/0201609 A1 | 10/2004 | Obrador | | EP | 0384986 | 9/1990 |
| 2004/0215658 A1 | 10/2004 | Carnegie et al. | | EP | 0396186 | 11/1990 |
| 2004/0219494 A1 | 11/2004 | Boon | | EP | 0399200 | 11/1990 |
| 2004/0268224 A1 | 12/2004 | Balkus et al. | | EP | 0402 809 | 12/1990 |
| 2005/0144133 A1 | 6/2005 | Hoffman | | EP | 0420 123 | 4/1991 |
| 2006/0204942 A1 | 9/2006 | Kimball | | EP | 0420123 A2 | 4/1991 |
| 2006/0259239 A1 | 11/2006 | Nouri | | EP | 0187 961 | 5/1991 |
| 2007/0016657 A1 | 1/2007 | Ito | | EP | 0424 648 | 5/1991 |
| 2008/0229182 A1 | 9/2008 | Hendricks et al. | | EP | 0425 834 | 5/1991 |
| 2009/0216623 A1 | 8/2009 | Hendricks et al. | | EP | 0450841 | 10/1991 |
| | | | | EP | 0472070 | 2/1992 |
| | FOREIGN PATENT DOCUMENTS | | | EP | 0472070 A2 | 2/1992 |
| | | | | EP | 0506 435 | 9/1992 |
| CA | 2257659 | 11/1993 | | EP | 0513 763 | 11/1992 |
| CA | 2177154 | 6/1995 | | EP | 0516533 | 12/1992 |
| CA | 2458564 | 6/1995 | | EP | 0539106 | 4/1993 |
| CA | 2256591 | 11/1997 | | EP | 0539106 A2 | 4/1993 |
| CA | 2458346 | 5/2004 | | EP | 093/22877 | 11/1993 |
| CA | 2458564 | 5/2004 | | EP | 0567800 | 11/1993 |
| CA | 2459528 | 10/2004 | | EP | 0570785 | 11/1993 |
| CA | 2458337 | 12/2004 | | EP | 09322877 | 11/1993 |
| CA | 2458564 | 12/2004 | | EP | 0586954 | 3/1994 |
| CA | 2458346 | 4/2005 | | EP | 0620689 | 10/1994 |

| | | | | | | |
|---|---|---|---|---|---|---|
| EP | 0646856 | 4/1995 | | JP | 07-230466 A | 8/1995 |
| EP | 0690426 | 1/1996 | | JP | 7230466 | 8/1995 |
| EP | 0702491 | 3/1996 | | JP | 07230466 A | 8/1995 |
| EP | 0372384 | 5/1997 | | JP | 07 235909 | 9/1995 |
| EP | 0810534 A | 12/1997 | | JP | 07-235909 | 9/1995 |
| EP | 0810534 A2 | 12/1997 | | JP | 08-008850 A | 1/1996 |
| EP | 0838798 | 4/1998 | | JP | 08008850 A | 1/1996 |
| EP | 0838798 A1 | 4/1998 | | JP | 08008851 | 1/1996 |
| EP | 9590478.9 | 5/1998 | | JP | 08-051614 A | 2/1996 |
| EP | 0892388 | 1/1999 | | JP | 408051614 A | 2/1996 |
| EP | 0924629 A | 6/1999 | | JP | 08-228328 | 9/1996 |
| EP | 0924687 | 6/1999 | | JP | 08314790 | 11/1996 |
| EP | 0701220 | 7/2001 | | JP | 08510869 | 11/1996 |
| EP | 0726535 | 5/2003 | | JP | 09506225 | 6/1997 |
| EP | 00968375.6 | 3/2004 | | JP | 09227193 | 8/1997 |
| EP | 00909958.1 | 5/2004 | | JP | 09-227193 | 9/1997 |
| EP | 00974003.6 | 7/2004 | | JP | 09237096 | 9/1997 |
| EP | 00974006.9 | 7/2004 | | JP | 09 284571 | 10/1997 |
| EP | 00923211.7 | 5/2005 | | JP | 09-284571 | 10/1997 |
| EP | 00923210.9 | 6/2005 | | JP | 09282218 | 10/1997 |
| EP | 00909958.1 | 7/2005 | | JP | 10070530 | 3/1998 |
| EP | 00968375.6 | 7/2005 | | JP | 10134080 | 5/1998 |
| EP | 00909966.4 | 6/2006 | | JP | 10-285568 A | 10/1998 |
| EP | 00974003.6 | 6/2006 | | JP | 10275186 | 10/1998 |
| EP | 00909958.1 | 9/2006 | | JP | 410285568 A | 10/1998 |
| EP | 00909958.1 | 10/2006 | | JP | 10301946 | 11/1998 |
| EP | 00943086.9 | 12/2006 | | JP | 10312344 | 11/1998 |
| EP | 00925915.1 | 4/2007 | | JP | 10327397 | 12/1998 |
| EP | 00960077.6 | 10/2007 | | JP | 11003341 | 1/1999 |
| GB | 1204190 | 12/1967 | | JP | 11-068770 | 3/1999 |
| GB | 1204190 | 9/1970 | | JP | 11068770 | 3/1999 |
| GB | 2149544 | 6/1985 | | JP | 11096175 | 4/1999 |
| GB | 2149544 A | 12/1985 | | JP | 11250145 | 9/1999 |
| GB | 2168227 | 6/1986 | | JP | 515760/95 | 4/2004 |
| GB | 2 177 873 A | 1/1987 | | JP | 515760/95 | 12/2004 |
| GB | 2269302 A | 2/1994 | | MX | 2001/010300 | 9/2004 |
| GB | 2344009 | 5/2000 | | MX | 2001/010298 | 4/2005 |
| JP | 060-143086 | 7/1985 | | MX | 2001/007581 | 7/2006 |
| JP | 61-028150 | 2/1986 | | MX | 2001/010298 | 11/2006 |
| JP | 061060150 | 3/1986 | | MX | 2002/002555 | 1/2007 |
| JP | 061060150 | 8/1986 | | MX | 2002/000197 | 2/2007 |
| JP | 62-24777 | 2/1987 | | MX | 2002/002984 | 3/2007 |
| JP | 062-24777 | 2/1987 | | MX | 2001/007580 | 2/2008 |
| JP | 62-140134 | 6/1987 | | MX | 2001/007580 | 6/2008 |
| JP | 062-245167 | 10/1987 | | MX | 2001/010300 | 6/2008 |
| JP | 62-245167 | 10/1987 | | MX | 2001/010298 | 9/2008 |
| JP | 64-086778 | 3/1989 | | MX | 2002/002555 | 9/2008 |
| JP | 0186778 | 3/1989 | | MX | 2001/010300 | 11/2008 |
| JP | 01-130683 | 5/1989 | | MX | 2001/007580 | 3/2009 |
| JP | 01130683 | 5/1989 | | MX | 2001/007581 | 3/2009 |
| JP | 01-142918 | 6/1989 | | TW | 234223 | 11/1994 |
| JP | 64-007786 | 11/1989 | | TW | 235358 | 12/1994 |
| JP | 064-007786 | 11/1989 | | TW | 235359 | 12/1994 |
| JP | 02-284571 | 11/1990 | | TW | 236065 | 12/1994 |
| JP | 03-114375 | 5/1991 | | TW | 236744 | 12/1994 |
| JP | 03-198119 | 8/1991 | | TW | 238461 | 1/1999 |
| JP | 03225445 | 10/1991 | | WO | WO 80/00209 | 2/1980 |
| JP | 03225445 A * | 10/1991 | | WO | WO 83/03020 | 9/1983 |
| JP | 04-170183 | 6/1992 | | WO | WO 84/00237 | 1/1984 |
| JP | 05-046045 | 2/1993 | | WO | WO 86/01962 | 3/1986 |
| JP | 05056405 | 3/1993 | | WO | WO 87/01481 | 3/1987 |
| JP | 05-046045 | 5/1993 | | WO | WO 88/01463 | 2/1988 |
| JP | 05-236437 | 9/1993 | | WO | WO 8809985 | 12/1988 |
| JP | 05233547 | 9/1993 | | WO | WO 89/09528 | 10/1989 |
| JP | 05233547 A * | 9/1993 | | WO | WO 8909528 | 10/1989 |
| JP | 05236437 | 9/1993 | | WO | WO 89/12370 | 12/1989 |
| JP | 05250106 | 9/1993 | | WO | WO 90/10988 | 9/1990 |
| JP | 05-334167 A | 12/1993 | | WO | WO 9100670 | 1/1991 |
| JP | 05334167 A | 12/1993 | | WO | WO 91/03112 | 3/1991 |
| JP | 06-068339 A | 3/1994 | | WO | WO 91/11769 | 8/1991 |
| JP | 06068339 A | 3/1994 | | WO | WO 91/15841 | 10/1991 |
| JP | 06134489 | 5/1994 | | WO | WO 92/10040 | 6/1992 |
| JP | 06187359 | 7/1994 | | WO | WO 92/11713 | 7/1992 |

| | | |
|---|---|---|
| WO | WO 92/12599 | 7/1992 |
| WO | WO 92/17027 | 10/1992 |
| WO | WO 92/21206 | 11/1992 |
| WO | WO 93/06692 | 4/1993 |
| WO | WO 9307713 | 4/1993 |
| WO | WO 93/09490 | 5/1993 |
| WO | WO 93/09631 | 5/1993 |
| WO | WO93/15466 | 8/1993 |
| WO | WO 93/22877 | 11/1993 |
| WO | 94/01964 A1 | 1/1994 |
| WO | WO 94/01964 | 1/1994 |
| WO | WO 94/07327 A1 | 3/1994 |
| WO | WO 94/13107 | 6/1994 |
| WO | WO 94/14282 | 6/1994 |
| WO | WO 94/16527 | 7/1994 |
| WO | WO 94/23537 | 10/1994 |
| WO | WO 95/15649 | 12/1994 |
| WO | WO 95/15649 * | 6/1995 |
| WO | WO 9515649 A | 6/1995 |
| WO | WO 96/08109 | 3/1996 |
| WO | WO 96/17306 | 6/1996 |
| WO | WO 96/25006 | 8/1996 |
| WO | WO 96/41473 | 12/1996 |
| WO | WO 97/13368 | 4/1997 |
| WO | WO 97/18665 | 5/1997 |
| WO | WO 97/12105 | 6/1997 |
| WO | WO 97/20224 | 6/1997 |
| WO | WO 97/20274 | 6/1997 |
| WO | WO 97/22049 | 6/1997 |
| WO | WO 97/22062 | 6/1997 |
| WO | WO 97/22063 | 6/1997 |
| WO | WO 97/22064 | 6/1997 |
| WO | WO 97/22065 | 6/1997 |
| WO | WO 97/22067 | 6/1997 |
| WO | WO 97/22079 | 6/1997 |
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |
| WO | WO 97/22110 | 6/1997 |
| WO | WO 97/22111 | 6/1997 |
| WO | WO 97/22112 | 6/1997 |
| WO | WO 9720274 | 6/1997 |
| WO | WO 97/12819 | 7/1997 |
| WO | WO 97/23819 | 7/1997 |
| WO | WO9737344 | 10/1997 |
| WO | WO 97/41688 A1 | 11/1997 |
| WO | WO 97141688 A1 | 11/1997 |
| WO | WO 97/45798 | 12/1997 |
| WO | WO 98/02836 | 1/1998 |
| WO | WO 98/08344 | 2/1998 |
| WO | WO 9808344 | 2/1998 |
| WO | WO 9808344 A | 2/1998 |
| WO | WO 98/18086 | 4/1998 |
| WO | WO 9818086 | 4/1998 |
| WO | WO 9827494 | 6/1998 |
| WO | WO 98/48566 | 10/1998 |
| WO | WO 98/53581 | 11/1998 |
| WO | WO 99/26415 | 11/1998 |
| WO | WO 99/12349 | 3/1999 |
| WO | WO 99/18701 A1 | 4/1999 |
| WO | WO 99/26415 | 5/1999 |
| WO | WO 99/44144 | 9/1999 |
| WO | WO 99/45491 | 9/1999 |
| WO | WO 9944144 A | 9/1999 |
| WO | WO 99/45491 | 10/1999 |
| WO | WO 99/52285 | 10/1999 |
| WO | WO 99/66719 | 12/1999 |
| WO | WO 00/62228 A3 | 10/2000 |
| WO | WO 01/18665 A1 | 3/2001 |
| WO | WO 01/18665 A1 | 3/2001 |
| WO | WO 97/18665 | 3/2001 |
| WO | WO 97/22111 | 6/2006 |
| WO | WO 2007/022107 | 2/2007 |

OTHER PUBLICATIONS

Lewis et al.; ("Shared books: collaborative publication management for an office information system"); ACM SIGIOS Bulletin, Conference sponsored by ACM SIGOIS and IEEECSTC-OA on Office information systems vol. 9 issue 2-3, Apr. 1988.*

Mann et al.; ("A coherent distributed file cache with directory write-behind") ACM Transactions on Computer Systems (TCOS), vol. 12 Issue 2, May 1994.*

Caitlin Bestler, "Flexible Data Structures and Interface Rituals for Rapid Development of OSD Applications", Jun. 1993, pp. 223-236.

Alexander Gelman, et al., "An Architecture for Interactive Applications", May 1993, pp. 848-852.

Henrie van den Boom, "An Interactive Videotex System", Nov.-Dec. 1986, pp. 397-401.

Nicole Yankelovich, et al., "Reading and Writing the Electronic Book", Oct. 1985, pp. 16-30.

Craig Boyle, et al., "A Survey and Classification of Hypertext Documentation Systems", Jun. 1992, pp. 98-111.

Thyra Rauch, et al. "Enabling the book metaphor for the World Wide Web: Disseminating on-line information as dynamic Web documents", Jun. 1997.

Pasquier-Boltuck, et al., "Prototyping an Interactive Electronic Book System Using an Object-Oriented Approach", Aug. 1988.

Bogdan Czejdo, "Using an ER Query and Update Interface for Rapid Prototyping of Hypertext Systems", Jan. 1990, pp. 227-236.

Speech Technology; "Electronic Dictionary Pronounces Over 35,000 Words"; 1989; pp. 78-79.

Antelman et al. "Collection Development in the Electronic Library" Proceedings of the 21rst annual ACM SIGUCCS Conference on User Services, San Diego, CA, p. 50-56, 1993.

Proceedings of the Symnposium on Optical Character Recognition, Washington, D.C., 1962, Edited by Fisher, George, et al., 6 pages.

Rethinking Ink, Science News, Jun. 20, 1998, 4 pages.

Computer Organization and Design, Patterson, David, and John Hennessay, 1998, 4 pages.

Herron T.L., "Teaching with the Internet" Internet and Higher Education, US, JAI Press, Stamford, CT, vol. 1, No. 3, 1998, pp. 217-222, XP002118719, ISSN: 1096-7516.

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/> 'retrieved on 1996!

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Integrating Technology into Computer Science Education, US, New York, ACM, Vol. Conf. 1, Jun. 2, 1996, pp. 218-228, ISBN: 0-89791-844-4.

Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.
Technology Update, Wordperfect Corporation Introduces Wordperfect 6.0 for DOS, http://www.nfbnet.org/files/word_processing/WP60.TXT, Mar. 24, 1993.
T.V. Raman, "An Audio View of (LA)Tex Documents," Proceedings of the 1191 Annual Meeting, pp. 1001-1008.
Microsoft Press Computer Dictionary Second Edition, Microsoft Press, 1994, p. 418.
"BSD Kernel Interfaces Manual-PTY(4)", Mac OS X Man Pages, original publication, Nov. 30, 1993.
Sandrick, Karen, "Internet marketing: Software for the hard sell," Health Management Technology, Oct. 1998, vol. 19, No. 11, 6 pages.
IPER dated Mar. 6, 1996 for PCT/US94/13808, PCT.
Written Opinion dated Nov. 16, 1995 for PCT/US94/13808, PCT.
ISR dated Apr. 5, 1995 for PCT/US94/13808, PCT.
ISR dated Feb. 21, 2002 for PCT/US01/10559, PCT.
IPER dated Apr. 11, 2002 for PCT/US01/04946, PCT.
Written Opinion date Dec. 4, 2001 for PCT/US01/04946, PCT.
ISR dated Oct. 16, 2001 for PCT/US01/04946, PCT.
Partial ISR dated Nov. 18, 2002 for PCT/US00/29813, PCT.
IPER dated Oct. 18, 2001 for PCT/US00/09542, PCT.
Written Opinion dated Jun. 19, 2001 for PCT/US00/01708, PCT.
ISR dated Jun. 26, 2000 for PCT/US00/01708, PCT.
ISR dated Feb. 4, 2003 for PCT/US00/29813, 2388649, CA.
IPER dated Jan. 25, 2002 for PCT/US00/29813, 2388649, CA.
Written Opinion dated Sep. 5, 2001 for PCT/US00/29813, 2388649, CA.
ISR dated Feb. 21, 2003 for PCT/US00/29809, 2388648, CA.
IPER dated Feb. 11, 2002 for PCT/US00/29809, 2388648, CA.
Written Opinion dated Sep. 5, 2001 for PCT/US00/29809, 2388648, CA.
IPER dated Mar. 25, 2002 for PCT/US00/25826, 2385097, CA.
Written Opinion dated Nov. 2, 2001, for PCT/US00/25826, 2385097, CA.
ISR dated Jun. 22, 2001 for PCT/US00/25826, 2385097, CA.
Written Opinion dated May 29, 2001 for PCT/US00/09542, 2371379, CA.
ISR dated Nov. 2, 2000 for PCT/US00/09542, 2371379, CA.
ISR dated Nov. 2, 2000 for PCT/US00/09541, 2369759, CA.
IPER dated Feb. 14, 2002 for PCT/US00/31740, 2001-539201, JP.
Written Opinion dated Oct. 19, 2001 for PCT/US00/31740, 2001-539201, JP.
ISR dated Sep. 18, 2001 for PCT/US00/31740, 2001-539201, JP.
IPER dated Aug. 22, 2003 for PCT/US00/17266, 2001-506518, JP.
Written Opinion dated Jan. 31, 2003 for PCT/US00/17266, 2001-506518, JP.
ISR dated Sep. 21, 2001 for PCT/US00/15810, 2001-502044, JP.
ESR dated Oct. 4, 2005, 00974003.6, EP.
IPER dated Feb. 13, 2002 for PCT/US00/24819, 00960077.6, EP.
Written Opinion dated Aug. 13, 2001 for PCT/US00/24819, 00960077.6, EP.
ISR dated Dec. 7, 2000 for PCT/US00/24819, 00960077.6, EP.
ISR dated Jan. 18, 2001 for PCT/US00/17266, 00943086.9, EP.
IPER dated Sep. 8, 2001 for PCT/US00/15810, 00941287.5, EP.
IPER dated Jan. 2, 2002 for PCT/US00/09541, 00925915.1, EP.
Written Opinion dated Aug. 13, 2001 for PCT/US00/09541, 00925915.1, EP.
IPER dated Feb. 14, 2001 for PCT/US00/09543, 00923211.7, EP.
ISR dated Oct. 24, 2000 for PCT/US00/09543, 00923211.7, EP.
IPER dated Nov. 1, 2001 for PCT/US00/01708, 00909966.4, EP.
IPER dated Feb. 2, 2001 for PCT/US00/01625, 00909958.1, EP.
ISR dated Jul. 24, 2000 for PCT/US00/01625, 00909958.1, EP.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.

T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.
Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.
"'Optical Disks' May Be Books of the Future", Steven Kosek and Dennis Lynch; Chicago Tribune, Sep. 15, 1985, p. 31.
"Transmission Control Protocol; Request for Comment 793", Sep. 1981, pp. 1-85.
Systems, Boyle, C. et al.; *IEEE Transactions on Professional Communication*; IEEE Inc.; New York; vol. 35, No. 2; Jun. 1, 1992, pp. 98-111.
"An Interactive Lesson in the Interactive Course Series" Waite Group Press, MacMillian Computer Publishing, Online! 1996, XP00082591, Retrieved from the Internet; <URL:http//www.waite.com/> retrieved in 1996.
"Electronic Dictionary Pronounces over 83,000 Words," Goorfin, L., *Speech Technology*; Man-Machine Voice Communictions, U.S., Media Dimensions Inc.; New York, vol. 4, No. 4; Apr. 1, 1989, pp. 78-79.
"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.
"Fourth generation hypermedia: some missing links for the World Wide Web," Biber, M. et al., *International Journal of Human-Computer Studies*; U.S.; Academic Press: New York; vol. 47, No. 1; Jul. 1997; pp. 31-65.
"*A Dynamic Policy of Segment Replication for Load-Balancing in Video-On-Demand Servers*," Dan, A. et al.; Multimedia Systems, vol. 3, No. 3, Jul. 1995, pp. 93-103.
"Prototyping and Interaction Electronic Book System Using an Object-oriented Approach," Pasquier-Boltuck, J. et al. *ECCOP*; European Conference on Object-oriented programming; Aug. 15, 1988; pp. 177-190.
"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.
"Subscription Teletext for Value Added Services", Dr. G.T. Sharpless, IEEE Transactions on Consumer Electronics, Aug. 1985, vol. CE-31, No. 3, pp. 283-289.
"International bookstore opens for business"; Medford: Jul./Aug. 1994, vol. 11, Iss. 4; p. 21 (1 page).
"Using and ER Query and Update Interface for Rapid Prototyping of Hypertext Systems," Czejdo, B.; Proceedings of the Annual Hawaii International Conference on System Sciences; Jan. 1, 1990, pp. 227-236.
"Store-and-Forward Architecture for Video-on-Demand Service," Gelman, A.D. et al., ICC Conference, 1991, pp. 842-846.
Dinaro, M. et al., "Markets and Products Overview," Revue HF Tijdschrift, 1991, vol. 15, No. 3/4, pp. 135-148.
Alexander Gelman, et al., "An Architecture For Interactive Applications", May 1983, pp. 848-852.
Boom, H., "An Interactive Videotex System for Two-Way CATV Networks," 1986, vol. 40, No. 6, pp. 397-401.
*"Applied Cryptography Protocols, Algorithms, and Source Code in C,"* Schneier, Bruce; 1996 by John Wiley & Sons, pp. 34-44.
Azuma J., "Creating Educational Web Sites", IEE Communications Magazine, U.S. IEEE Service Center, Piscataway, N.J., vol. 37, No. 3, Mar. 1999, pp. 109-113.
Barnes, 10 Minute Guide Windows 3.1., Alpha Books, 14992, pp. 60-64.
Basch, Reva, "Books Online: Visions, Plans, and Perspectives for Electronic Text", Online, Medford: Jul. 1991, vol. 15, Iss. 4; pp. 13-23.

Bestler, C., "Flexible Data Structure and Interface Rituals for Rapid Development of OSD Applications", NCTA Technical Papers, pp. 223-236, Jun. 1993.

Broering, N. C., "The Electronic Library and IAIMS at Georgetown University", Policy Issues in Information and Communication Techniques in Medical Applications, 1988. Symposium Record, Sep. 29-30, 1988, pp. 27-29.

Chan, L. M., "Principles, Structures and Format", Immroth's Guide to the Library of Congress Classification, 4th Edition, 1990, Chapter 2, pp. 19-51.

Consumer Digest advertisement; "Xpand Your TV's Channel Capability;" Fall/Winter 1992; p. 215.

Daniel M. Moloney, "Digital Compression in Today's Addressable Environment;" 1993 NCTA Technical Papers; Jun. 6, 1993; pp. 308-316.

DeBuse, R., "So That's a Book . . . Advancing Technology and the Library," Mar. 1988, Information Technology and Libraries, vol. 7, Issue 1, pp. 7-18.

Endo, K. et al., "Electronic Book in 3.5" Floppy Disk, Consumer Electronics, Digest of Technical papers, IEEE 1994 International conference on Jun. 21-23, 1994 pp. 316-317.

Fox E. A., et al., "Users, user interfaces, and objects: Envision, a Digital Library," Sep. 1993, Journal of the American Society for Information Science, vol. 44, issue 8, p. 480-491.

Schepers, C., "Für Geschlossene Benutzergruppen" Funkschau, DE, Franzis-Verlag K.G. Munchen, No. 18, Aug. 25, 1989, pp. S53-S54.

Goldberg M W et al: "World wide web—course tool: An environment for building WWW-based courses," Computer Networks and ISDN Systems, NL, North Holland Publishing. Amsterdam, vol. 28, No. 11, May 1, 1996.

Great Presentations advertisement; "Remote, Remote;" 1987; p. 32H.

Hartley S et al.: "Enhancing Teaching Using the Internet" SIGCSE/SIGCUE Conference on Integrating Technology into Computer Science Education, US, New York, ACM, vol. Conf. 1, Jun. 2, 1996, pp. 218-228.

Herron T L: "Teching with Internet" Internet and Higher Education, US, JAI Press, Stamford, CT, vol. 1, No. 3, 1998, pp. 217-222.

Hong Kong Enterprises; Advertisement, "Two Innovative New Consumer Products From SVI," Nov. 1988, p. 379.

HP-41 C Operating Manual—A Guide for the Experience User, Hewlett Packard Co., Jun. 1980.

"Applying Interactive Voice Response Technology in Psychiatric Practice", Sorce J. F. et al., Human Factors in Telecommunications; R. V. Decker's Verlag, Heidelberg, Germany, pp. 397-407.

Indian Patent Application 762-Cal-93.

Indian Patent Application 765-Cal-93.

Intner, S. S. et al., "The Dewey Decimal Classification", Special Libraries: A Cataloging Guide, 1998, Chapter 11, pp. 211-239.

John Reimer, "Memories in My Pocket;" BYTE; Feb. 1991; pp. 251-258.

Kubota H. et al.: "Terrestrial Data Multiplex Broadcasting News Delivery System and its Terminal", IEE Transactions on Consumer Electronics, U.S., IEE Inc., New York, vol. 43, No. 3, Aug. 1, 1997, pp. 504-509.

Lewis, B.T. et al.; "Shared books: collaborative publication management for an office information system"; ACM SIGIOS Bulletin Conference sponsored by ACM SIGOIS and IEEECS TC-OA on Office information systems, vol. 9, Issue 2-3, Apr. 1988, pp. 197-204.

Mann et al.; "A coherent distributed file cache with directory write-behind" ACM Transactions on Computer Systems (TCOS), vol. 12, Issue 2, May 1994.

Miyazawa, M. et al., "A electronic book: APT Book," Aug. 1990, Human-Computer Interaction, INTERACT '90, Proceedings of the IFIP TC 13 Third International Conference, Cambridge, UK, pp. 513-519.

O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.

Olshansky R. et al., "Subscriber Distributed Networks Using Compressed Digital Video;" Journal of Lightwave Technology; Nov. 1992; vol. 10, No. 11, pp. 1760-1765.

Pobiak, B.C., "Adjustable access electronic books", Computing Applications to Assit Persons with Disabilities, 1992, Proceedings of the John Hopkins National Search for Feb. 1-5, 1992 pp. 90-94.

Raman, T.V., "Audio System for Technical Readings," May 1994, Cornell University, pp. 1-129.

Rawlins, "The New Publishing—Technology's impact on the publishing industry over the next decade", Nov. 12, 1991. pp. 1-65.

Schatz, "Building an electronic scientific community", System Sciences, 1991. Proceeding of the Twenty-Fourth Annual Hawaii International Conference on vol. iii, Jan. 8-11, 1991 pp. 739-748 vol. 3.

Simpson, Alan, Mastering Wordperfect® 5.1 & 5.2 for Windows, 1993, Sybex, Inc., pp. 72-73.

Soloview; "Prefetching in segmented disk cache for multi-disk systems" Proceedings of the fourth workshop on I/O in parallel and distributed systems: part of the federated computing research conference; May 1996.

Valauskas, Edward J, "Electronic books as databases", Database, Aug. 1993, vol. 16, Iss. 4; p. 84-86.

English language translation of citation No. 12, JP08008851.

English language translation of citation No. 13, JP09237096.

English language translation of citation No. 14, JP10070530.

Cerf, V. et al., "A protocol for Packet Network Intercommunication," May 1974, IEEE Transactions on Communications col. COM-22, No. 5, 637-647.

Holzmann, G., "Design and Validation of Computer Protocols," Nov. 1990, Prentice Hall, pp. 1- 512.

Hearst, "Changing Network Society: New Technology in the Internet," (the original title: Interfaces for Searching the Web), Dec. 1998, Japan Nikkei Science, 1$^{st}$ edition, 80-85.

Shunji Ichiyama, "WWW-based Digital Library System," Jul. 1996, NEC Giho (technical journal), NEC Creative, vol. 49, 33-39.

Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.

Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.

Toshiyuki Kamiya, "Development of Electronic Library Interface with 3D Walk-through and CG Librarian," Jan. 1995, Research Report of Information Processing Society of Japan, vol. 95, No. 1, 27-35.

Mamoru Sato, "Electronic Library Search using Animation," Apr. 1989, Science and Technology Information Service, Japan, National Diet Library, No. 88, 11-17.

Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.

"A Survey and Classification of Hypertext Documentation Systems," Boyle, C. et al.; *IEEE Transactions on Professional Communication*; IEEE Inc.; New York; vol. 35, No. 2; Jun. 1, 1992.

"An Interactive Lesson in the Interactive Course Series" Waite Group Press, MacMillan Computer Publishing, Online! 1996, XP000829591, Retrieved from the Internet: <URL:http//www.waite.com/> 'retrived on 1996.

"An Interactive Lesson in the Interactive Course Series," Waite Group Press, Macmillian Computer Publishing, 'Online! 1996, XP000829591 Retrieved from the Internet: <URL:http://www.waite.com/> 'retrieved on 1996!

"Electronic Dictionary Pronounces over 83,000 Words," *Speech Technology*, Man-Machine Voice Communications, U.S., Media Dimensions Inc.; New York, vol. 4, No. 4; Apr. 1, 1989, pp. 78-79.

"Enabling the book metaphor for the World-Wide-Web: disseminating on-line information as dynamic Web documents," Rauch, T. et al.; *IEEE Transactions on Professional Commuications*, Jun. 1997; vol. 40, No. 2, pp. 111-128.

"Fourth generation hypermedia: some missing links for the World Wide Web," *International Journal of Human-Computer Studies*; U.S.; Academic Press: New York; vol. 47, No. 1; Jul. 1997; pp. 31-65.

"Multimedia Systems," *A Dynamic Policy of Segment Replication for Load-Balancing in Video-On-Demand Servers*; Dan, et al.; Jul. 1995.

"Prototyping and Interactive Electronic Book System Using and Object-oriented Approach," Pasquier-Boltuck, J. et al.; *ECOOP*; european Conference on Object-oriented Programming; Aug. 15, 1988; pp. 177-190.

"Reading and Writing the Electronic Book," *Computer*; U.S. IEEE Computer Society, Long Beach, Calif., U.S. vol. 18, No. 10, Oct. 1, 1985.

"Subscription Teletext for Value Added Services", Dr. G.T. Sharpless, IEEE Transactions on Consumer Electronics, Aug. 1985, No. 3, p. 283.

"The Internet bookstore opens for business", Medford: Jul./Aug. 1984. vol. 11, Iss. 4; p. 21 (1 page).

"Using and ER Query and Update Interface for Rapid Prototyping of Hypertext Systems," Czejdo, B.; Proceedings of the Annual Hawaii International Conference on System Sciences; Jan. 1, 1990.

A Store-and-Forward Architecture for Video-on-Demand Service.

A Survey and Classification of Hypertext Documentation Systems, IEEE Transaction on Professional Commuication.

A.D. Gelman, et al.; A Store-And-Forward Architecture For Video-On-Demand Service; ICC 91 Conf.; Jun. 23-26, 1991;pp. 842-846.

A6,034,680, Alcatel Tetetra: markets and Products Overview.

Alexander Felman, et al., "An Architecture For Interaction Applications", May 1993, pp. 848-852.

An Interaction Lesson . . An interactive lesson in the interactive course series, Aug. 1996.

An Interactive Videotex System for Two-Way CATV Networks.

*Applied Cryptography Protocols, Algorithms, and Source Code in C* (pp. 34-44); Schneier, Bruce; Pub. 199 by John Wiley & Sons.

Azuma J.: "Creating Educational Web Sites", IEE Commuications Magazine, U.S. IEEE Service Center, Piscataway, N.J., vol. 37, No. 3, Mar. 1999, pp. 109-113.

Barnes, 10 Minute Guide to Windows 3.1., Alpha Books, 1992, pp. 60-64.

Basch, Reva, "Books Online: Visions, Plans, and Perspectives for Electronic Text", Online. Medford: Jul. 1991. vol. 15, Iss. 4; 13 (11 pages).

Bestler, "Flexible Data Structure and Interface Rituals for Rapid Development of OSD Applications", pp. 223-236, Jun. 1993.

Biber, et al.; Fourth generation hypermedia: some missing links for the World Wide Web; Jul. 1997; pp. 31-65.

Bogdan Czejdo, "Using and ER Query and Update Interface for Rapid Prototyping of Hypertext Systems", Jan. 1990, pp. 227-236.

Boltuck et al.; Prototyping and Interactive Electronic Book System Using and Object-Oriented Approach; Aug. 1988; pp. 1770190.

*Books Online* . . . ; Basch; Jul. 1991.

Boom, "An Interactive Videotext System", pp. 397-401, Nov./Dec. 1986.

Boyle C. et al.: "A Survey and Classificatoin of Hypertext Documentation Systems", IEE Transactions on Professional Communications, US, IEE Inc., New York, vol. 35, No. 2, Jun. 1, 1992, pp. 98-111.

Broering, "The Electronic Library and IAIMS at Georgetown University", Policy Issuees in Information and Communication Techniques in Medical Applications, 1988. Symposium Record Sep. 29-30, 1988, pp. 27-29.

Caejdo B.: "Using an ER Query and Update Interface for Rapid Prototyping of Hypertext Systems", Proceedings of the Annual Hawaii International Conference on System Sciences, Jan. 1, 1990, p. 231.

Caitlin Bestler, "Flexible Data Structures and Interface Rituals for Rapid Development of OSD Applications", Jun. 1993, pp. 223-236.

Chan, "Principles, Structure and Format", Immroth's Guide to the Library of Congress Classification, 4th Edition, 1990, Chapter 2, pp. 19-51.

Consumer Digest advertisement; Xpand Your TV's Channel Capability; Fall/Winter 1992; p. 215.

Craig Boyle, et al., "A Survey and Classification of Hypertext Documentation Systems", Jun. 1992, pp. 98-111.

Creating Educational Web Sites.

Czejdo B.: "Using an ER Query and Update Interface for Rapid Prototyping of Hypertext Systems" Proceedings of the Annual Hawaii International Conference on System Sciences, Jan. 1, 1990, p. 231.

Dan A. et al.: "A Dynamic Policy of Segment Replication for Load-Balancing in Video-on-Demand Servers", Multimedia Systems, Springer Verlag, DE, vol. 3, No. 3, Jul. 1995, pp. 93-103.

Daniel M. Moloney, Digital Compression in Today's Addressable Environment; 1993 NCTA Technical Papers; Jun. 6, 1993; pp. 308-316.

DeBuse, SO That's a Book . . . Advancing Technology and the Library, Mar. 1988, Information Technology and Libraries, vol. 7, Issue 1, pp. 7-18.

Digital Compression in Today's Addressable Environment.

Dinaro et al., "markets and Products Overview", 1991.

Dr. G. T. Sharpless, IEE Transactions on Consumer Electronics, vol. CE-31, No. 3, Aug. 1985, pp. 283-289.

*Electronic Books as* . . . ; Valauskas; Auust 1993, Electronic Dictionary Pronounces . . . ; Speech Technology.

Enabling the Book Metaphor, IEEE Transactions on Professional Commuication.

Endo et al., "Electronic Book in 3.5 Floppy Disk", Consumer Electronics, 1994. Digest of Technical Papers, IEEE 1994, International Conference on Jun. 21-23, 1994 pp. 316-317.

Enhancing Teaching *Flexibl Data Structures and Interface Rituals for Rapid Development of OSD Application* , Caitlin Bestler, 93 NCTA Tech. Papers, pp. 223-236; Jun. 6, 1993.

Fourth Generation Hypermedia . . . , Int'l Journal of Human-Computer Sciences Studies.

Fox, et al., Users, user interfaces, and objects: Envision, a Digital Library, Sep. 1983, Journal of the American Society for Informationa Science, vol. 44, issue 8, p. 480.

Für Geschlossene, Fur Geschlossene; Funkschau; Aug. 25, 1989.

Gelman, et al., "An Architecture For Interactive Applications", May 1993, pp. 848-852.

Goldberg M W et al: "World Wide Web—course tool; An environment for building WWW-based courses" Computer Networks and ISDN Systems, NL, North Holland Publishing. Amsterdam, vol. 28, No. 11, May 1, 1996.

Goorfin L.: "Electronic Dictionary Pronounces over 83,000 Words" Sp[eech Technology, Man-Machine Voice Communications, U.S., Media, Dimensions, Inc. New York, vol. 4, No. 4, Apr. 1, 1989, pp. 78-79.

Great Presentations advertisement; Remote, Remote; 1987; p. 32H.

H. Van Den Boom, An Interactive Videotex System for Two-Way CATV Networks, Dec. 1986, pp. 397-401.

Hartley S et al.: "Enhancing Teaching Using the Internet" SIGCSE/SIGCUE Conference on Integrating Technology into Computer Science Education, US, New York, ACM, vol. Conf 1, Jun. 2, 1996, pp. 218-228.

Henri van den Boom; An Interactive Videotex System for Two-Way CATV Networks; Nov. 1986; pp. 397-401.

Herron T L: "Teaching with the Internet" Internet and Higher Education US, JAI Press, Stamford, CT, vol. 1, No. 3, 1998, pp. 217-222.

Hong Consumer Products From SVI; Nov. 1988; p. 379 Kong Enterprise advertisement; Two Innovative New Hong Kong Enterprise; Advertisement Two Innovative New Consumer Products From SVI, Nov. 1988, p. 279.

HP-41 C Operating Manual, Hewlett packard Co., Dec. 1982.

Human Factors in Telecommunications; Sorce et al. Indian patent Application 762-Cal-93, Indian Patent Application 765-Cal-93.

Inter et al., "The Dewey Decimal Classification", Special Libraries: A Cataloging Guide, 1998, Chapter 11, pp. 211-239.

*Interactive Videotex*; van den Boom, Nov.-Dec. 1986.

John Reimer: Memories in My Pocket; BYTE; Feb. 1991; pp. 251-258.

Junichi Azuma; Creating Education Web Sites; Mar. 1999; pp. 109-113.

Kubota H. et al.: "Terrestrial Data Multiplex Broadcasting News Delivery System and Its Terminal", IEE Transaction on Consumer Electronics, U.S., IEE Inc., New York, Vo.. 43, No. 3, Aug. 1, 1997, pp. 504-509.

Lewis et al.; ("Shared books: collaborative publication management for an office information system"); ACM SIGIOS Bulletin Conference sponsored by ACM SIGOIS and IEEECS TC-OA on Office information systems, vol. 9, Issue 2-3, Apr. 1988.

Mann et al.; ("A chorent distributed file cache with directory write-behind") ACM Transactions on Computer Systems (TCOS), vol. 12, Issue 2, May 1994.

Marco Dinaro, Alcatel Telettra; Markets and Products Overview; Revue HF Tijdschrift 15; 1991; pp. 135-148.

Markets and Products Overview; Dinaro et al. Medley, et al.; Enhancing teaching using the Internet; Feb. 1996; pp. 218-228.

Memories in My Pocket; Reimer; Byte, pp. 251, 252, 254, 255, 256, 258, Feb. 1991.

Michael Bieber, et al.; Fourth Generation Hypermedia: some missing links for the World Wide Web; 1997; pp. 31-65.

Miyazawa, et al., An electronic book: APT Book, Aug. 1990, Human-Computer Interaction, Interact '90, Proceedigs of the IFIP TC 13 Third International Conference, Cambridge, UK, pp. 513-519.

*Multimedia Systems*, A Dynaic Policy of Segment Replicatoin for Load-Balancing in Video-On-Demand Servers (see 111); Dan et al.; Jul. 1995.

Nicole Yankelovich, et al., "Reading and the Electronic Bookl", Oct. 1985, pp. 16-30.

O'Gorman, "Image and document processing techniques for the RightPages electronic library system", Conference B: Pattern Recognition Methodology and Systems, Proceedings, 11th IAP International Conference on Aug. 30-3 ept. 1992 pp. 260-263.

Olshansky & Joyce: Subscriber Distribution Networks Using Compressed Digital Video; Journal of Lightewavw Tech; Nov. 1992; pp. 1760-1765.

Pasquier-Boltuck J et al: Prototyping and Interactive Electronic Book System Using an Object-Oriented Approach; ECOOP. European Conference on Object-Oriented Programming. Aug. 15, 1998, pp. 117-190.

Pobiak, "Adjustable access electronic books", Computing Applications to Assist Persons with Disabilities, 1992, Proceedings of the John Hopkins National Search for Feb. 1-5, 1992 pp. 90-94.

Prototyping and Interactive Electronic Book System Raman, T.V., Audio System for Technical Readings, May 1994, Cornell University, pp. 1-129.

Rauch T et al: "Enabling the Book Metaphor for the World-Wide-Web: Disseminating On-Line Information as Dynamic Web Documents" IEEE Transactions on Professional Communications. Jun. 1997, IEEE, USA, vol. 40, No. 2, pp. 111-128.

Rawlins, "The New Publishing—Techology's impact on the publishing industry over the next decade", Nov. 12, 1991, pp. 1-65.

Re 36,207, Re. 36.207 (5,185,667) Reading and Wriring the Electronic Book, IEEE Computer Science.

Reimer; "Memories in My Pocket", Feb. 1991, pp. 251-258.

*Remote, Remote*, Great Presentations advertisement, p. 32H; Nov. 1988.

Schatz, "Building and electronic scientific community", System Sciences, 1991. Proceeding of the Twenty-Fourth Annual Hawaii International Conference on vol. iii, Jan. 8-11, 1991 pp. 739-748 vol. 3.

Schepers C.: "Fur Geschlossene Benutzergruppen" Funkschau, De, Franzis-Verlag K.G. Munchen, No. 18, Aug. 25, 1989, pp. S53-S54.

Sharpless, Dr. G.T., "Subscription teletext for value added services", IEEE Transactions On Consumer Electronics, vol. CE-31, No. 3, Aug. 1985.

Simpson, Alan, Mastering Wordperfect® 5.1 & 5.2 for Windows, 1993, Sybex, Inc., pp. 72-73.

Soloview; ("Prefetching in segmented disk cache for multi-disk system") Proceedings of the fourth workshop on I/O in parallel and distributed system: part of the federated computing research conference; May 1996.

Speech Technology, "Electronic Dictionary Pronounces Over 35,000 Words", pp. 78-79 (1989).

Stephen Hartley, et al.; Enhancing Teaching Using the Internet; Feb. 6, 1996; pp. 218-228.

Subscriber Distribution Networks Using Compressed Digital Video. Subscription Teletex for Value Addes Service Teaching with the Internet.

Technology's Impact on . . . ; Rawlins; Nov. 21, 1991.

Telman, et al.; A Store-and-Forward Architecture for Video-on-Demand Service; 1991; pp. 842-846.

Terrestrial Data . . . Terri Herron; Teaching with the Internet; 1998; pp. 217-222.

*The Internet Bookstore* . . . ; Jul./Aug. 1994.

Thyra Rauch, et al., "Enabling the book metaphor for the World Wide Web: Disseminating on-line information as dynami [c] Web documents", Jun. 1997, pp. 111-128.

Two Innovatice New Consumer Products from SVI.

Using an ER Query and Update Interface . . . , Proceedings of the Annual Hawaii.

Valauskas, Edward J. "Electronic books as databases", Database. Aug. 1993. vol. 16, Iss. 4; p. 84 (3 pages).

Van Den Boom, "An Interactive Videotex System for Two-Way CATV Networks", vol. 40, No. 6, pp. 397-401, Dec. 1986.

Waite Group Press; AN Interactive Lesson in the Interactive Course Series, 1996.

*World Wide Web—Course Tool*, Goldberg, M.W., et al., May 1996.

Xpand your TV's Channel Capability.

Yankelovich N et al: "Reading and Writing the Electronic Book" Computer, US, IEEE Computer Society. Long Beach, CA, US, vol. 18, No. 10.

English language translation of citation No. 17, JP10134080.
English language translation of citation No. 18, JP10275186.
English language translation of citation No. 19, JP10301946.
English language translation of citation No. 21, JP10327397.
English language translation of citation No. 23, JP11250145.

* cited by examiner

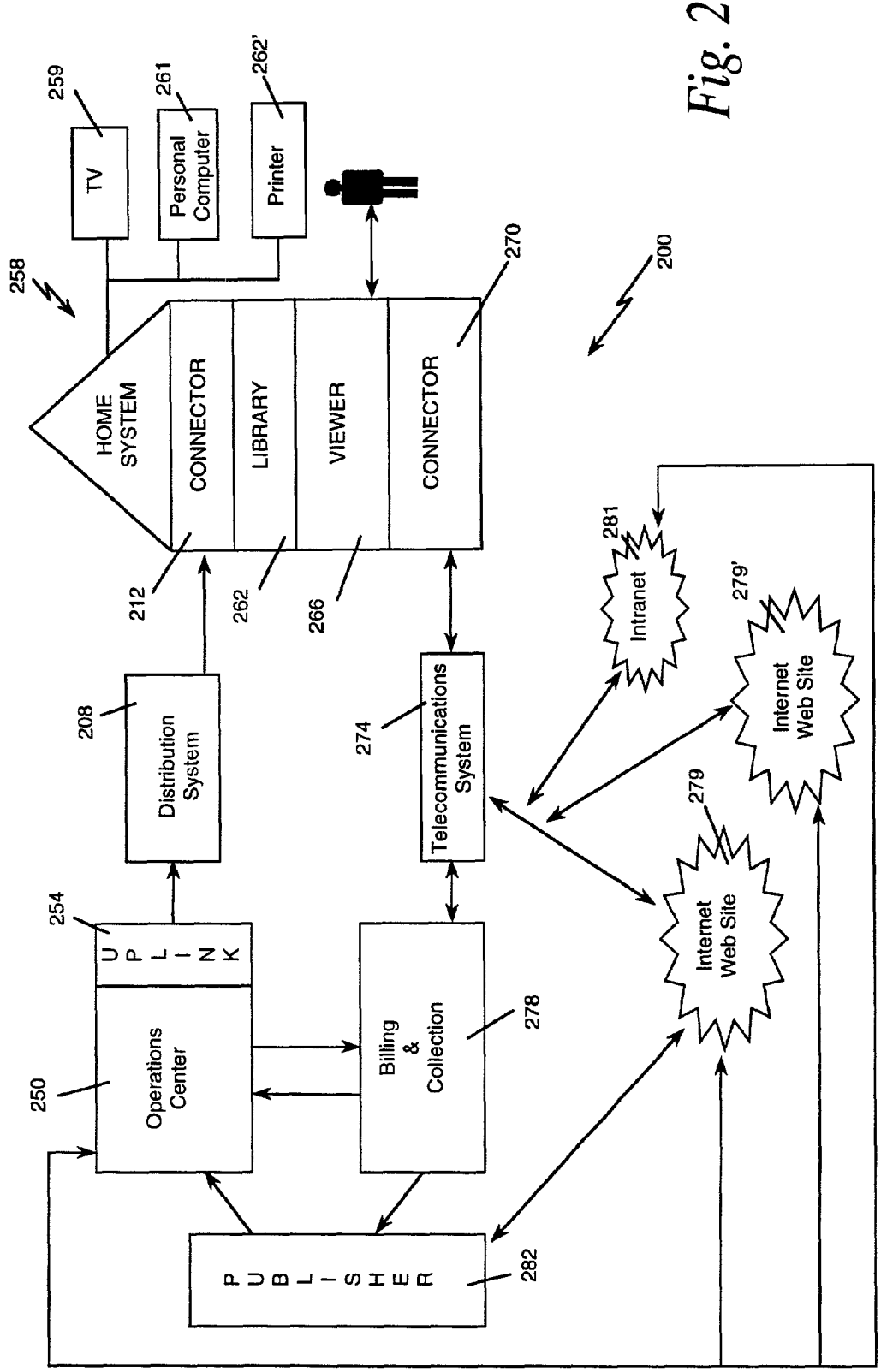

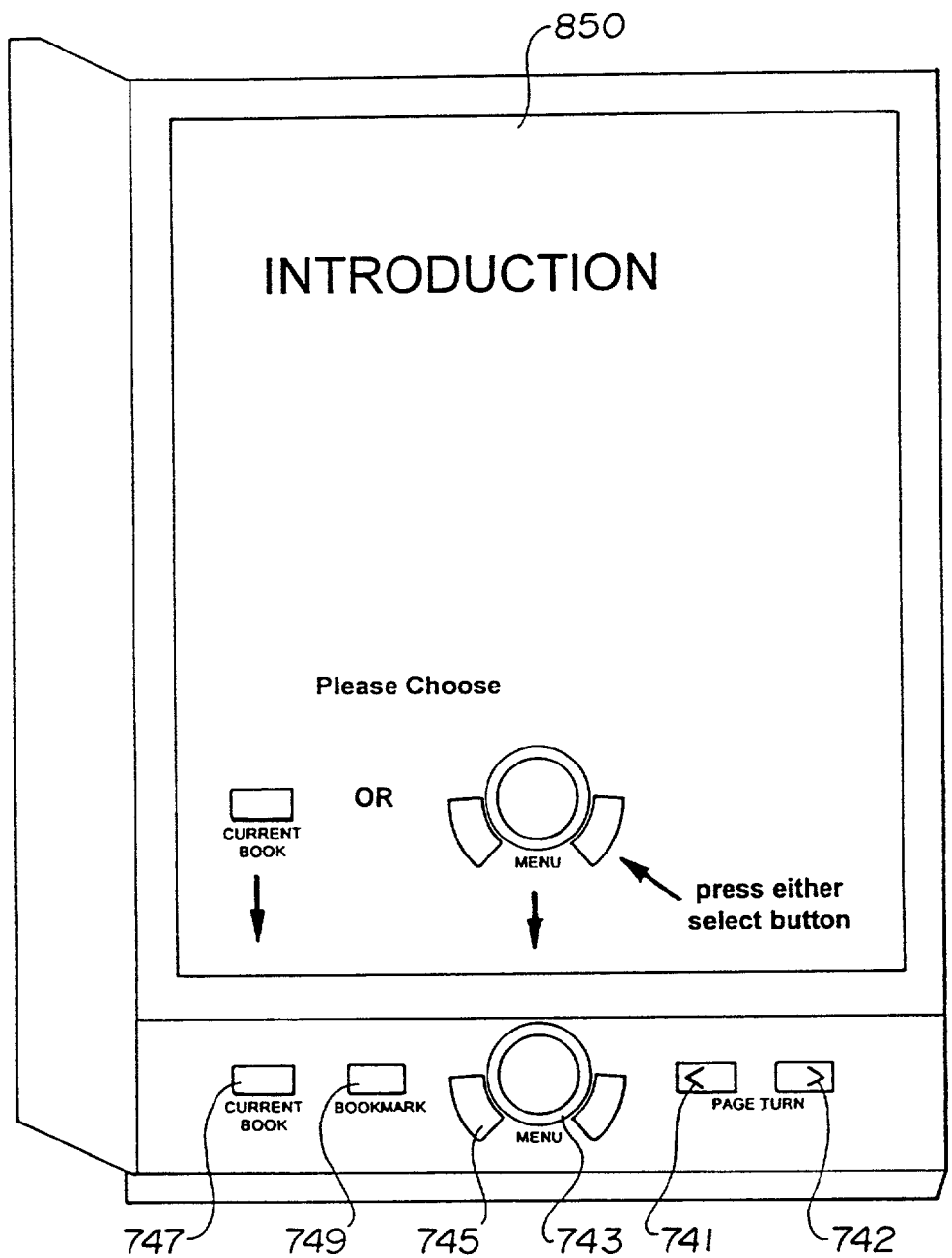

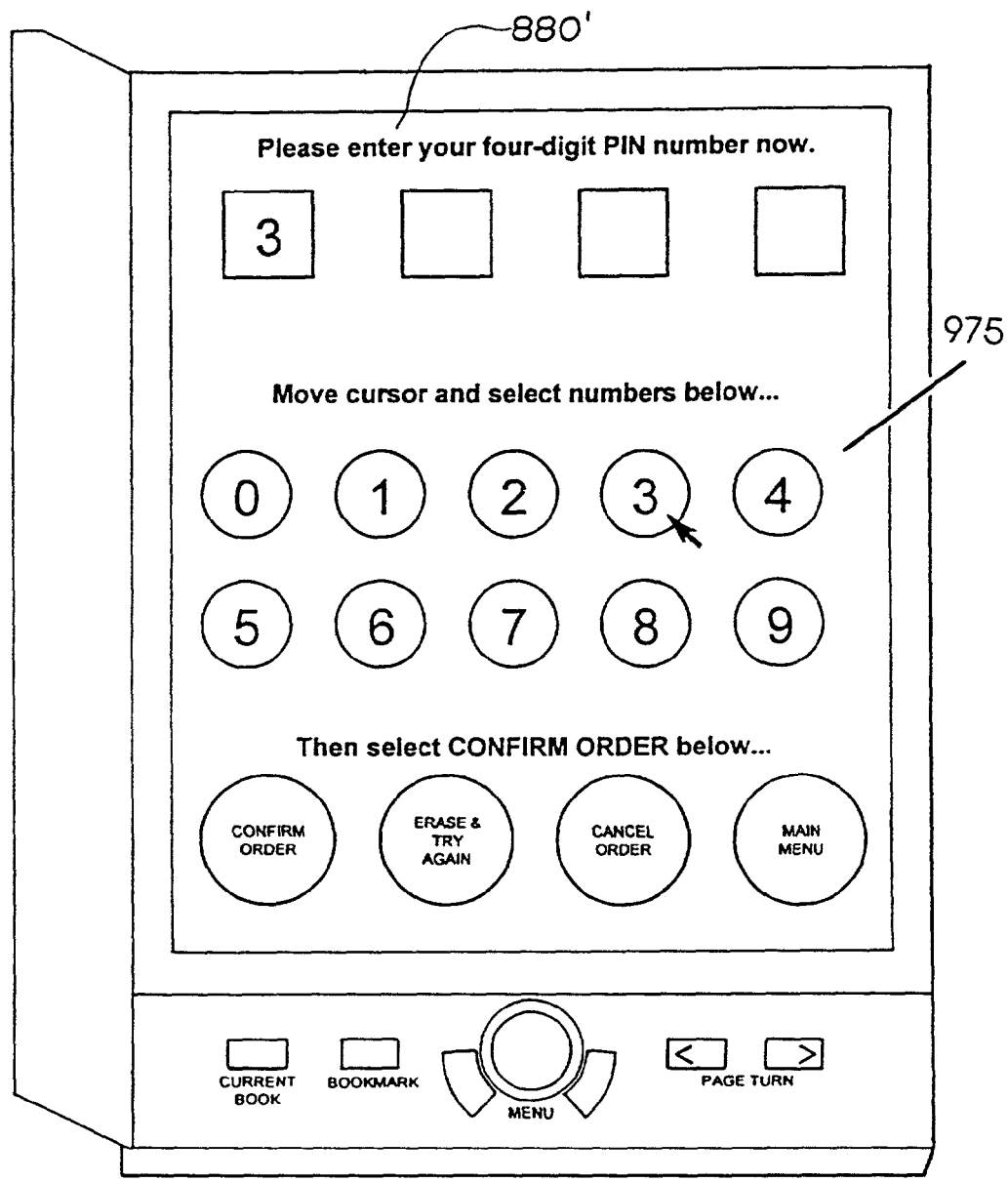

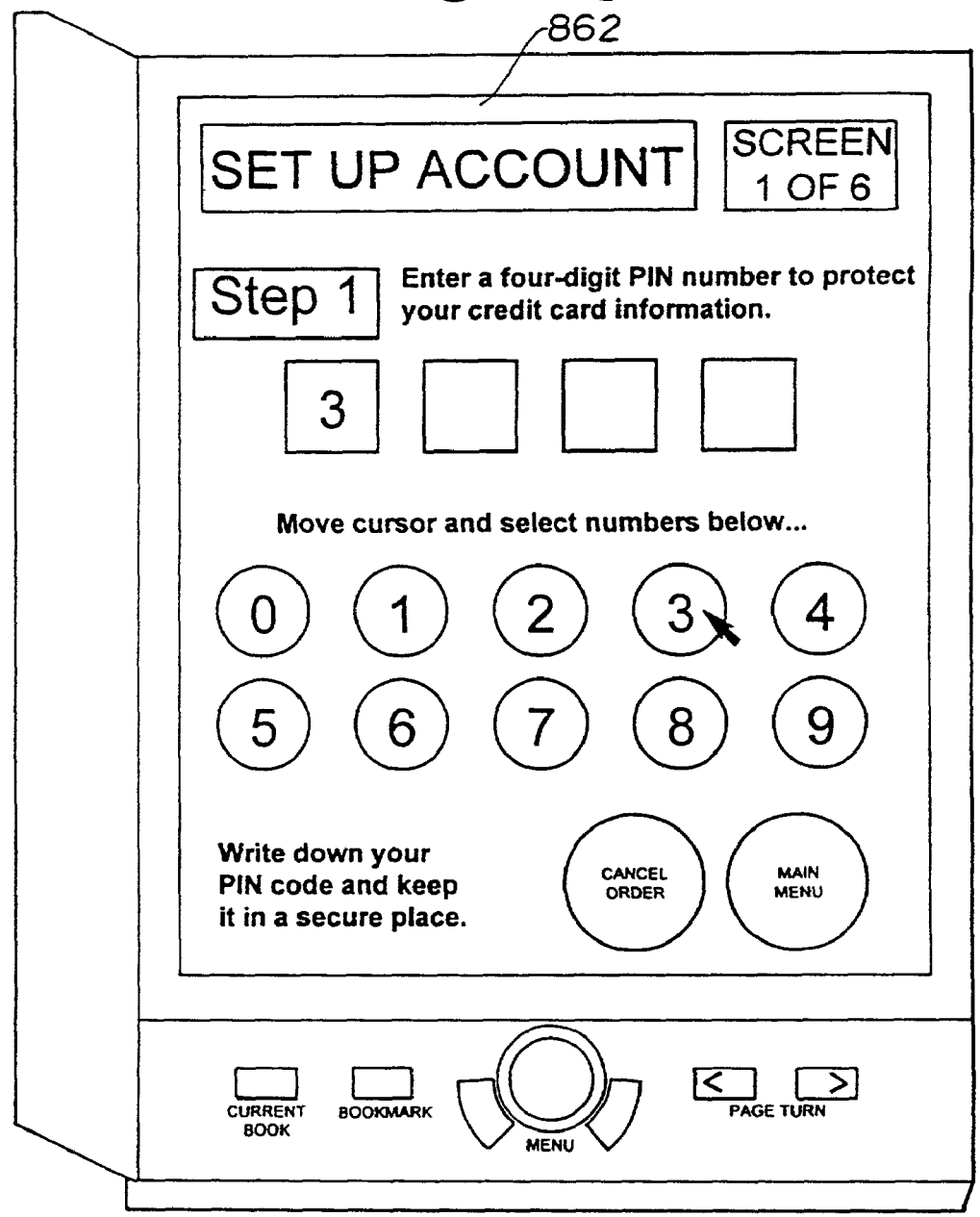

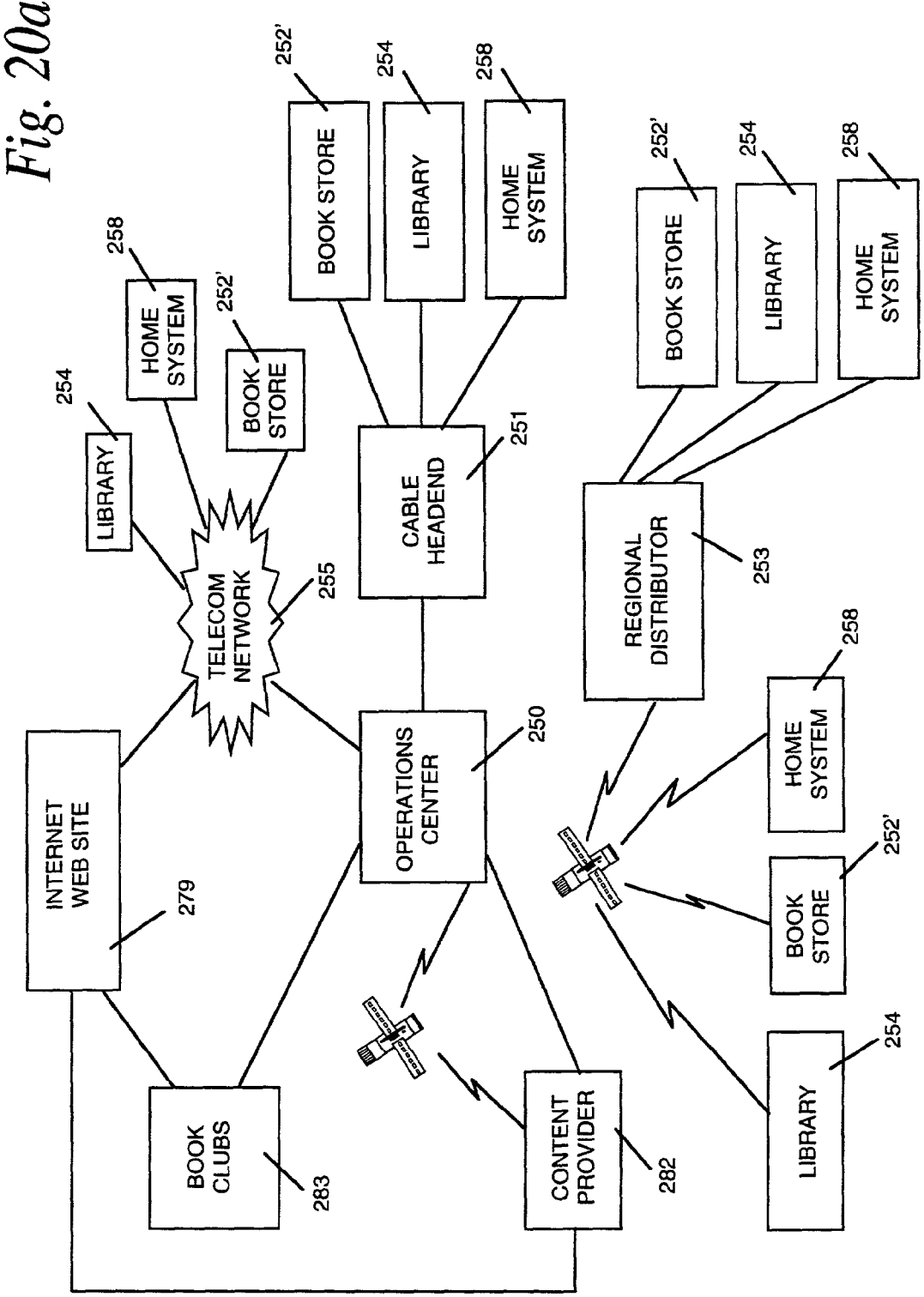

VIRTUAL ON-DEMAND ELECTRONIC BOOK

RELATED APPLICATIONS

This application is a continuation-in-part of U.S. application Ser. No. 08/336,247 entitled ELECTRONIC BOOK SELECTION AND DELIVERY SYSTEM, filed Nov. 7, 1994, now U.S. Pat. No. 5,986,690 and U.S. application Ser. No. 08/160,194, entitled ADVANCED SET-TOP TERMINAL FOR CABLE TELEVISION DELIVERY SYSTEMS, filed Dec. 2, 1993, now U.S. Pat. No. 5,990,927 and U.S. application Ser. No. 08/906,469, entitled REPROGRAMMABLE TERMINAL FOR SUGGESTING PROGRAMS OFFERED ON A TELEVISION PROGRAM DELIVERY SYSTEM, filed Aug. 5, 1997 now U.S. Pat. No. 6,408,437 which is a continuation of U.S. application Ser. No. 08/160,281, entitled TERMINAL FOR SUGGESTING PROGRAMS OFFERED ON A TELEVISION PROGRAM DELIVERY SYSTEM, filed Dec. 2, 1993, which is now U.S. Pat. No. 5,798,785, dated Aug. 25, 1998, U.S. application Ser. No. 09/237,828, filed on Jan. 27, 1999, entitled ELECTRONIC BOOK ELECTRONIC LINKS, and U.S. application Ser. No. 09/237,827, filed on Jan. 27, 1999, entitled ELECTRONIC BOOK HAVING LIBRARY CATALOG MENU AND SEARCHING FEATURES, U.S. application Ser. No. 09/289,958, filed on Apr. 13, 1999, entitled INTERACTIVE ELECTRONIC BOOK, U.S. application Ser. No. 09/289,957, filed on Apr. 13, 1999, entitled ELECTRONIC BOOK ALTERNATIVE DELIVERY SYSTEMS, and U.S. application Ser. No. 09/289,956, filed on Apr. 13, 1999, entitled ELECTRONIC BOOK ALTERNATIVE DELIVERY METHODS. This application is also related to co-pending application filed together herewith entitled METHOD FOR VIRTUAL ON-DEMAND ELECTRONIC BOOK. These patents and applications are incorporated by reference herein.

TECHNICAL FIELD

This invention is directed to on-demand delivery of electronic books. More specifically, the invention is a virtual on-demand electronic book delivery system and method. typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

An electronic book selection and delivery system is a new way to distribute electronic books to bookstores, public libraries, schools and subscribers. The technological breakthroughs of this invention provide a secure system for both delivering selected electronic books and receiving payments. The system has an unusual combination of features that provides the subscriber with an electronic book viewer that has a high tech aura while being very practical, portable, and easy to use.

The clear advantage of the system is that it eliminates the distribution of a physical object such as a paper book from a book or text distribution system. The purchase of an electronic book may become a PAY-PER-READ™ event, avoiding the overhead, "middle-men," printing costs, and time delay associated with the current book distribution system. Published material and text such as the President's speech, a new law, a court decision on abortion, or O. J. Simpson's testimony can be made immediately available to the subscriber at a nominal fee.

The system is a novel combination of new technology involving the television, cable, telephone, and computer industries. The system uses high bandwidth data transmissions, strong security measures, sophisticated digital switching, high resolution visual displays, novel controls, and subscriber-friendly interface software.

The primary components of the system are the subsystem for placing the text onto a signal path and the subsystem for receiving and selecting text that was placed on the signal path. An embodiment of the system includes additional components and optional features that enhance the system. The system may be configured for use by bookstores, public libraries, schools and subscribers.

The system for subscriber use is made up of four subsystems, namely: (1) an operations center, (2) a distribution system, (3) a home system including reception, selection, viewing, transacting and transmission capabilities, and (4) a billing and collection system.

The operations center performs several primary functions: manipulating text data (including receiving, formatting and storing of text data), security encoding of text, cataloging of books, providing a messaging center capability, and performing uplink functions. The system delivers the text from the operations center to subscriber homes by inserting text data into an appropriate signal path. In an embodiment, insertion of text is generally performed with an encoder at an uplink site that is within or near the operations center. If the signal path is a video signal path, the system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable, satellite, wireless or broadcast transmission capability without disruption to the subscriber's video reception. Using the entire video signal, thousands of books may be transmitted within just one hour of air time. Nearly any analog or digital video distribution system may be used to deliver the video signal with included text. The operations center may also use the Internet for delivery of electronic books. Such an operations center may include one or more web servers, delivery servers and transaction servers. The servers may be co-located, or may be linked by a high speed network, including the Internet.

The text data may also be transmitted over other low and high speed signal paths including a telephone network (e.g., a public switched telephone network) having a high speed connection such as a digital subscriber line (DSL) connection.

The home system performs four primary functions: connecting to the video distribution system, selecting text, storing text, and transacting through a phone or cable communicating mechanism. The components of the home system may be configured in a variety of hardware configurations. Each function may be performed by a separate component, the components may be integrated, or the capability of existing cable set top terminals and televisions may be utilized. A connector, library unit and an electronic book viewer unit are used in one embodiment. In another embodiment, all the functions of the home system are included in the single viewer unit. The connector portion of the home system receives the electronic book signal and strips or extracts the text from the signal. The library stores the text signal, provides a subscriber-friendly software interface to the system and processes the transactions at the subscriber's home. The viewer provides a screen for viewing text or menus and novel subscriber-friendly controls.

The viewer may be a portable book-shaped device that stores one or more electronic books for viewing and provides a screen for interacting with the library. A high resolution LCD display is used to both read the books and to interact with the library software. An optional phone connector or return-path cable connection initiates the telephone calls and, with the aid of the library, transmits the necessary data to complete the ordering and billing portion of the subscriber transaction. The subscriber-friendly controls include a bookmark, current book and page turn button. The billing and collection system performs transaction management, authorizations, collections and publisher payments automatically utilizing the telephone system.

True "on demand" electronic book delivery systems require infrastructure designed and sized for worst-case peak demand service. For example, in the case of an on-demand electronic book service, the infrastructure would have to be designed to support concurrent downloading of content to the maximum number of subscribers all accessing and attempting to download electronic book content at the same time. In practice, both statistical and historical data are used to limit the design infrastructure because there is a low probability that all subscribers will actually demand service at the same time. In this case, the design can allow for a grade of service that will block access to some subscribers with a low probability of occurrence. As an example, assume a service with 1000 subscribers, where statistical and historical data indicate that the probability of having more than 100 simultaneous subscribers at any time is 0.01. The system can be designed with a 99% grade of service (i.e., at peak time, a subscriber has a 99% chance of receiving on-demand service) by an infrastructure that supports simultaneous downloading of content to 100 subscribers.

However, even with these design approaches, there are two fundamental problems:

Systems and infrastructure must be designed to support a particular grade of service at the busiest time of use, and Subscribers will not receive on demand service if the design grade of service loading is exceeded.

The subject invention eliminates both of these problems, and allows for implementation of economic and efficient infrastructures. Further, the invention provides for increased ease of use by electronic book subscribers and increased promotional, marketing and sales opportunities for electronic book content suppliers.

The invention is entitled "virtual" books on demand because from the perspective of book subscribers, the service appears to be true on-demand, while from the perspective of system and infrastructure design, efficiencies in service can be obtained because the downloading of content does not have to be on-demand.

The electronic book-on-demand system includes mechanisms for broadcasting content from centralized sources to electronic book home systems. The general approach to broadcasting content has two fundamental concepts. First, popular content is broadcast on a cyclical basis and is available to multiple subscribers at any given time. Popular content may be content that is requested by a large number of subscribers or is promoted heavily by content providers. Second, less-popular content is transmitted upon specific request by subscribers. For example, a New York Times "best seller" may be transmitted cyclically while an obscure classroom textbook may be transmitted only on request by a specific subscriber. In this model, content can be viewed as a queuing model, where the broadcast medium (or media) services the queued content elements. As with any queued system, there are queuing delays from the time an element is requested until the item can be sent. These delays are variable, based on the number of items queued and the number of concurrent or overlapping requests to queue new content. As such, during non-busy times, requests for specific content are likely to be serviced on-demand, that is, there will be a very small delay due to queuing. However, with traditional approaches at busy times the delay may be substantial, and the service may not be able to meet the subscriber's expectation of on-demand service.

By moving the content from a central broadcast point to the electronic book or local library system, the electronic book-on-demand system can avoid the queuing delay problem. For example, if a subscriber's electronic book was downloaded with all of the popular content, the subscribers would have true on-demand access to this content without the need to download the content upon the subscriber's request. Although this approach works well from the subscriber's perspective, it is unreasonably inefficient in the use of extensive storage media in the book.

However, if the book unit contained the first "n" pages of content from each popular book (the "First Section" rather than the entire book) the subscriber could begin accessing the content immediately, while the remaining content is queued for transmission (or captured as a cyclical transmission of the electronic book) based on the subscriber's interest in this content.

The invention includes this approach of broadcasting the first section of multiple content elements, storage of these sections in the viewer or library unit, and subsequent queuing and reduced cyclical broadcasting of content in a background mode rather than an on-demand mode. True on-demand broadcasts then may be reserved for the first sections of less-popular (i.e., content that does not warrant any cyclical broadcasting) content specifically requested on-demand by system subscribers.

BRIEF DESCRIPTION OF DRAWINGS

The invention will be described with reference to the following drawings, wherein like numerals refer to like elements, and wherein:

FIG. 2 is a schematic showing an overview of the electronic book selection and delivery system;

FIG. 14a is a schematic of an introductory menu;

FIGS. 14c, 14d, 14e, 14f, 14g, 14h, 14i, 14j and 14k are schematics showing examples of submenus;

FIG. 19b shows a decision tree for the processing routines of FIG. 19a;

FIGS. 20a-20e are block diagrams of alternative book-on-demand system;

FIG. 21b is a diagram of a state machine for the system of FIG. 21a;

FIG. 22b is a diagram of a state machine for the system of FIG. 22a;

DISCLOSURE OF INVENTION

Figure 1:
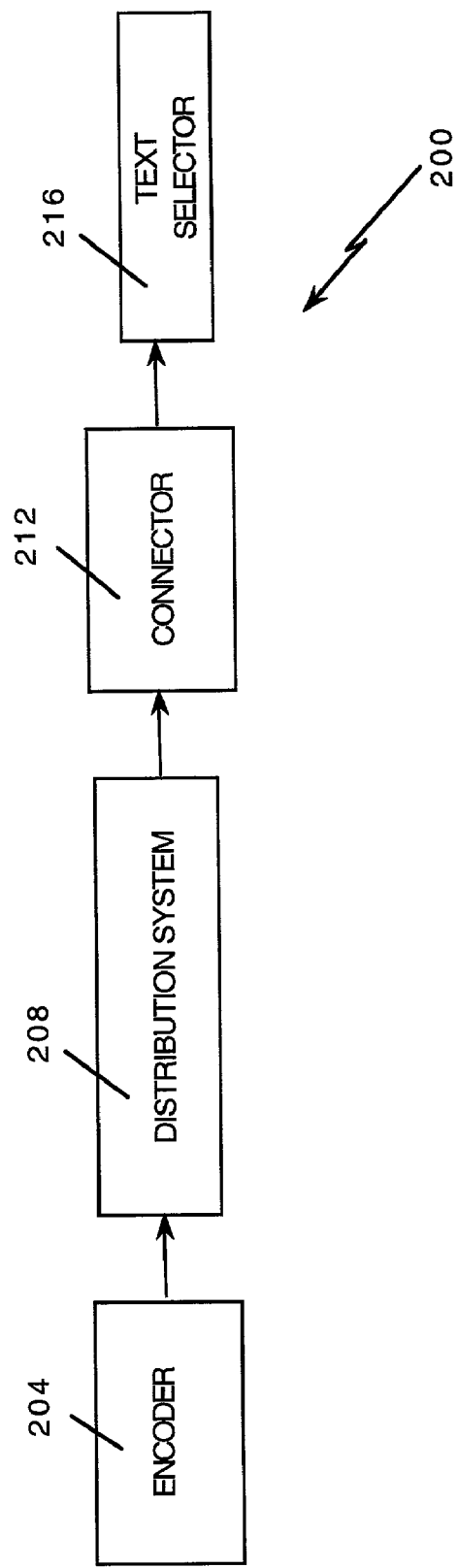
FIG. 1 is a block diagram of the primary components of the electronic book selection and delivery system.

FIG. 1 shows an embodiment of an electronic book selection and delivery system 200. The components of the electronic book selection and delivery system 200 are an encoder 204, a distribution system 208, a connector 212, and a text selector 216. Electronic book "text" may also include any electronic book content including video, audio or graphics. The system 200 may use a video signal, for example, to distribute electronic books. In this example, the encoder 204 places textual data on a video signal to form a composite video signal. The composite video signal may be an analog or a digital signal. Although the composite signal may contain only textual data, it also may carry both video and textual data. A variety of equipment and methods may be used to encode text data onto a video signal. The distribution system 208 distributes the composite video signal from the single point of the encoder 204 to multiple locations which have connectors 212. The connector 212 receives the digital or analog video signal from the distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from the composite video signal are possible. Text may be preselected, selected as received or selected after being received and stored. In a method the connector 212 strips or extracts all the text from the composite video signal and the text selector 216 screens all the text as received from the connector 212. The text selector 216 only stores text in long term or permanent memory if the text passes a screening process described below.

An overview of the delivery system 200 is shown in FIG. 2. The delivery system 200 includes: an operations center 250 including an uplink site 254, the distribution system 208, a home system 258 including the connector 212, a library 262, a viewer 266, and a connector 270, telecommunications system 274, Internet web sites 279 and 279', an intranet 281, and a billing and collection system 278. Also as shown in FIG. 2, the home system 258 may include connections to a television 259 and a personal computer 261. The television 259 and the personal computer 261 may be used to display menu screens, electronic books, electronic files, or any other information associated with the delivery system 200. In addition, the television 259 and the personal computer 261 may provide control functions that replicate and supplement those of the viewer 266 and the library 262.

The operations center 250 receives textual material from outside sources, or content providers 282, such as publishers, newspapers, and on-line services. Alternately, the outside sources 282 may maintain electronic books at the Internet web site 279. The outside sources 282 may convert textual and graphical material to digital formats, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines, newspapers, periodicals, catalogs or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance," "Four Child Reading Books (Ages 10-12)," "Encyclopedia 'BRITANNICA'™," "President's Speech," "Instruction Manual," "Schedule of 4th of July Events," "Pet Handbooks," "Roe v. Wade," and "The Joy of Cooking" are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book and a picture of tickertape a title for a business book. The term "electronic book" refers to the electronic counterpart to a book, i.e., an electronic file. The electronic book may include any content including text, video, audio, and graphics. The term "an interactive electronic book" refers to a book-counterpart electronic file with interactive features.

In an embodiment, the operations center 250 includes an uplink site 254 for placing the text onto a video signal and sending the composite video signal into a video distribution system. The uplink site 254 may include the encoder 204 (not shown in FIG. 2) to encode the text onto the video signal.

Many analog and digital distribution systems 208, or other telecommunications systems, can be used with the delivery system 200, such as a cable television distribution system, a broadcast television distribution system, video distributed over telephone systems, distribution from the Internet, direct satellite broadcast distribution systems, and other wired and wireless distribution systems.

The home system 258 performs five primary functions: (1) connecting with the distribution system 208, (2) selecting data, (3) storing data, (4) displaying data, and (5) handling transactions. An optional function of the home system 258 is communicating using the telecommunications system 274. The home system 258 is made up of primarily four parts: the connector 212 or similar type of connector for connecting with the distribution system 208, the library unit 262 for storing and processing, the viewer 266, for viewing and manipulating menus and electronic books, and the connector 270 for connecting the telecommunications system 274. In an alternate arrangement, the viewer 266 may include all the functionality and components of the home system 258.

The billing and collection system 278 may be co-located with the operations center 250 or located remote from the operations center 250. The billing and collection system 278 may communicate with the home system 258 using the telecommunications system 274, for example. Any of a number of telecommunication systems, such as a cellular system, will operate with the billing and collection system 278. The billing and collection system 278 records data related to the electronic books or portions of text that are selected or ordered by the subscriber. The billing and collection system 278 may charge a subscriber's credit account or bill the subscriber. In addition, the billing and collection system 278 may monitor the amount due to publishers or other outside sources 282 who have provided textual data or other services such as air time to enable the delivery system 200 to operate.

When electronic books are provided via the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required.

The Internet web site 279' may be used in conjunction with the home system 258 to provide additional functionality. For example, the Internet web site 279' may be a college professor's Internet web site that is used to post examinations for use with an interactive electronic book, and at which the students may post completed examinations, for example. The Internet web site 279' may also be a chat room, bulletin board, or news group site that is used to communicate information related to one or more electronic books.

The intranet 281 may be a local network linking together a number of related subscribers. For example, a university may establish an intranet for its students. Connections may be provided in dormitory rooms, or through use of an interface device for off-campus students. The intranet 281 may include a connection to the university's library so that electronic books maintained by the university may be provided to the students. The intranet 281 may also include web sites for the university's professors, similar to the Internet web site 279'. In this case, all the functionality of the Internet web site 279' would be included in the web sites in the intranet 281.

Figure 3A:
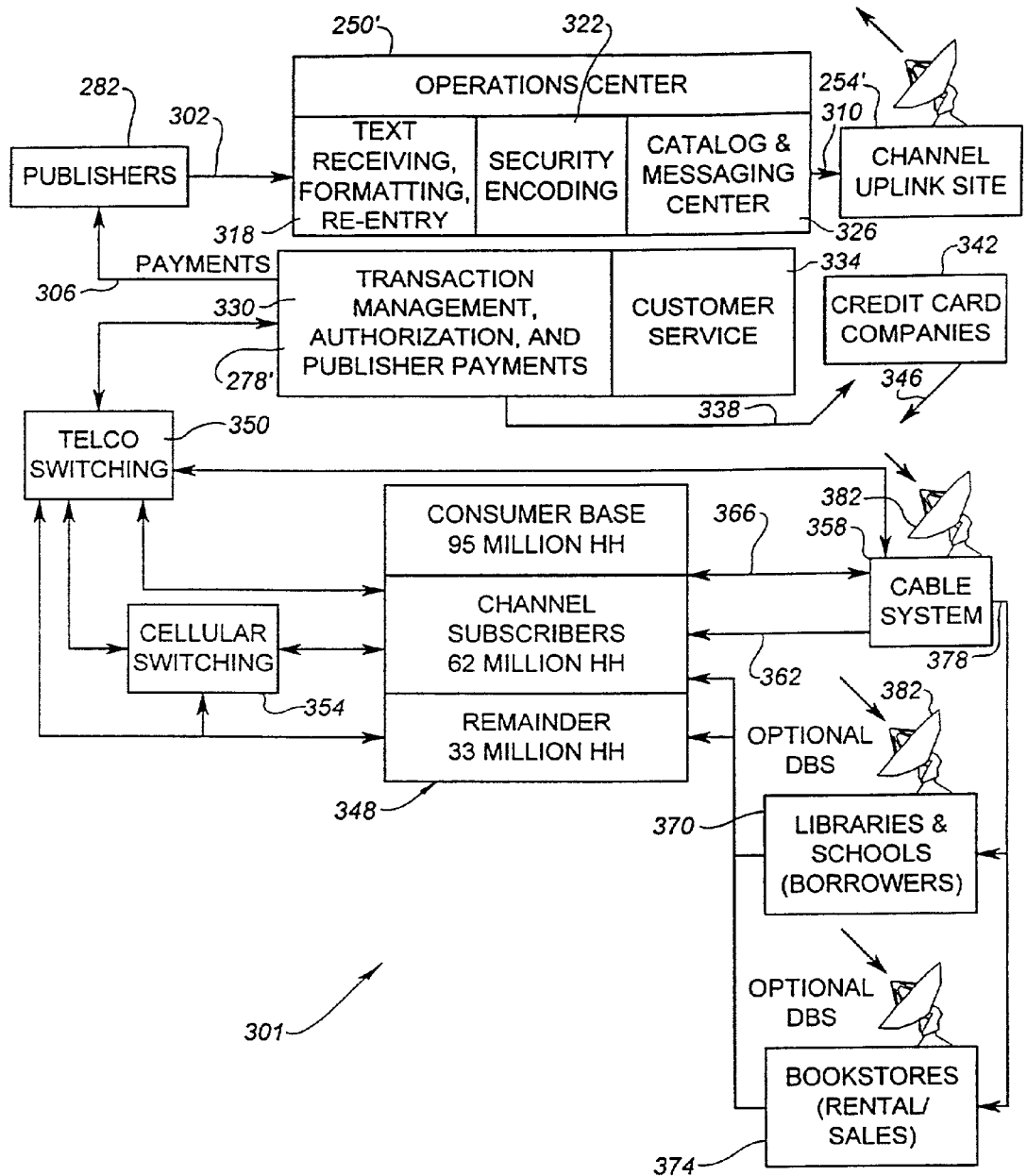
FIG. 3a is a schematic of the delivery plan for the electronic book selection and delivery system.

FIG. 3a is an expanded overview of a delivery plan 301 for the delivery system 200. The delivery plan 301 supports various types of subscribers and various billing systems. FIG. 3a shows that publishers 282 will provide text transfer 302 to an operations center 250' and receive payments 306 from a billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The billing and collection system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods for communicating between customer base 348 and the billing and collection system 278' are shown: by telephone switching 350 alone, cellular switching 354 and telephone switching 350 combined, and by use of the cable system 358 and the telephone switching 350. The system shown supports both one-way 362 and two-way 366 cable communication with customers. Public libraries and schools 370 as well as bookstores 374 may use the delivery system 301.

Public libraries and schools 370 may have a modified system to allow the viewer 266 to be checked-out or borrowed while bookstores 374 may rent or sell the viewer 266 and sell the electronic books. The bookstores 374 as well as the public libraries and schools 370 may be serviced by cable 378. Optional direct broadcast systems (DBS) 382 can also be used with the delivery system 200. The DBS 382 may provide the electronic books using digital satellite technology, with the electronic books being received via a backyard satellite antenna, for example.

Figure 3B:
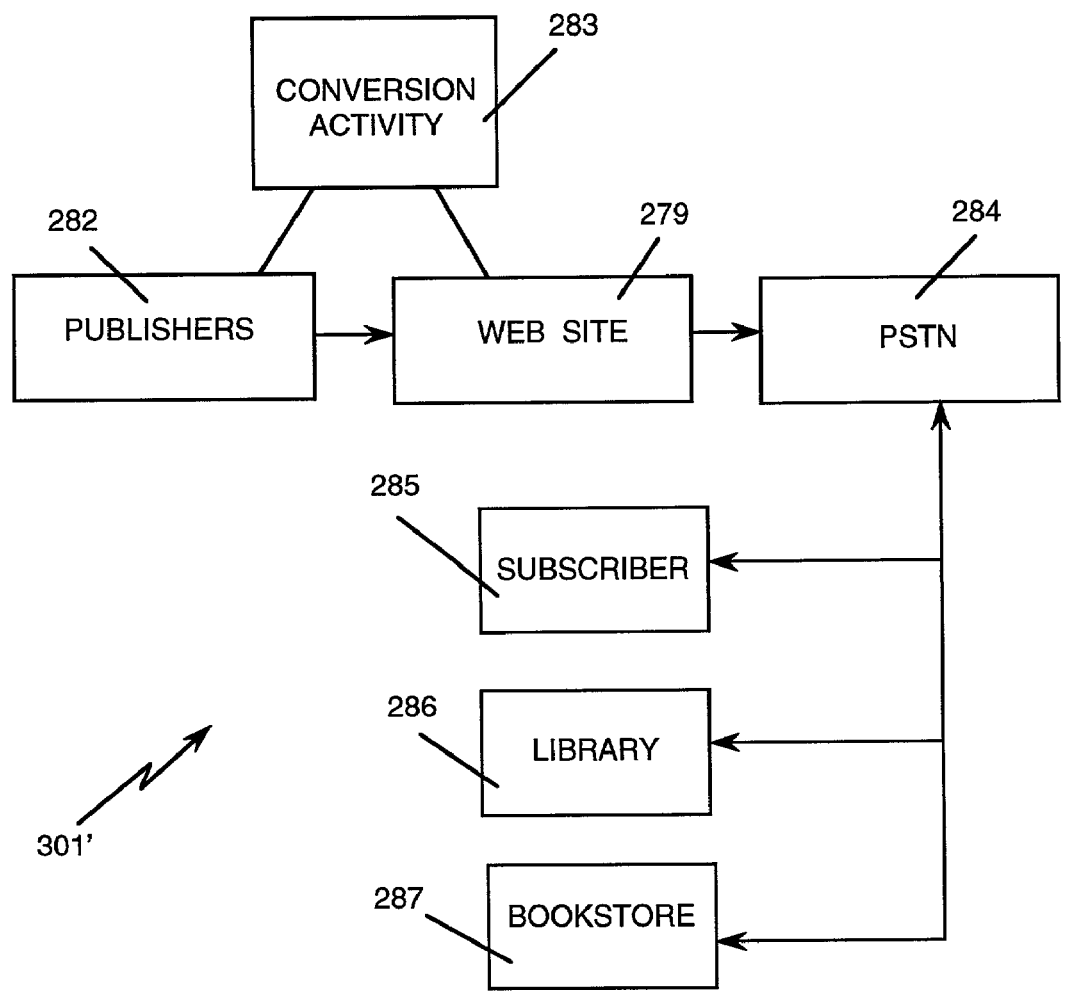
FIG. 3b is a schematic of an alternate delivery plan.

FIG. 3b is an alternate delivery plan 301' that provides for electronic book selection and delivery using the Internet. In FIG. 3b, the publishers 282 provide the electronic books to be posted at the Internet web site 279. The publishers 282 may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred via a public switched telephone network (PSTN), for example, direct to a subscriber 285, a library 286 and a bookstore 287. The library 286 and the bookstore 287 may also provide electronic books to the subscriber 285.

I. The Operations Center

Figure 4:
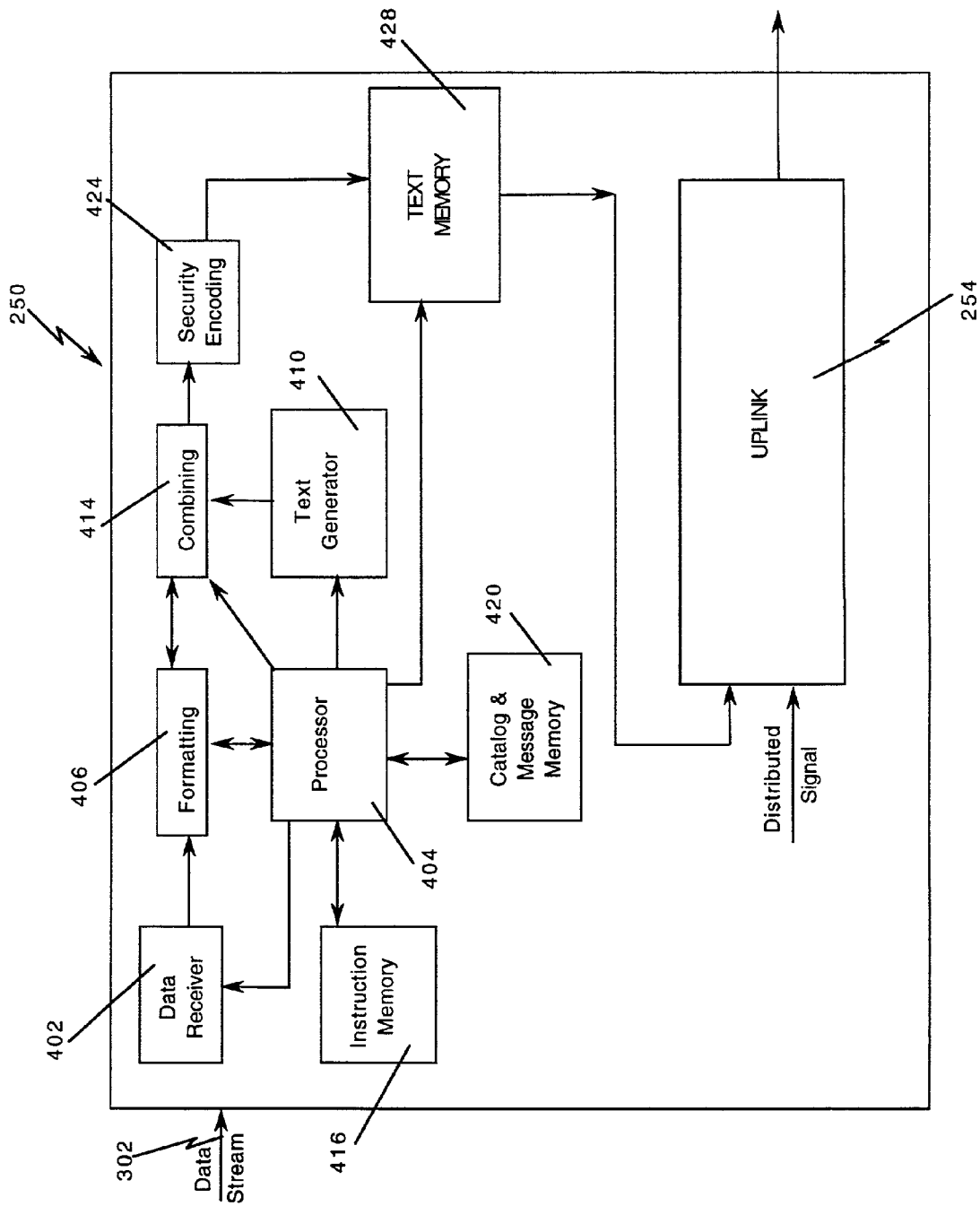
FIG. 4 is a block diagram of an operations center.

FIG. 4 is a schematic of the operations center 250 which includes the uplink 254. The operations center 250 gathers text or books by receiving, formatting, storing, and encoding. A data stream 302 containing text is received at the operations center 250 by a data receiver 402. The data receiver 402 is under the control of a processor 404. After reception, the data stream is formatted using digital logic for formatting 406 which is also under the control of the processor 404. If any additional text is being generated at the operations center 250 locally for insertion into a distributed signal, the text generation is handled through text generator hardware 410 which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404, which uses an instruction memory 416. The processor 404 and instruction memory 416 may be supplied by a personal computer or mini-computer. To perform the catalog and messaging functions, the operations center 250 uses a catalog and message memory 420 and the text generator 410 if necessary.

The data stream of text, catalog and messages may be encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool electronic books for transmission as is described below.

To transmit textual data (i.e., electronic books), the delivery system 208 may use high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, electronic books may be transmitted over a dedicated channel, which interrupts programming so that 246 lines of video can be used to transmit approximately 2,250 books every hour (3.9 Mbits per second). A teletext type format is the simplest but possibly the slowest text format to use with the delivery system 200. In either event, an encoder 204 is utilized at an uplink site 254 to insert textual data into the analog video signal. In many other respects, the delivery of the textual information is completed using existing cable television plant and equipment.

Figures 5A, 5B:
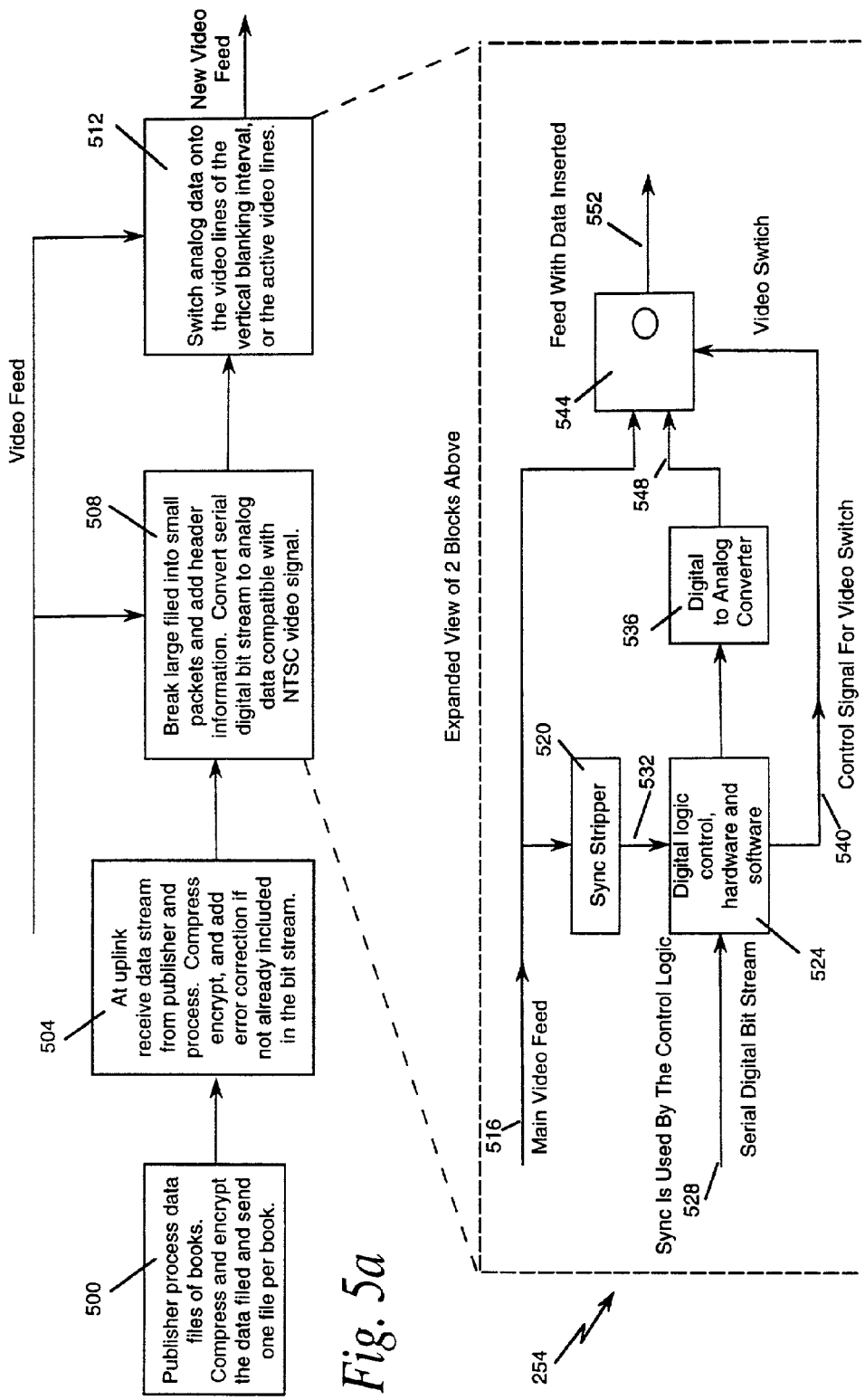
FIG. 5a is a flow diagram of the processing at the operations center.
FIG. 5b is a block diagram of the hardware configuration for an uplink site.

FIG. 5a is a flowchart of the steps involved in an embodiment of processing text from the publisher or content provider 282 that occurs at the operations center 250. As shown in block 500, the publisher 282 processes data files of text for books, compresses, encrypts and sends the data files to the operations center 250 or uplink 254. Text files for books may be sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is generally placed either in the VBI or the active video lines. In some instances, it may be preferable to utilize unused portions of bandwidth (such as 5-40 MHZ, 70-75 MHZ, 100-109 MHZ or other guard bands) instead of the video lines.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, satellite, broadcast, or other television delivery methods, the public telephone system may be used to transmit books to the subscribers. An average electronic book would take about 7 minutes to transmit over the public telephone system. Using the telephone system, it is not necessary to combine video and text into a composite signal. In most other respects, the operations center 250 would remain similar whether text delivery was by telephone or cable. File server technology (such as that described in U.S. Pat. No. 5,262,875, entitled AUDIO/VIDEO NILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operations center 250 with a telephone system text delivery method.

As another alternative to cable, television, and telephone system delivery, the public telephone system may be used to provide access to the Internet, where the Internet web site 279 (see FIG. 2) may be accessed. Electronic books may be ordered, paid for, and delivered directly from the Internet web site 279 over the telephone system.

In any delivery system using the telephone system, individual subscribers may increase the electronic book delivery rate by incorporating high speed modems or other communication devices such as an Integrated Services Digital Network (ISDN) connector, or by use of a Digital Subscriber Line (DSL)

II. The Home System

Figure 6A:
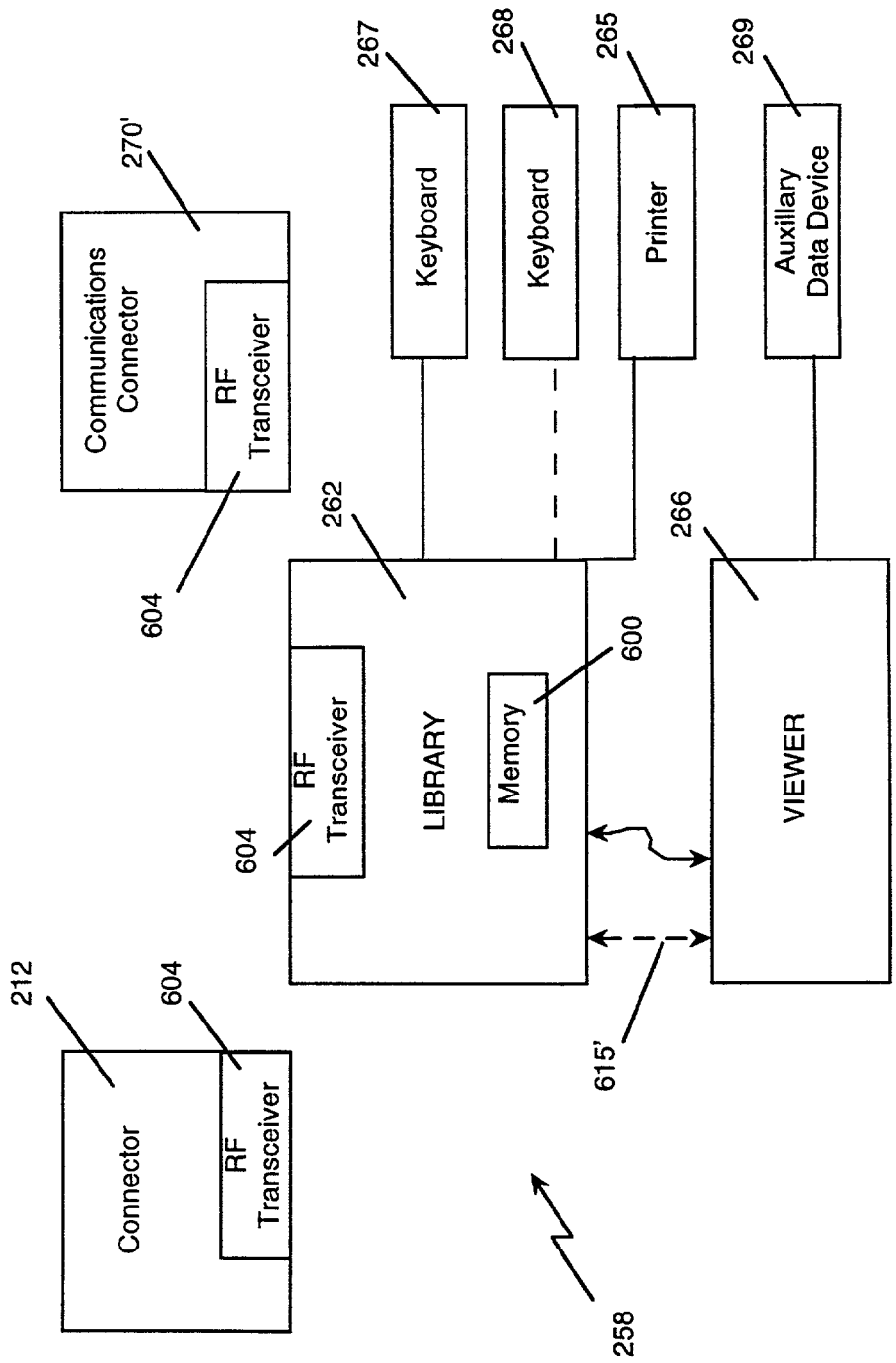
FIG. 6a is a block diagram of the hardware configuration for a multiple component home system.
Figure 6B:
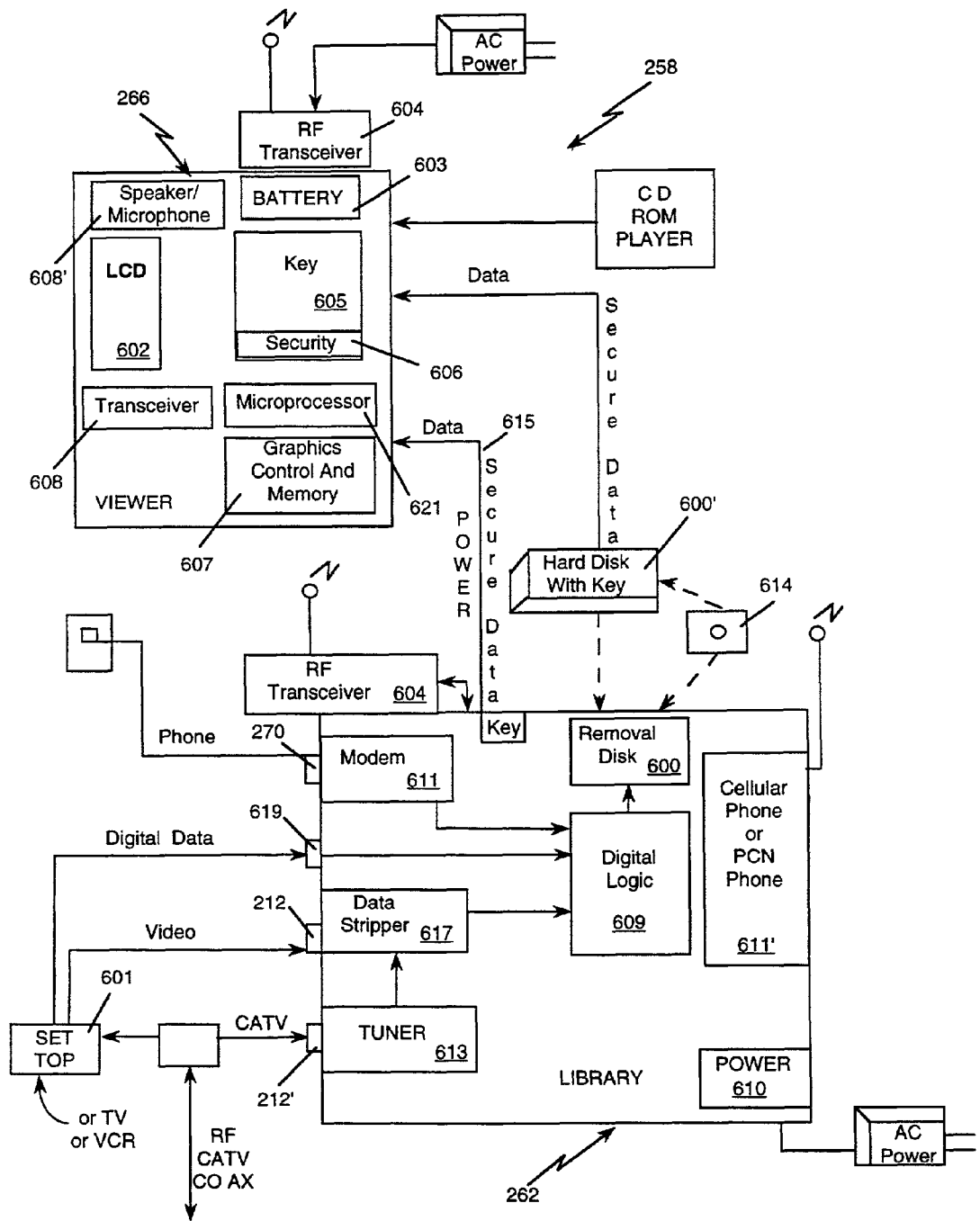
FIG. 6b is a schematic of a two-unit home system.

The hardware configuration for a multiple component home system 258 is shown in FIG. 6a. FIG. 6b shows a hardware configuration for a two component home system. The hardware components may also be incorporated into a single unit that communicates with a terminal in a television delivery system or with a telephone system by use of a modem, for example. The home system 258 performs several functions, such as receiving data and video transmissions, stripping (or extracting) the data from the video signal, screening and storing the data, providing subscriber-friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to use the reception and channel tuning capability of the current installed subscriber base of cable converter boxes and televisions 601. The home system 258 can be designed as an advanced set top terminal converter box with menu generation capability, electronic memory and a telephone modem as described in section V below. The home system 258 may also use other telecommunications systems such as the PSTN to receive electronic books.

The electronic components that make up the home system 258 may be arranged in a variety of ways. In the four unit system of FIG. 6a the viewer 266 and library unit 262 are wired together via a signal path 615 while the remaining components communicate through RF transceivers 604. Alternatively, the viewer 266 and the library unit 262 may communicate using RF signaling over wireless path 615'.

Also shown in FIG. 6a is an auxiliary data device 269, connected to the viewer 266, which may be a hand-held calculator or a separate disk drive or other data storage device, for example. A printer 265 may be connected to the viewer 266 and/or the library 262.

In an embodiment of the home system 258 there are only two units, the library 262 and the viewer 266. FIG. 6b shows a two unit home system 258 with certain optional features. Finally, all the functionality and components of the home system 258 may be incorporated into one electronic book unit, or viewer 266.

Referring to FIG. 6b, the viewer 266 may be equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library 262 contains the connector function to the distribution system 208, connector function to the telecommunications system 274, and memory 600 (which may be removable and portable 600'). More specifically, the library 262 may include data stripping functions 617, digital logic 609, the memory 600, power circuitry 610, optional telephone connections 611 (including cellular or PCN 611'), an optional battery (not shown), optional tuner module 613 and an optional RF transceiver 604. The video connector 212 and the telecommunications system connection 270, as well as the removable portable memory 600' of the library 262 may be broken out into separate components. (FIG. 6b shows a removable portable hard disk memory 600' with removable cartridges 614.) The home system 258 may include an attached keyboard 267 or a wireless keyboard 268 (shown in FIG. 6a). Both the attached keyboard 267 and the wireless keyboard 268 may be used to communicate with the viewer 266 or the library 262. The viewer 266 may also receive data from auxiliary data source 269 including a programmable, hand-held calculator and a separate disk drive or other data storage device, for example. The viewer 266 may output data and text, such as a portion of the electronic book, to the printer 265 or other display device.

The wireless keyboard 268 may communicate via radio frequency (RF) signaling, for example. Therefore, the home system 258 may have as many as six separate components that communicate with each other. The two, three, four, five or six separate components that make up the home system 258 can communicate with each other in a variety of ways, including hardwired connection 615, RF transceiver 604, and other wireless methods.

RF communications are preferred in the home because they allow separate components to be located throughout the home without restriction. The data communicated between the units is preferably secure data. In addition, the library 262 may provide power to the viewer 266 through the hardwired connection 615.

Alternatively, a single unit may perform all of the home system 258 functions. The single unit may use light-weight materials, including a light-weight battery. A single unit eliminates the need to communicate (externally) between units. The single unit is less expensive and eliminates duplicative processing, memory storage and power circuitry.

To receive and strip the data from the video signal at the subscriber's home, the connector 212, which may be either a cable interface device or cable connector, for example, is used. The cable connector device includes a tuner 613, while the cable interface device makes use of existing tuning equipment in the home. In either configuration, data is stripped from the video signal and stored at the subscriber's location in the library 262. The connector 270, and modem 611 initiate telephone calls and transmit ordering and billing information to the operations center 250 or billing and collection system 278. Alternatively, the connecter 270 and the modem 611 may be used to provide access to the Internet to order and receive electronic books from an Internet web site. A digital connector 619 is provided to communicate digital information with the set top 601. The library 262 incorporates the hardware and software necessary to store the text data, generate menus and effect the purchase transactions. In addition to an RF transceiver 604, the library 262 also includes the necessary jacks and connections to allow the delivery system 200 to be connected to the viewer 266. As shown in FIG. 6b, the library 262 communicates the text data (electronic book) to the viewer 266 in a secure format that requires a key 605 for decryption. The text may be decrypted page by page just before viewing.

a. The Connector

Figure 7:
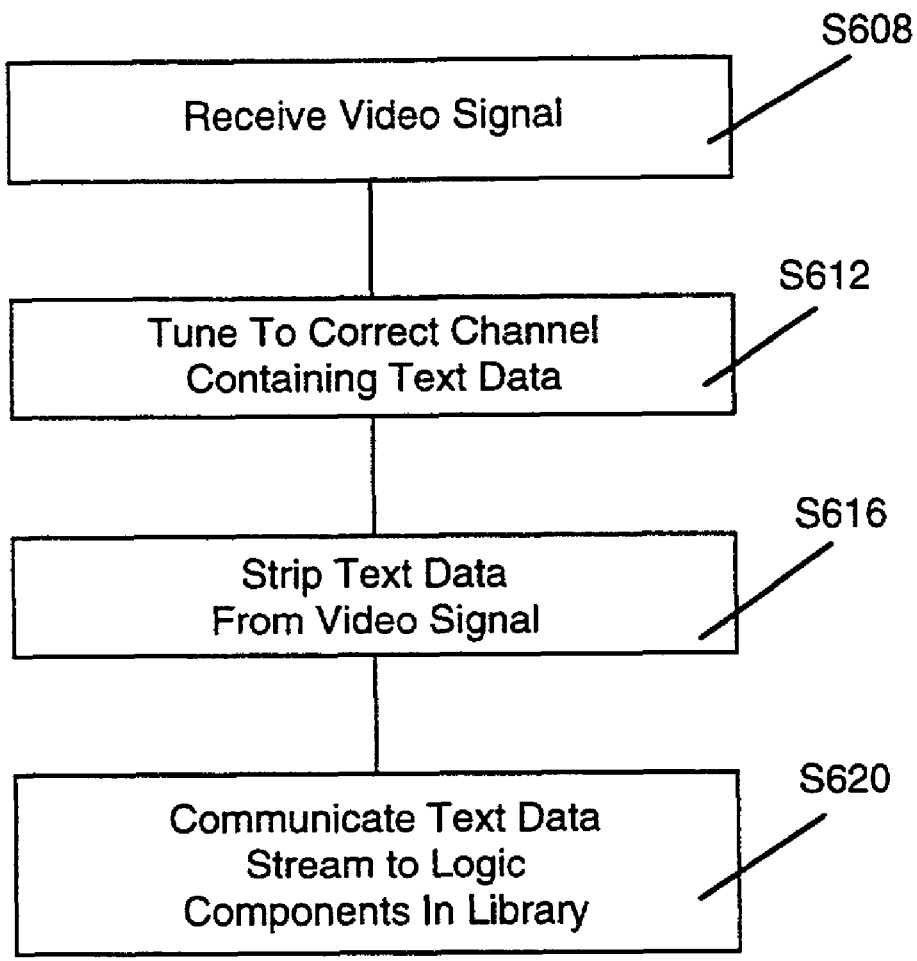
FIG. 7 is a flow diagram of the processes performed by a connector.

FIG. 7 shows the flow of the processes performed by the connector 212. In step S608, the connector 212 receives the video signal. In step S612, the connector 212 tunes to the channel containing the text data. Next, in step S616, the connector 212 strips the text data from the video signal. Finally, in step S620, the connector 212 communicates the text data stream to logic components in the library 262.

The connection to the distribution system 200 may be a cable connector 212' to a cable television delivery system, as shown in FIG. 6b. The cable connector 212' includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library 262. The data is embedded in the video signal either in the vertical blanking interval or the active video portion in an encrypted and compressed format. The data stripper circuit 617 can be placed inside the set top 601, the TV, or in the library 262. The data stripper circuit 617 outputs the digital bit stream to be used by the library digital logic 609.

The connector 212 may also contain a channel tuner module 613 that can tune to the video channel and provide access to the video that contains the data to be stripped. Using the optional tuner module 613, a set top, VCR, or TV tuner is not needed in the home system 258. The optional tuner module 613 would instead receive the video signal directly through the cable connector 212'.

b. Library

Figure 8:
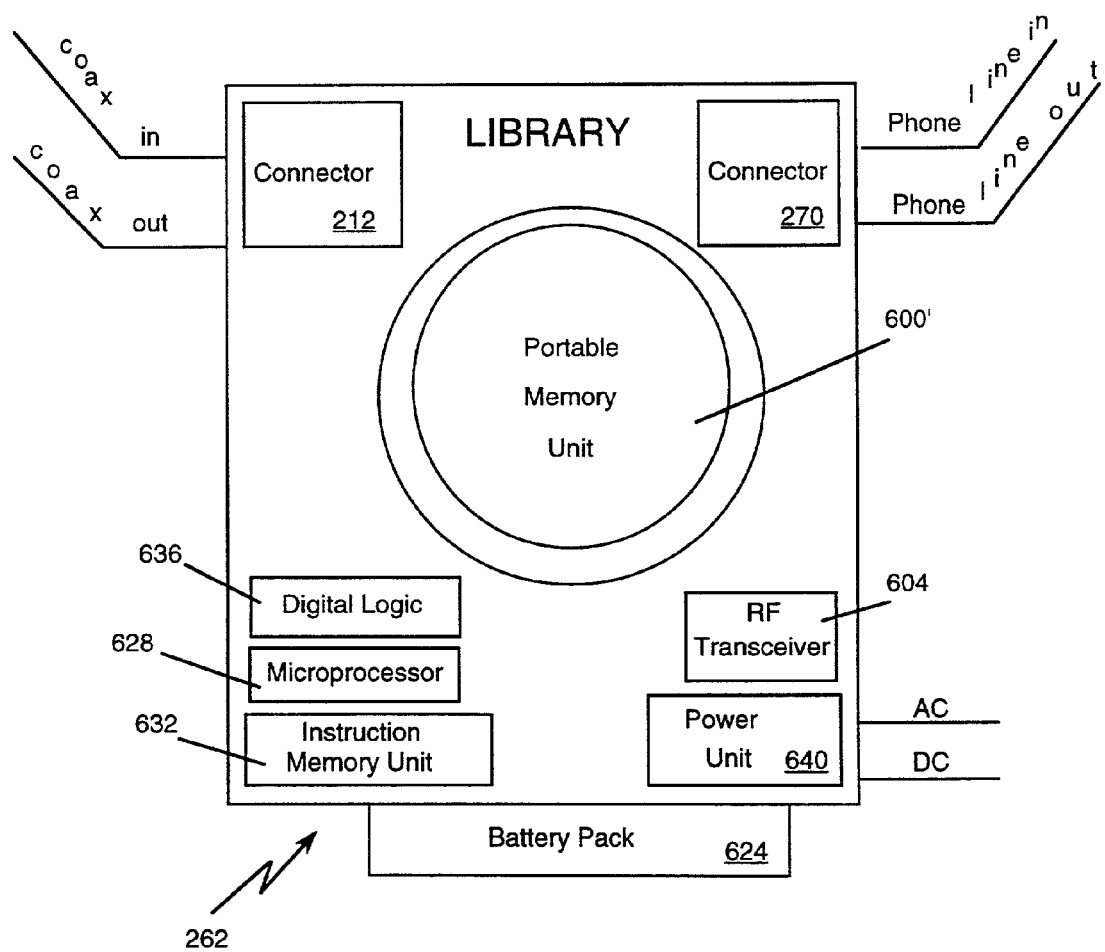
FIG. 8 is a block diagram for an example of a library.

An embodiment of the library 262 for a two unit home system 258 is shown in both FIG. 6b and FIG. 8. The embodiment shown includes the following optional parts: the connectors 212 and 270, RF transceiver 604, and battery pack 624 in addition to a removal portable memory 600', microprocessor 628, instruction memory unit 632, digital logic 636, and power unit 640.

The library 262 contains a digital logic section 609 (not shown in FIG. 8) that includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library 262 is authorized to receive the data, the data will be transferred to the memory storage unit 600, 600'. Authorization to receive the data is provided by the cable headend, operations center, or another distribution. An authorization code may be sent in the serial digital bit stream. The digital logic section 609 will send appropriate text and graphical data to the memory storage unit 600, 600'. The digital logic 609 transfers this data in a compressed and encrypted format and the data remains stored in a compressed and encrypted format.

i. Memory Storage Unit

The memory storage unit of the library 262 may be a removable portable memory unit 600' (as shown in FIGS. 6a, 6b and 8). A variety of options are available for memory storage: a hard disk drive, a hard disk with removable platters, and a CD ROM. Referring to FIG. 6b, a hard disk drive unit 600' that contains removable platters 614 may also be used. This would provide virtually unlimited library storage capacity. Data (i.e., electronic books) may be stored in the memory storage unit 600' in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit 600' to an unauthorized viewer. Small memory devices such as smart cards, electronic memory cards, PCMCIA cards (personal computer memory card industry association) or memory sticks, may also be used to store the data.

ii. Power Circuitry

As shown in FIGS. 6b and 8, the library 262 may accept power from either AC wall power 610, DC power 640, or optional battery power 624. The power circuitry 610, 640 may provide all the voltage necessary from either the battery 624 or AC unit for the various circuitry in the library 262. The power circuitry 610, 640 may also provide power to the viewer 266 through a single data cable when connected to the viewer 266. The power circuitry 610, 640 will recharge the battery using AC power when in operation. With the optional battery unit 624 installed, the library 262 becomes a portable unit and can still provide power to the viewer 266. In order to extend battery life, power conservation measures may be utilized, such as shutting down the memory system when not in use. When the viewer 266 is being utilized and the library circuitry is not being utilized, virtually all power may be shut down to the library 262.

iii. Connection to the Public Telephone System

The connection to the telephone system may be provided by a modem 611. Various available modems may be used to perform this function. As shown in FIG. 6b, cellular phone or PCN phone connections 611' may also be provided. When the home system 258 is first initialized, the modem 611 may be used to transfer the name and credit card information of the subscriber to the billing and collection system 278. The connection 270 may be utilized each time an electronic book is purchased by a subscriber to complete and record the transaction. The connection 270 may also be used as a means for receiving the electronic books from the operations center 250 or from an Internet web site, by-passing the distribution system 208. The phone connection 270 may be a separate unit as shown in FIG. 6b.

iv. Library Processing

Figure 9:
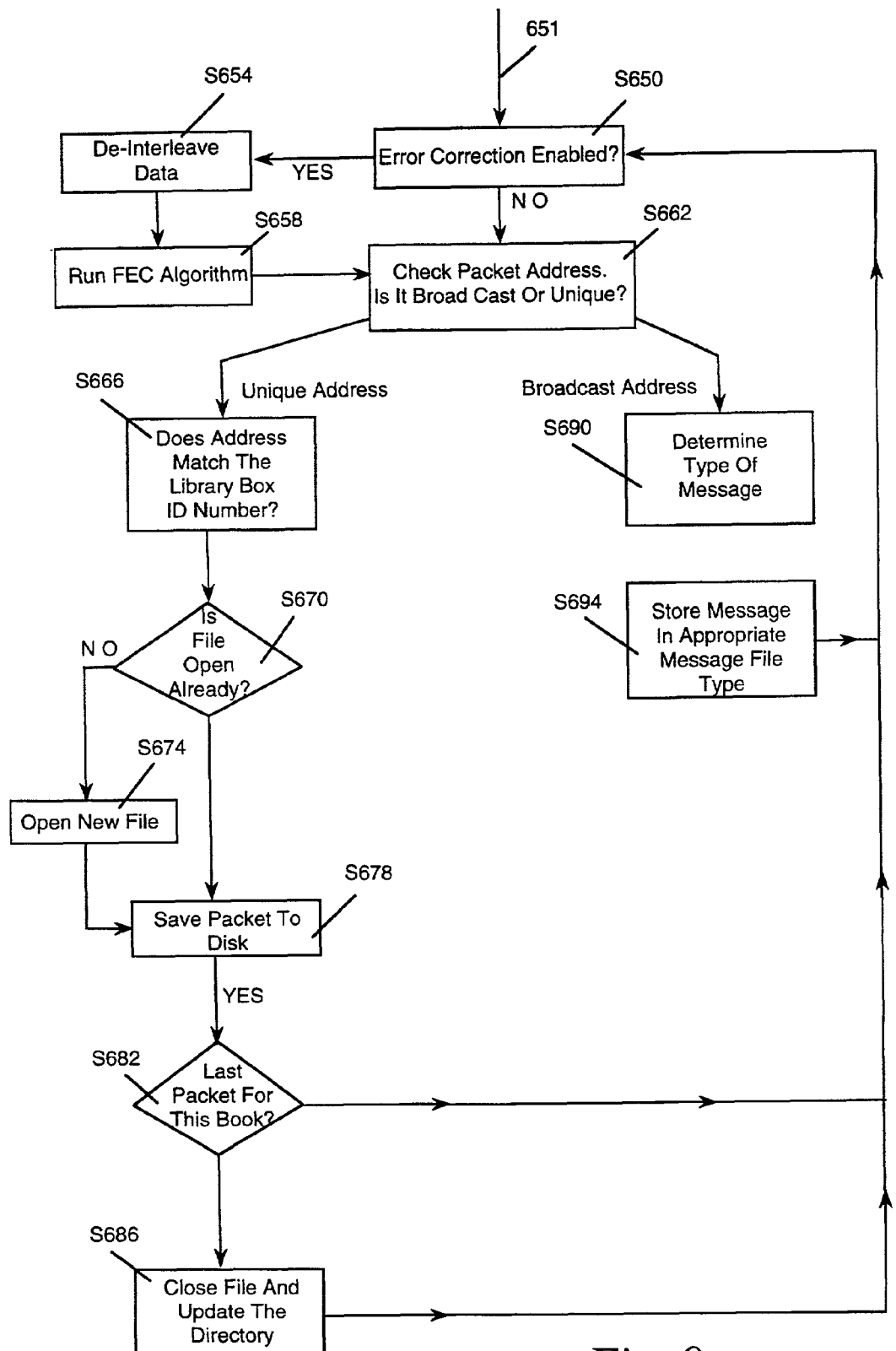
FIG. 9 is a flow diagram of some of the processes performed by the library on the received data stream.

FIG. 9 shows an example of some basic processing performed by the microprocessor 628 of the library 262 on the data stream 651 received from the connector 212 or stripper circuit 617. First the data stream 651 is checked for error correction in error correction step S650. If an error is detected, the microprocessor 628 de-interleaves the data (step S654) followed by running a FEC (Forward Error Correcting) algorithm in step S658. The combination of steps S650, S654 and S658 comprise the error correction process needed on the data stream 651. If no error correction is necessary the processing moves to step S662 where packets are individually checked for packet address by the microprocessor 628.

If the address is a unique address, in step S666, the microprocessor 628 checks whether the address of the packet matches the library 262 ID number. The library 262 ID number is a unique number associated with that library 262 and is used to ensure security of the data. In file open step S670, the microprocessor 628 determines whether an electronic file has already been opened into which the data packet can be saved. If no data file has been opened then in step S674, the microprocessor 628 opens a new data file for that packet. If an electronic file has been opened, then in step S678 the packet is saved in that electronic file on disk. Next, in step S682, the microprocessor 628 checks to see if this is the last packet for a particular book for a particular textual data block being received. If it is the last packet of information, then the electronic file is closed and the directory of available electronic files is updated in step S686. Following either step S682 or S686, the microprocessor 628 returns to receive another data packet from the data stream 651.

If the packet address is checked and the address is determined to be a broadcast address, in step S690, the microprocessor 628 determines the type of message that is being sent. The message may be an index of book titles, menu (and menu graphics) information, announcements, special offerings, discounts, promotions, previews etc. The message is then stored in appropriate electronic message file in step S694 and the microprocessor 628 returns to step S650 to receive another data packet and perform another error check.

Using the process of FIG. 9, the library 262 is able to receive, store and update directories related to the textual data and graphical data (that can be used to depict pictures in a given book or to generate menus). Variations of the processes are possible depending on the format of the data and operating system of the library 262.

Figure 10:
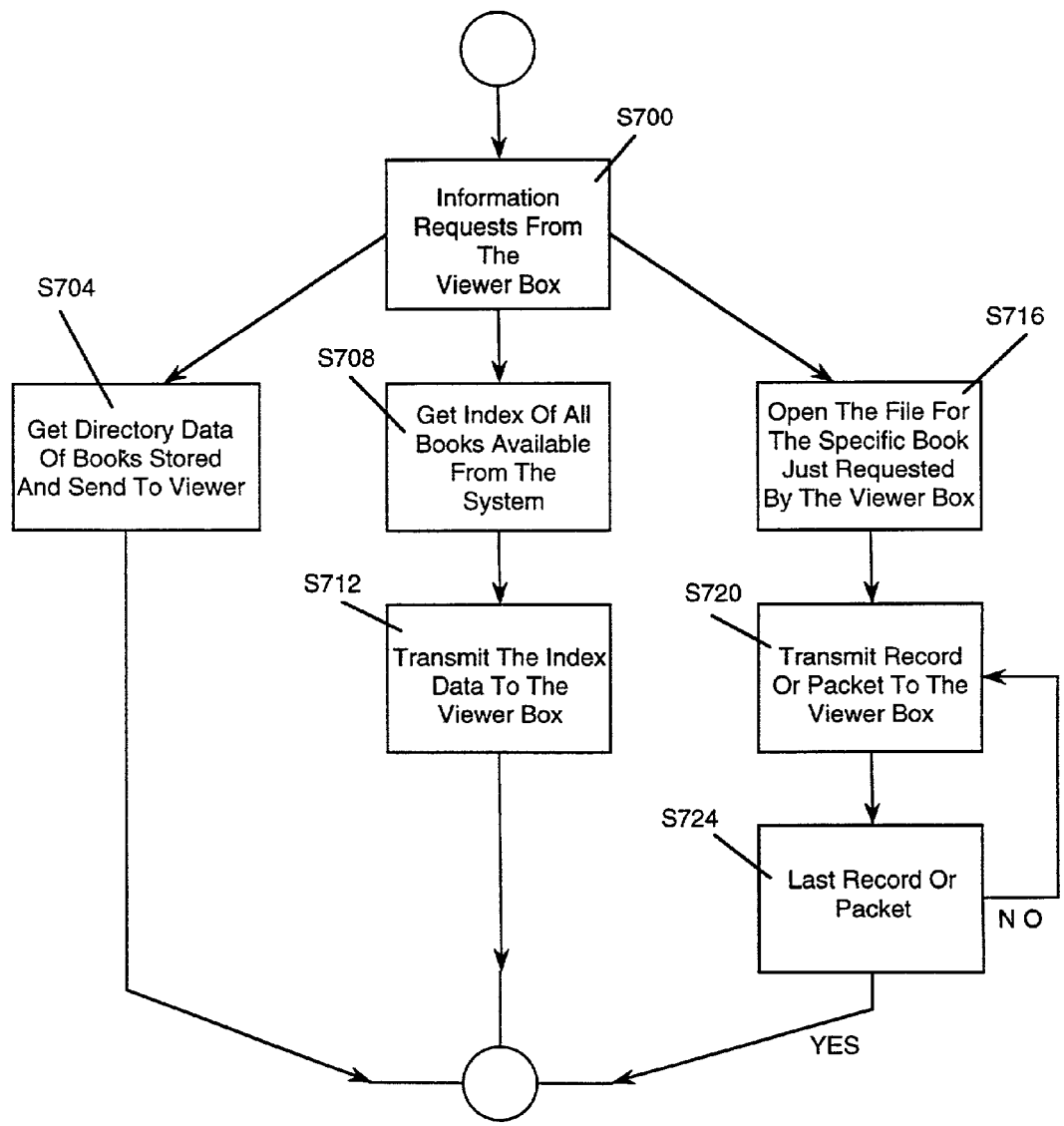
FIG. 10 is a flow diagram of the processes performed by the library on information requests from the viewer.

FIG. 10 shows an example of the processing of information requests from the viewer 266 at the library unit 262. Information requests from the viewer 266 are received either through the cable connecting the viewer 266 to the library 262 or through wireless transmissions, such as RF. In some embodiments, subscriber requests may come from a set top terminal 601 (see Section V).

Information requests received from the viewer 266 may fall into three categories: (1) directory data of electronic books stored in the library 262, (2) index of all available electronic books on the system 200, and (3) requests for a specific electronic book, the microprocessor may receive one of these requests in step S700. In step S704, the microprocessor 628 answers a request from the viewer 266 for a directory of data showing the electronic books stored at the viewer 266. The directory of data is sent to the viewer 266 so that it may be displayed to the subscriber. In step S708, the microprocessor 628 handles requests from the viewer 266 for an index of all available electronic books on the home system 258. The microprocessor 628 will obtain an index of all the available books on the system and transmit that index, with menu information to the viewer 266 in step S712. In step S716, the microprocessor 628 replies to a request from the viewer 266 for a specific electronic book. In step S720, the microprocessor 628 opens an electronic file for the specific electronic book requested by the viewer 266 and transmits the record or transmits the information on a packet-by-packet basis to the viewer 266. This process of transmitting the specific electronic book, record, or packets to the viewer 266 continues until the last record or packet has been sent.

In addition to the processes shown on FIG. 10 in handling a request for a specific electronic book, the library 262 also orders and receives specific electronic books from the operations center 250 or other distribution site using the process as described in step S716. Following a request for a specific electronic book that is not stored at the library 262, the library 262 may determine the next available time the electronic book will be on the distribution system 208 and ensure reception and storage of that electronic book (process not shown). In performing this process the library 262 may transmit to the viewer 266 information on when it will obtain the electronic book so that the subscriber may view the electronic book. In addition to timing information, price and other ordering information may also be passed by the library 262 to the viewer 266.

c. The Viewer

Figure 11:
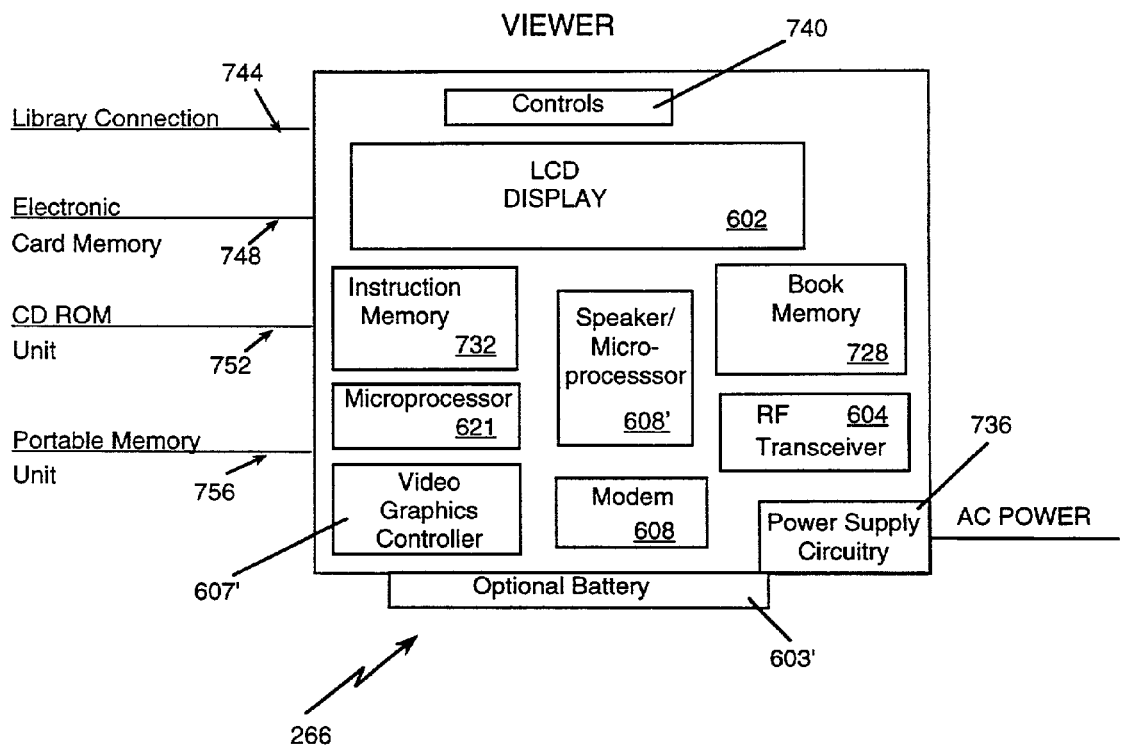
FIG. 11 is a block diagram showing the components for an example of a viewer.

FIG. 11 is a block diagram of the viewer 266 showing its internal components. The viewer 266 of FIG. 11 is similar to the viewer 266 depicted in FIG. 6*b*. The viewer 266 is designed to physically resemble a bound book. The viewer 266 may include five primary components and six (or more) optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, (9) optional cellular or mobile communicator (608), (10) optional keyboards 267 and 268, and (11) a speaker/microphone 608'.

(1) A high resolution LCD screen 602, preferably of VGA quality, is used by the viewer 266 to display text and graphic images. The screen is preferably the size of one page of a book. A two page screen or two screens may also be used with the viewer 266. Other flat panel displays, such as a plasma display, may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. The viewer 266 may be configured to not output text data or other data and that the data is decompressed and decrypted only at the moment of viewing and only for the current page being viewed. These measures provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the subscribers to select stored electronic books and electronic books from catalogues, move a cursor, and turn pages in a book. The controls 740 may include forward and reverse page buttons 742, 741, a ball (or trackball) 743 for cursor movement, one or more selection buttons 745, a current book button 747 and a bookmark button 749 (see FIG. 14*a*).

The controls 740 should be easy to use and conveniently located. Referring to FIG. 14*a*, the controls for the viewer 266 may be located below the screen 602 at the bottom portion of the viewer 266. The next page turn button 742 is the most used button 740 and may be located towards the right edge of the page. The subscriber is likely to use right hand thumb movements to work the controls particularly the page turn buttons 741, 742. Therefore, the buttons may be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown those buttons 747, 749 are located on the inside portion towards the binder of the viewer 266.

Locating the ball 743 or other cursor movement device (such as four pointer arrows—not shown) in the bottom center of the viewer 266 is both easier for the subscriber to use and easier in manufacturing the viewer 266. The selection buttons for the cursor 745 may be located below the middle diameter of the cursor ball 743 on the right and left sides of the ball as shown. If pointer arrows are used for cursor movement, a selection button 745 may be located in the center of the four arrow buttons (not shown). Again, the most used controls should be located where a subscriber's right hand thumb would normally rest.

The controls 740 may also include a touch-sensitive screen and various soft keys or buttons. In an embodiment, the controls 740 may include a soft keyboard or number pad.

(5) Book memory 728 for at least one electronic book or more of text is included in the viewer 266. The book memory 728 stores text and any graphics, video, or audio that represent content in a book. The book memory 728 can also store menu graphics data. Two different memory devices may be used in the viewer 266, one (732) for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books. The large hard disk drives currently available allow for storage of thousands of electronic books. Other memory devices, including removable memory devices, may be used in conjunction with the book memory 728. The book memory 728 may also store portions of electronic books, with remaining portions delivered to the home unit 258 at a later date.

Text for books may be displayed in various font sizes. To accommodate various fonts for display, a variety of fonts are stored in instruction 732 or book memory 728. Thus larger or smaller fonts may be recalled from memory 732 or 728 to create displays desired by the subscriber.

(6) Power supply circuitry 736 in the viewer 266 will accept power from either an AC power source or from an optional battery 603', or the library 262. The power supply circuitry 736 provides the necessary voltages to accommodate the various systems within the viewer 266.

(7) An optional battery 603' is provided in an embodiment. The battery 603' is automatically recharged when AC power is available.

(8) An optional RF transceiver 604 that provides a two-way data link between the viewer 266 and other components of the home system 258 can also be included in the viewer 266.

(9) The viewer 266 may include a cellular modem 608 for mobile communications.

(10) The optional wired (attached) keyboard 267 and wireless (e.g., RF) keyboard 268 (see FIG. 6*a*) may be used with the viewer 266 to provide communications between the subscriber and the viewer 266.

(11) The speaker and microphone 608' allow the viewer 266 to provide audio signals to the subscriber, and allow the subscriber to provide an audio input. The speaker and microphone 608' may be used in conjunction with the cellular modem 608 or other telecommunications equipment to provide for reception and transmission of telephony and data.

The viewer 266 of FIG. 11 has parts available for providing connections to: a library 744, electronic card memory 748, CD ROM units 752, and a portable memory unit 756 (such as that shown in FIG. 6*b* 600'). Various electronic memory cards such as PCMCIA can be used with this viewer 266.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 permanently or for a predefined period of time determined by the system operator. The software can be configured to allow the electronic book to be read during a period of time (i.e., two weeks) and then automatically erased, read once and erased, held in memory permanently, or overwritten by another electronic book. Preferably, each viewer 266 has a unique key 605. All of the data storage is encrypted with the key 605 for an individual viewer 266 to prevent more than one viewer 266 accessing the text file or electronic book file.

Figure 12:
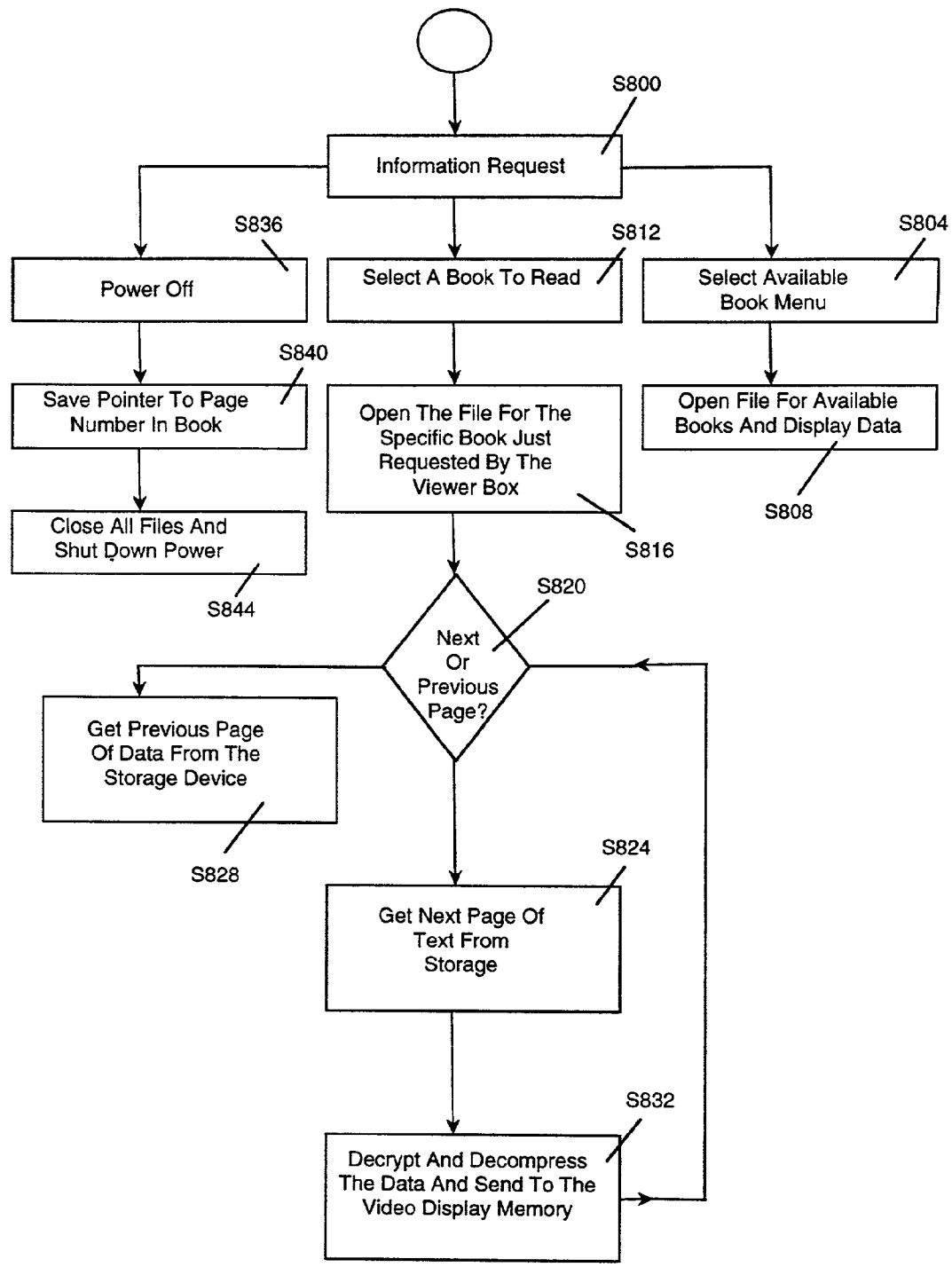
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. Alternately, the viewer 266 receives inputs from the touchscreen display, the attached keyboard 267, or the remote keyboard 268. In step S800, the subscriber's information requests are processed 800 by the viewer 266.

If the subscriber requests a menu of available electronic books, process block 804 will select a book menu. Process block 808 will open the electronic files which list the electronic books that are available (related to the category of topic of the menu) and display the menu with the names of the available electronic books. If the subscriber selects a particular electronic book to read, then process block 812 will process the selection and determine the electronic file that contains the specific electronic book. Process block 816 will open the file for that specific book and normally access the first page. (If a pointer has already been set in that electronic book's file, the process may default to that page.) Process block 820 will then determine which page needs to be displayed. Process block 820 will determine whether a next page, previous page or a book marked page needs to be displayed. If the pointer for the electronic file is not in the correct location then process block 828 will move the pointer and obtain the previous page of data from the stored file. Otherwise, process block 824 will normally obtain the next page of text from the stored electronic file. Process block 832 will decrypt and decompress the text data and send the data to the video display. The video display will generally have a video display memory associated with it and process block 832 will send the data directly to that video display memory. The circuitry for the display then completes the process of displaying the page of text. If the next page is not in storage, the viewer 266 will initiate actions to retrieve the remaining portions of the electronic book from the library system or the operations center 250 as necessary.

If the subscriber, through the controls 740, requests (from process block 800) that the power be turned off, then the process, 836, of turning the power off will be initiated. Process block 840 saves the pointer in memory to the page number in the book that the viewer 266 is currently reading. Process block 844 closes all the electronic files and signals the power circuitry to shut down the power to the various circuits in the viewer 266. The subscriber may also use the controls 740 to access other electronic files using electronic links embedded in a particular electronic file. An electronic link system will be described later in detail. The electronic book links system is described in U.S. application Ser. No. 09/237, 828, filed on Jan. 27, 1999, entitled ELECTRONIC BOOK ELECTRONIC LINKS, which is hereby incorporated by reference.

With these examples of basic processes the viewer 266 is able to display book selections and display text from those books.

d. Menu System

Figure 13:
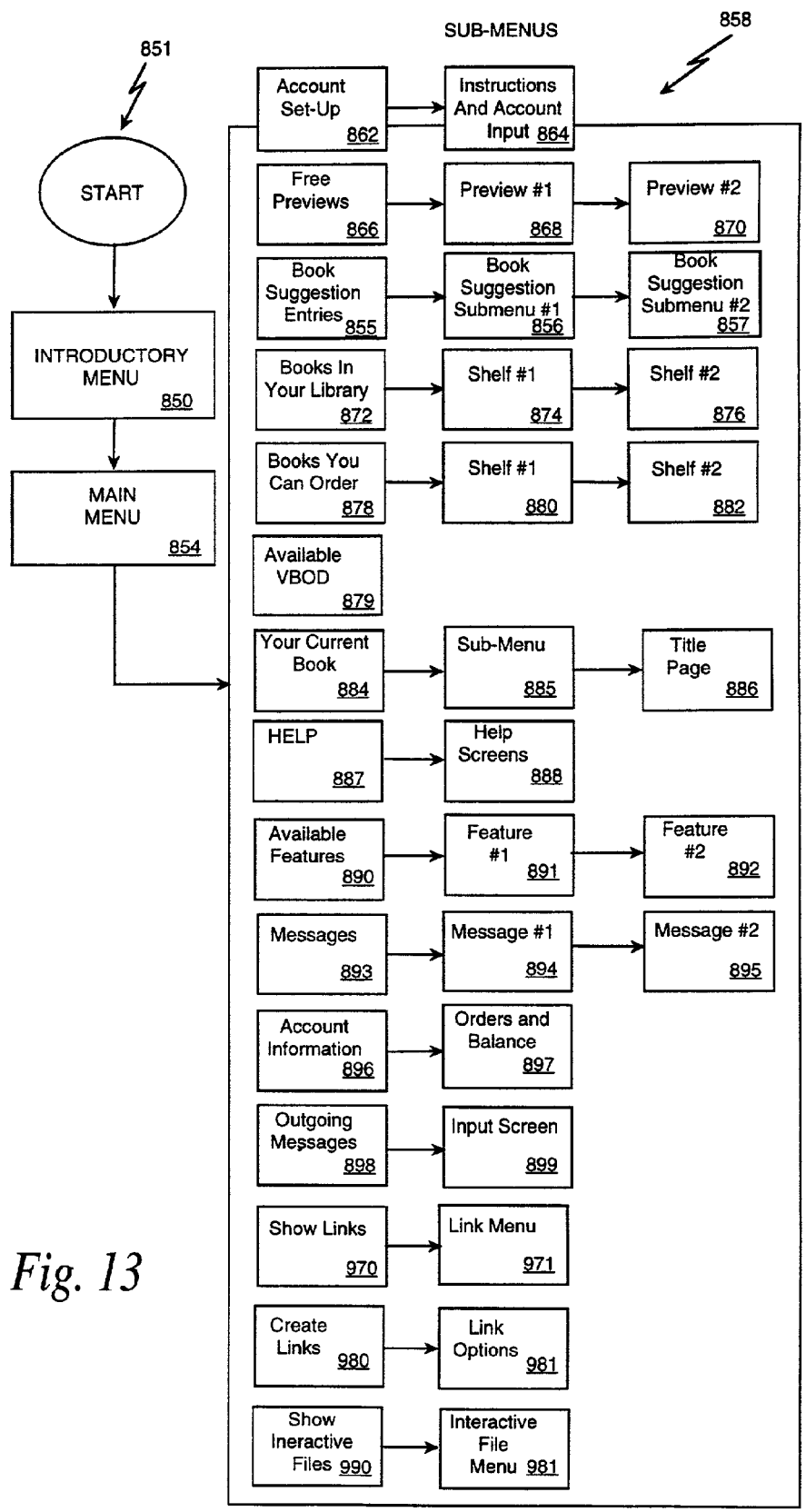
FIG. 13 is a chart depicting the menu structure and sequencing of menus in the menu system.

Referring generally to FIG. 13, the delivery system 200 may have a menu system 851 for selecting features and electronic books from the delivery system 200. The operating software and memory required for the menu system 851 may be located at the viewer 266 (e.g., the instruction memory 732 and/or book memory 728). However, it may also be located at the library 262 (e.g., the instruction memory 632) or the library 262 and the viewer 266 can share the software and memory needed to operate the menu system 851. Since the menus are usually displayed on the viewer 266 and it is preferred that the viewer 266 be capable of operating in the absence of the library 262, the basic software and memory to create the menus is more conveniently located at the viewer 266.

The menu system 851 allows sequencing between menus and provides menu graphics for graphical displays such as on the LCD display 602 of the viewer 266. In a system which uses a set top converter these menus may also be displayed on a television screen. In the simplest embodiment, the menus provide basic text information from which the subscriber makes choices. In more sophisticated embodiments, the menus provide visual displays with graphics and icons to assist the subscriber.

FIG. 13 depicts a menu system 851 with sequencing. The primary menus in the system are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the subscriber interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
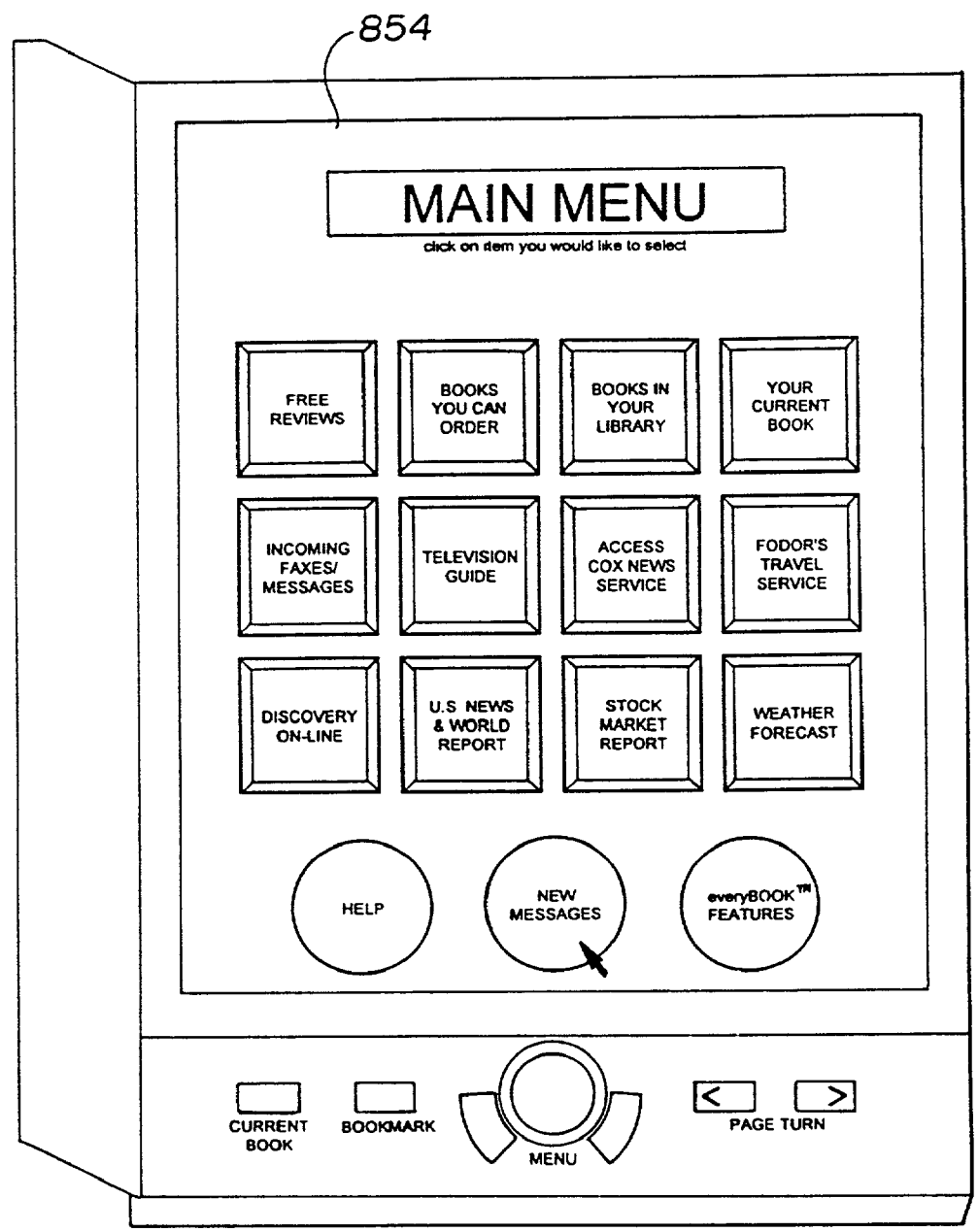
FIG. 14b is a schematic showing an example of a main menu.

An example of an introductory menu 850 is shown on FIG. 14*a*. Generally the introductory menu 850 introduces the viewer 266 to the system and provides initial guidance, announcements and instruction. The introductory menu 850 is followed by a main menu 854, an example of which is shown in FIG. 14*b*. The main menu provides the viewer 266 with the basic selection or features available in the system. FIG. 14*b* is an example of a main menu 854 offering many additional features, including interactive features, and submenus 858 to the subscriber. For example, FIG. 14*b* shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
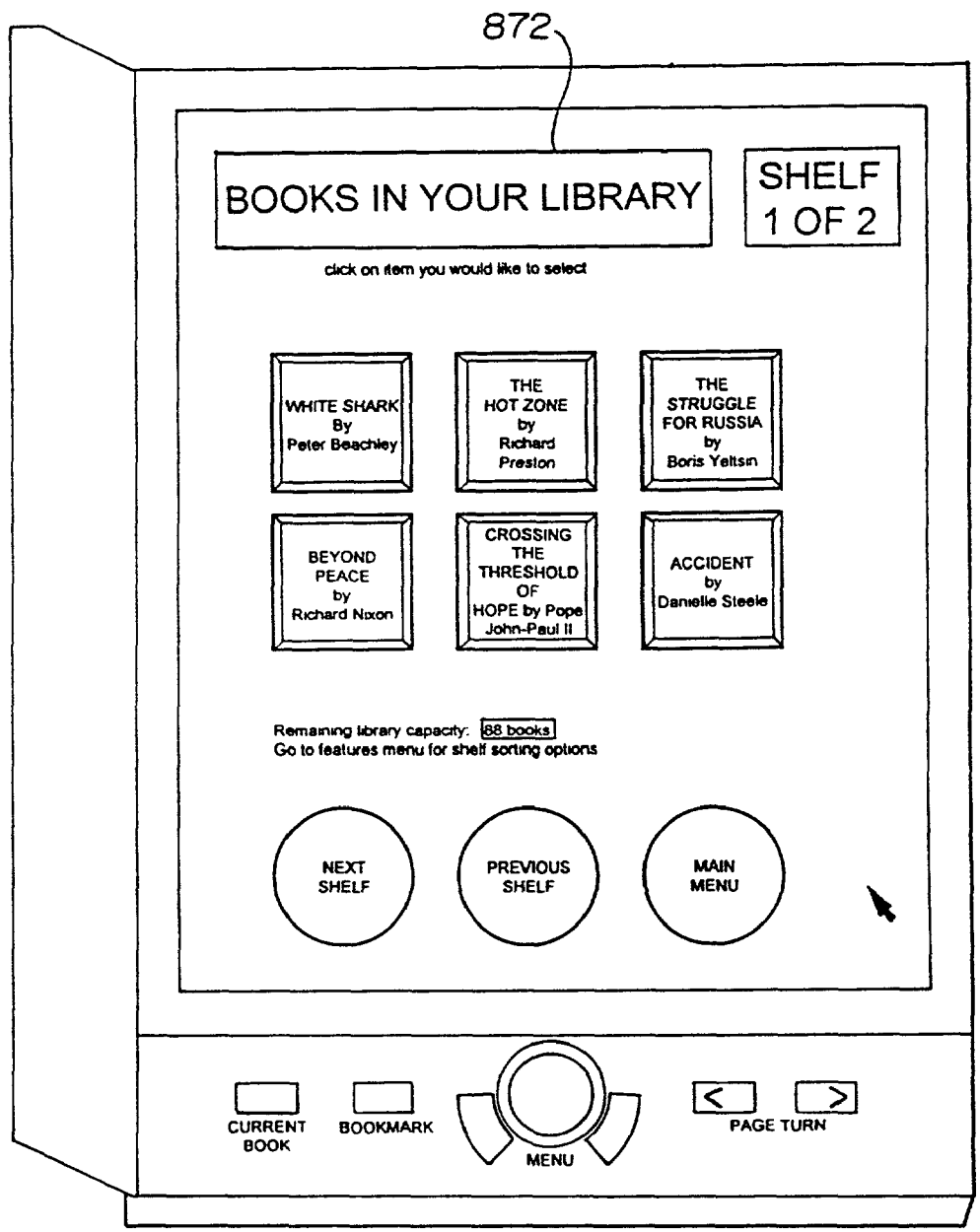
Figure 14D:
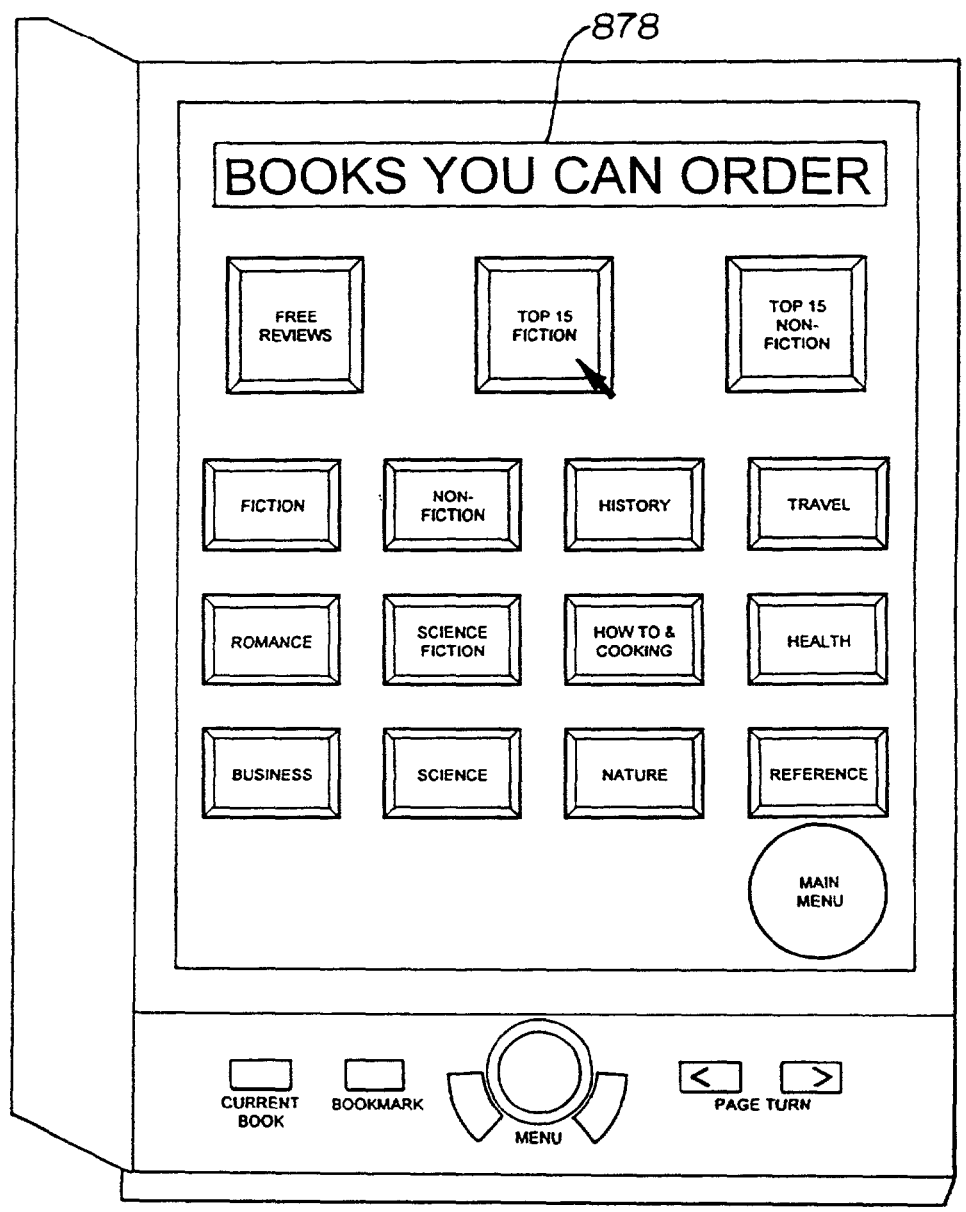
Figure 14E:
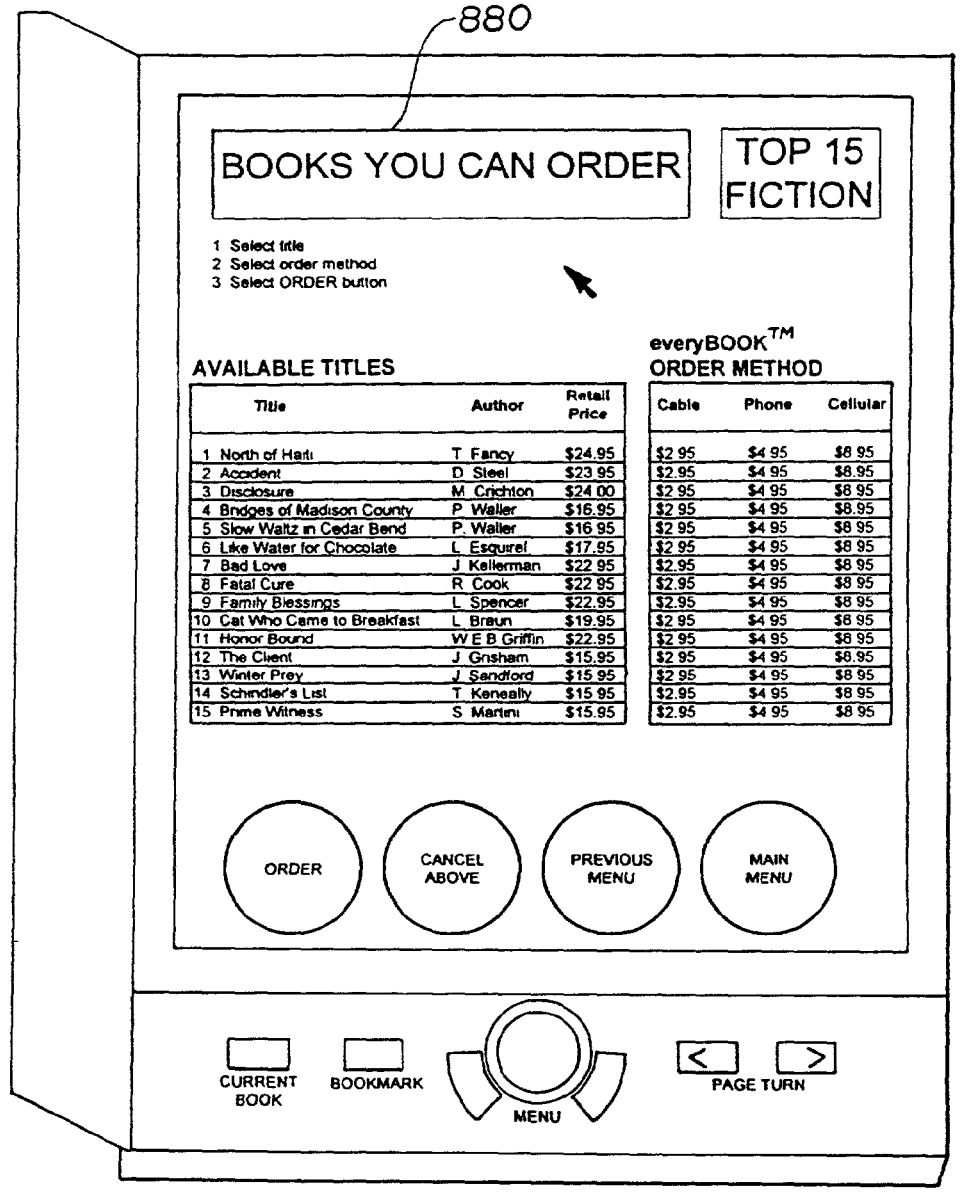

FIG. 13 shows thirteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links 970, and (13) create links 980. FIG. 14c is an example of a first level submenu for electronic books in your library 872. This "Book In Your Library" example submenu 872 shows six available electronic books by title and author and provides the subscriber with the ability to check a different shelf of books 874 or return to the main menu 854. FIGS. 14d and 14e show example submenus 858 for electronic books that may be ordered using the "Books You Can Order" submenu 878.

FIG. 14f is an example of an order selection and confirmation menu 880', which provides a "soft keyboard" 975 for the subscriber to use in placing an electronic book order and which confirms the subscriber's order. In this particular example, the subscriber is required to enter a PIN number to complete the subscriber's order. The "soft keyboard" 975 could be configured as a full alpha-numeric keyboard, and may be used by the subscriber to add additional information related to a book order. An alpha-numeric or similar password may be used to ensure the subscriber is an authorized subscriber. In an embodiment, the subscriber confirms an order with a PIN or password and then receives a final confirmation screen. The final confirmation screen is primarily text and may state: Your book order is now being processed via CABLE.

Your book will be delivered overnight and your VISA account will be charged $2.95.

Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14H:
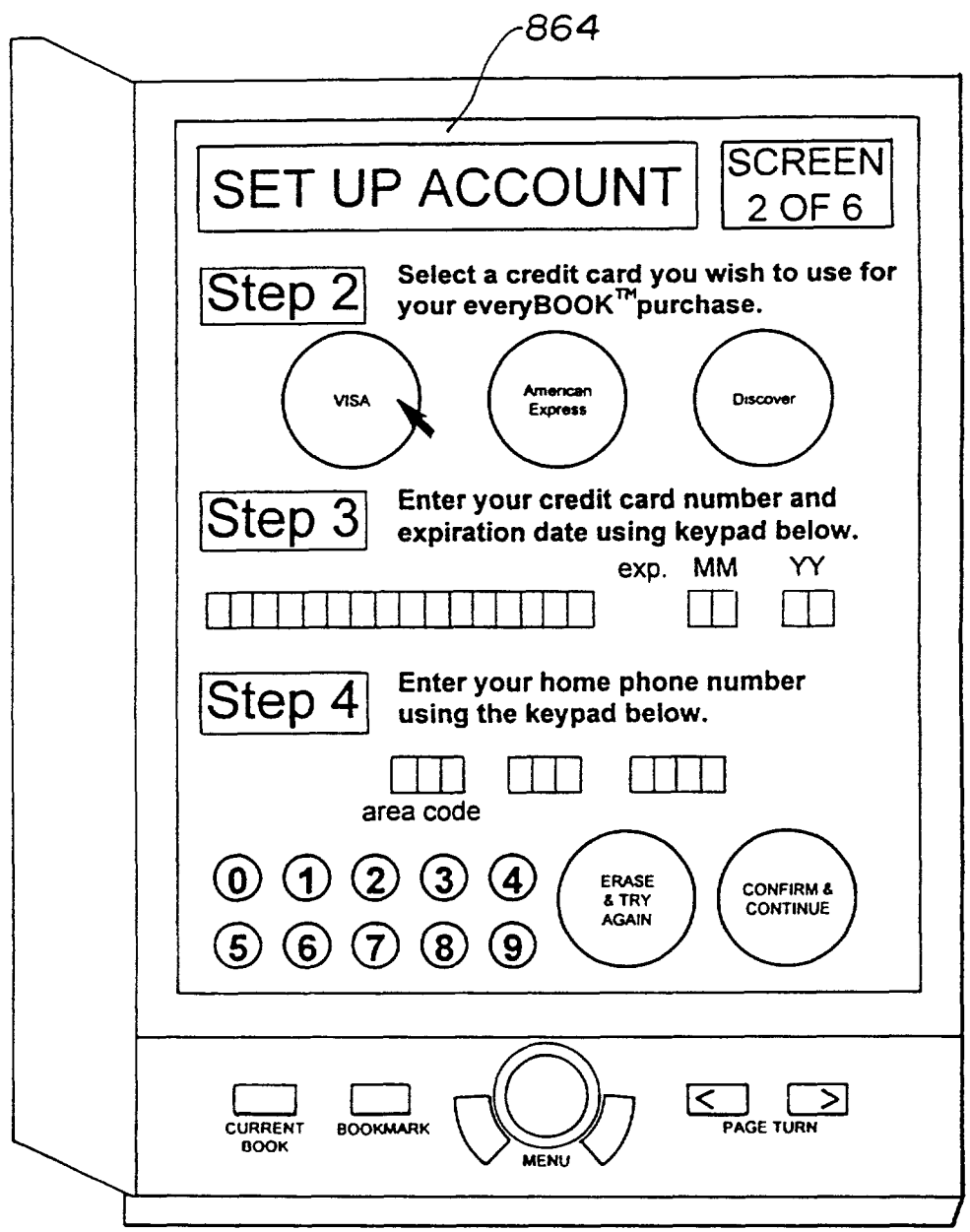

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and/or the billing and collection system 278 and orders to be charged to credit cards. The submenus 858 include the ability to enter data related to a desired PIN number or password, credit cards, phone numbers, etc. The account set up mat be performed using the telephone system. A confirmation menu verifies that the account has been properly set up with the desired PIN or password and credit card.

Figure 14I:
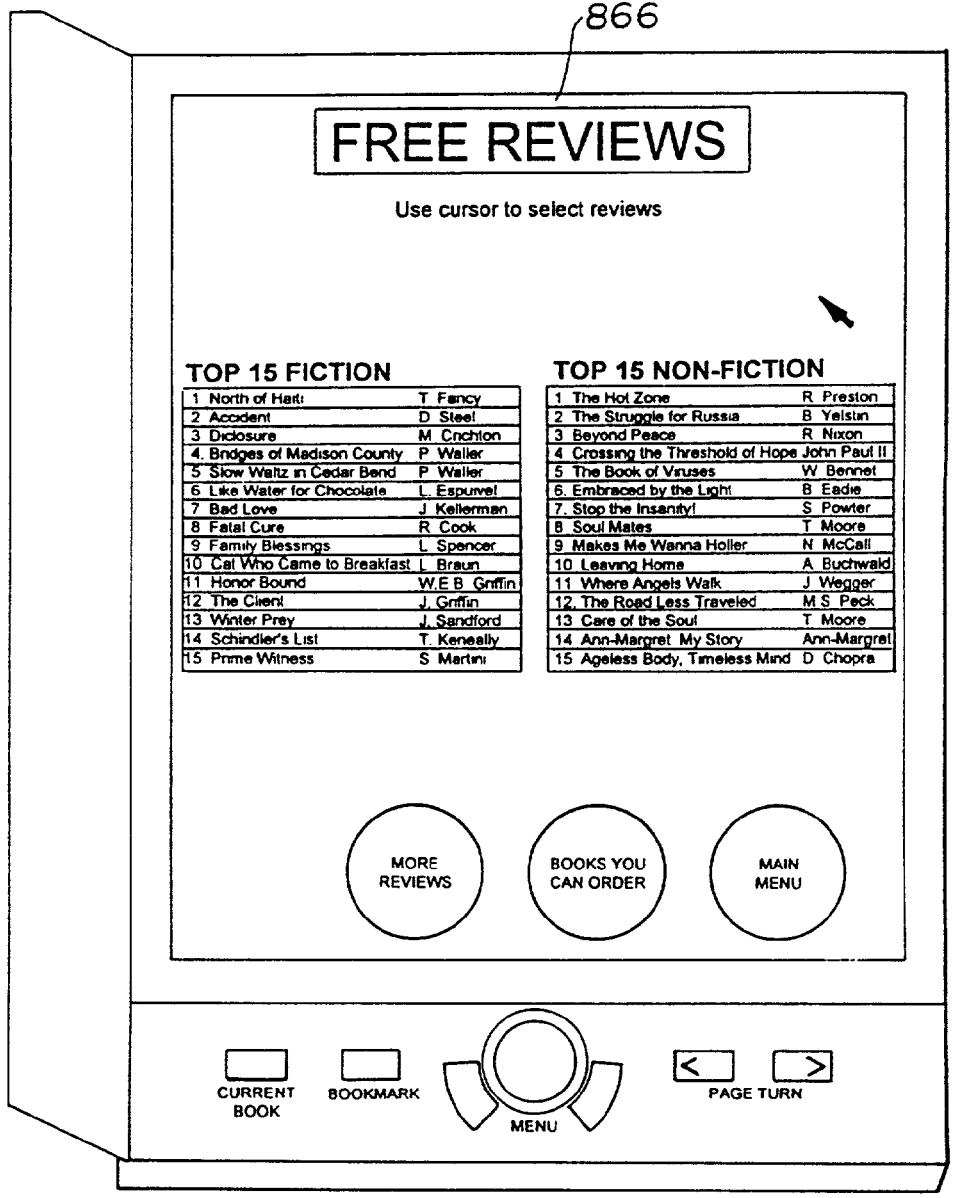
Figure 14J:
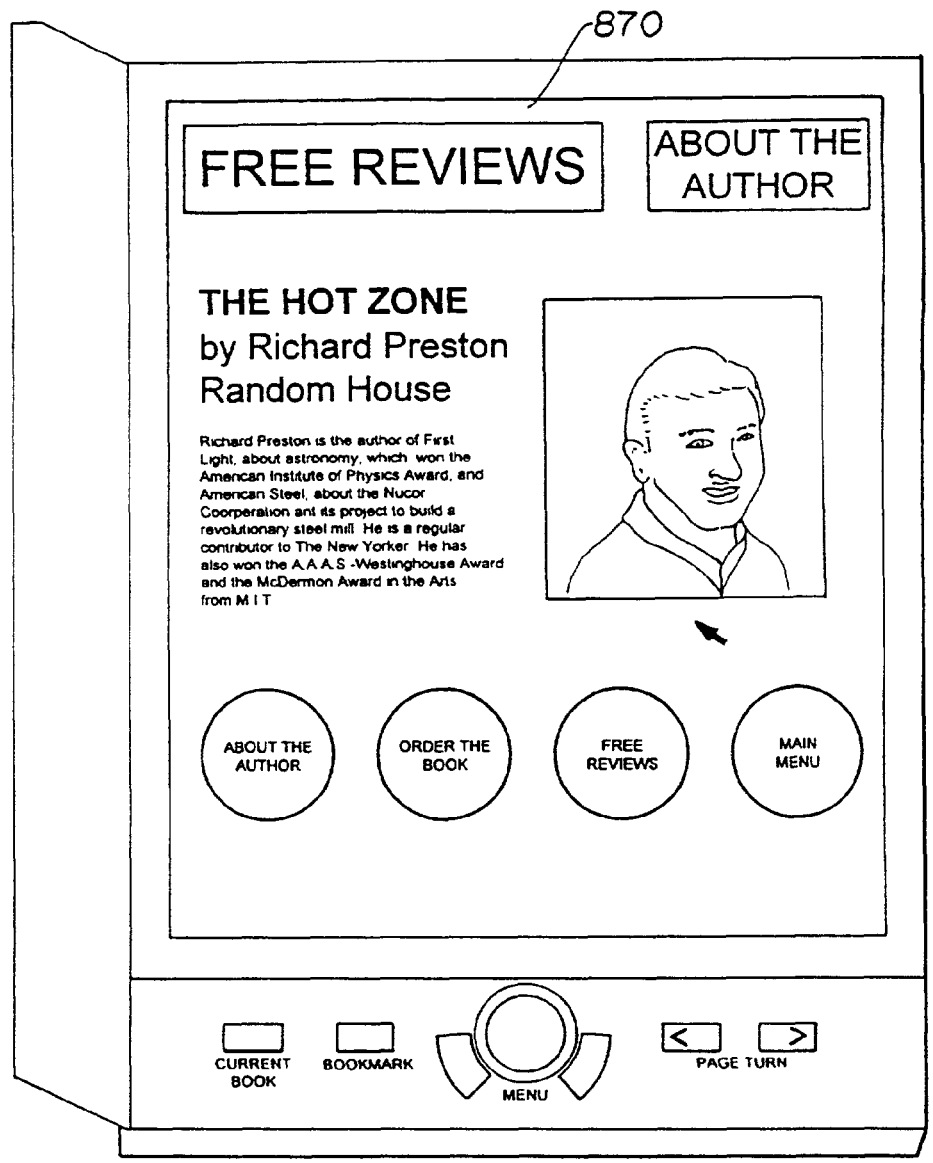

Free previews for books 866 are also provided by submenus (868, 870). Examples of the free preview menus are shown in FIG. 14i and FIG. 14j. FIG. 14i shows a menu depicting various electronic books for which previews are available for viewing. Following an electronic book selection, a screen submenu showing an excerpt of the selected electronic book cover's description is provided along with an excerpt from a critic's review of the selected electronic book. In an embodiment, this preview screen for a particular electronic book also allows the subscriber to select a submenu which provides information about the author. The book preview submenu may also include a still video picture or graphics portraying a book cover or a scene from the electronic book. An example of such a still video picture or graphics is shown in FIG. 14j which depicts a preview screen 870 about the author. The video may also be provided according to MPEG standards as a short moving video clip. Such a clip could be an interview with the author, for example. The author's preview screen 870 shows a picture of the author, provides a short biography, and may allow the subscriber to order the author's books. The price for ordering the authors various electronic books may also be shown on the menu. Alternatively, the previews may be provided through an electronic link system, which will be described in detail later.

Referring to FIG. 13, submenus 858 are shown on the "Books In Your Library" submenu 872 and are preferably broken into shelf numbers with submenus for each shelf 874, 876. The submenus 858 for the "Books You Can Order" submenu 878 is similarly broken out into submenus by shelves 880, 882. These shelves may each be a category or genre of books. Electronic books may be grouped into categories such as best sellers, novels, fiction, romance, etc. See FIG. 14d. An initial portion of some "Books You Can Order" may already be resident on the home system 258 for immediate viewing.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 are preferably broken out into a sequence of separate submenus for each feature 891, 892.

Referring to FIG. 13, messages can also be sent with the delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14a through FIG. 14j, many other variations and features are possible. When a book is finally selected for viewing the title page 886 will appear on the screen followed by a page of text.

e. Book Suggestion System

In addition to free previews, in more sophisticated embodiments, the delivery system 200 provides the subscriber with an electronic book suggestion feature (see 855). This is accomplished using the menu system 851 and the processor with associated memory located at the viewer 266, library 262 or at the distribution point (1020 or 250). When necessary, information for the program suggestion feature is sent in the text data of the composite video signal or other transmission medium, including the PSTN, to the home system 258. With this feature, books or authors are suggested to a subscriber based upon historical data of the subscriber's previous orders, demographics or mood of the subscriber, other indicators, and/or by text word searches.

In a book suggestion embodiment, text word searches of preview information (such as book cover descriptions, critics' reviews and biographies about the author) and/or text of books or other titles are performed by the library 262 using databases stored in the library memory 600. Personalized book or author suggestions are made to the subscriber by obtaining information from the subscriber indicative of general subscriber interests. Subscriber entries are solicited from the subscriber preferably using the electronic book suggestion entries submenu 855. The system uses these subscriber entries either directly or indirectly to search for books or authors to suggest to the subscriber. The book suggestion feature may also be supported by databases and processors located at the distribution point (1020 or 250).

Generally, the book suggestion methods may be categorized into two categories, either responsive methods (which respond to a series of subscriber menu entries), or intelligent methods (which analyze data to suggest an electronic book). Using a responsive or intelligent method, the delivery system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and subindicators) from a group such as light, serious, violent, short, long, dull, exciting, complex, easy-read, young theme, old theme, adventure, romance, drama, fiction, science-fiction, etc. These indicators are sent to the home system 258 with the text data and are stored in the library memory 600. Based upon the subscriber entries, the processor 404 associates a set of indicators with the subscriber's request and a set of electronic books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the library processor 628 using instruction from a routine in the instruction memory 632.

Intelligent methods of suggesting programs include analyzing personal profile data on the subscriber and/or historical data about the subscriber such as past books ordered by the subscriber (or buy data). This method is preferred in a book on demand system and can be performed at the distribution point or operations center 250 by the on-site processor 404 using subscriber databases stored in memory 428. The home system 258 receives the text data including program suggestion information from the distribution point, e.g., the operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers are disclosed in great detail in U.S. Pat. No. 5,559,549, entitled REPROGRAMMABLE TERMINAL FOR SUGGESTING PROGRAMS OFFERED ON A TELEVISION PROGRAM DELIVERY SYSTEM, issued Sep. 24, 1996, and are incorporated herein by reference.

III. The Billing and Collection System

The billing and collection system 278 (shown in FIGS. 2 and 3) uses the latest technology in electronic transaction and telephone switching to track orders, authorize deliveries, bill subscribers, and credit publishers automatically. The telephone calls initiated by the connector 270 are received by the billing and collection system 278, which responds immediately without human intervention by placing the order and charging the subscribers credit card account. Data is compiled periodically and publishers 282 are credited for sales of their books or other text. The billing and collection system 278 may also connect with subscribers through two-way cable connections, cellular, or other communication means.

The billing and collection system 278 may communicate with the operations center 250 to track changes in available books and to provide statistical data to the operations center 250.

IV. Public Library, School, and Bookstore System

Figure 15A:
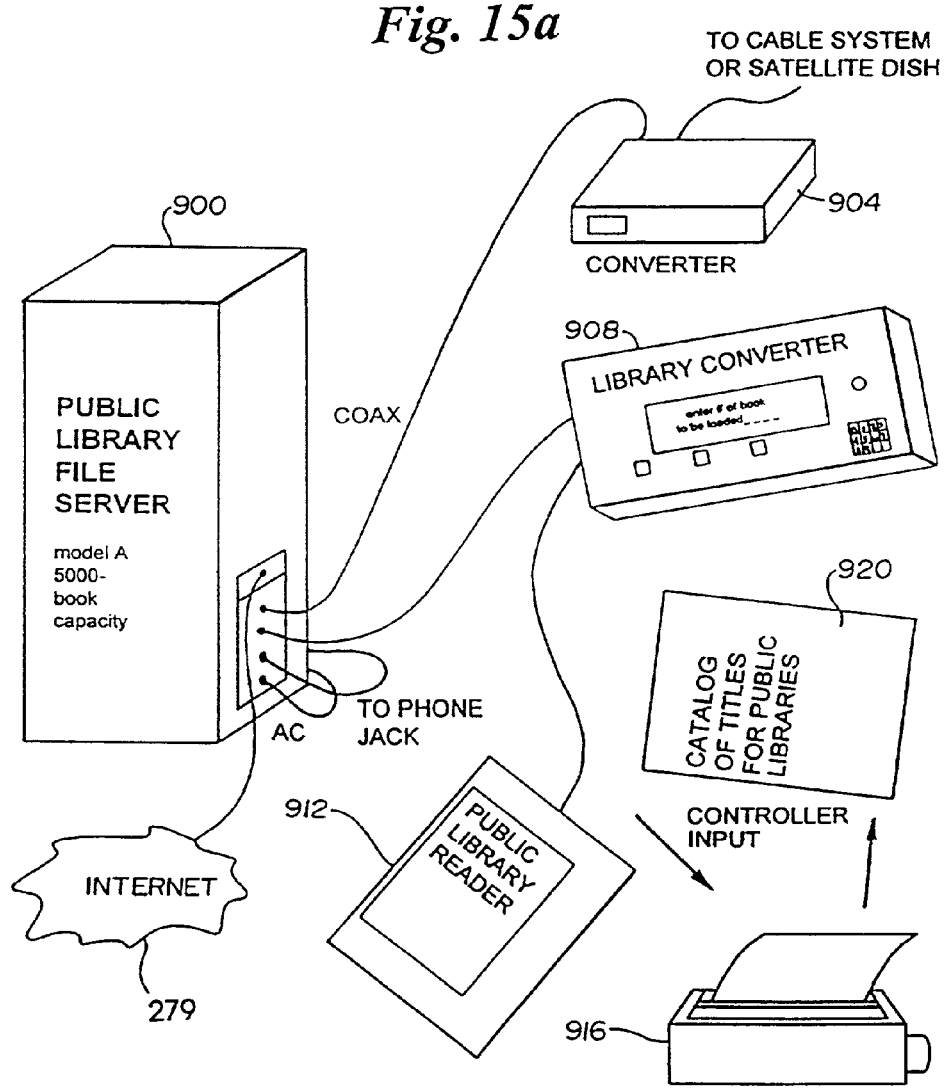
FIGS. 15a and 15b are diagrams of an electronic book system for a bookstore, or school or public library.
Figure 15B:
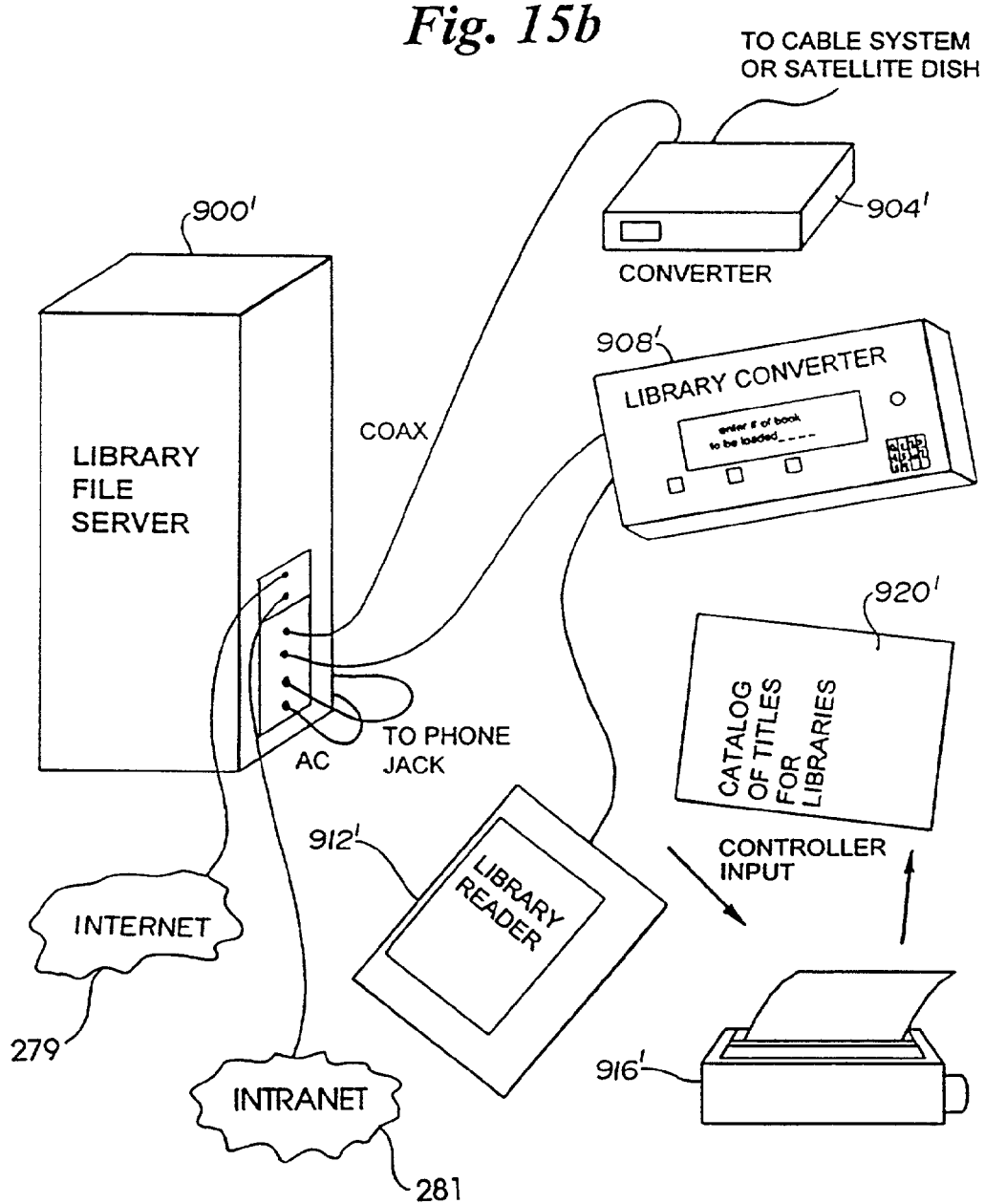

The electronic book system can be modified to be used at public libraries, schools and bookstores. FIGS. 15*a* and 15*b* show arrangements of components that may be used at public libraries, schools and bookstores. FIG. 15*a* shows one possible arrangement of components for a public library location. The main unit at the public library is the file server 900. The file server 900 is a large electronic memory unit that can store thousands of electronic books. Various electronic storage means may be used in the file servers, such as hard disks, read-write CD ROMs and read-only CD ROMs.

The system comprises five components; the file server 900, a converter or video connector 904, a controller 908, a viewer 912, and a catalog printer 916. Also shown in FIG. 15*a* is a connection to the Internet web site 279 and the intranet 281. The software for controlling the system is primarily located in the controller 908. The converter or video connector 904 is similar to those described above. In this configuration the controller unit 908 monitors the data being transferred to the file server 900 by the converter 904. The controller 908 is preferably provided with a viewing screen and several control buttons. When it is necessary to have a larger screen to perform more sophisticated controlling of the system a viewer 266 may be connected to the controller 908 and the viewer screen and controls 740 may be used.

The controller 908 is only able to download books to public viewers 912 that are authorized to receive books from the particular file server 900. For security reasons the public viewer 912 may not have access to more than one file server 900. In this way, security can be maintained over the text data for books. The public viewer 912 may be limited to receiving one or two electronic books at a time from the controller 908. When the subscriber of the public viewer 912 needs a new or additional electronic book, the subscriber returns the viewer 912 to the school or public library where the subscriber receives a new electronic book from the controller 908.

In order to track the electronic books that are available on the file server 900, the titles of the available books may be printed on a catalog printer 916. The catalog printer 916 is connected to the library controller 908 and the titles of the electronic books are downloaded to the catalog printer 916. None of the coded text for any of the electronic books can be printed using the controller 908 and catalog printer 916 of this system. In order to maintain security over the data, none of the electronic book data is allowed to be downloaded to the printer 916. Once a complete printout of available electronic book titles, magazines, or other textual material is complete, a hard copy of the catalog 920 can be maintained at the file server 900.

The Internet web site 279 may also be used to download content to the server 900. The intranet 281 may be established between local libraries in a jurisdiction. For example, all public libraries in a country may be joined by the intranet 281. Using the intranet 281, the local public libraries may share electronic books and other data.

The system shown in FIG. 15*a* may also be used at bookstores. The bookstores can rent the public viewer 912 to subscribers with the text for one or two electronic books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the subscriber would return the public viewer 912 to the bookstore and receive additional electronic books for viewing. Using this arrangement, it is also possible for the bookstore to (permanently) sell a viewer 912 to a regular subscriber. The subscriber then returns to the bookstore from time to time to receive textual data for an electronic book which the customer can then store permanently on the subscriber's own viewer 912. Various other configurations are possible for bookstores, schools and public libraries using the file server 900 and public viewer 912 described.

A school library, such as a university library, may use an arrangement of components such as shown in FIG. 15*b*. Many of the components are the same between FIGS. 15*a* and 15*b*. In FIG. 15*b*, software for controlling the system is primarily located in the controller 908'. The converter or video connector 904' is similar to those described above. In this configuration the controller unit 908' monitors the data being transferred to the file server 900 by the converter 904 and the Internet 279. The controller 908' is preferably provided with a viewing screen and several control buttons.

The controller 908' downloads "copies" of electronic books to the viewers 266 that are authorized to receive books from the file server 900. The viewers 266 may be provided to all students at the university as part of their required equipment. In the context of the university library, the viewers may be brought to the library to receive electronic books from the server 900'. Alternately, the university may distribute electronic books through a university intranet such as the intranet 281. Software operating on the server 900 may keep track of electronic books loaned to individual students. The students may be required to "return" the electronic books after a set time, or at the end of a semester, for example.

In order to track the electronic books that are available on the file server 900', the titles of the available books may be printed on a catalog printer 916'. The catalog printer 916' is connected to the library controller 908' and the titles of the electronic books are downloaded to the catalog printer 916'.

The intranet 281 may also be establish connection between university libraries that are members of an inter-library loan program. In this way, electronic books that are resident at one university library may be sent to another university library for eventual loan to a student. In an alternative arrangement, the Internet may be used for inter-library loan programs.

V. Use of a Set Top Terminal

Existing set top terminals such as those made by Scientific Atlanta or General Instruments are presently unequipped to handle the delivery system 200 of the present invention. Although set top terminals may be built which include the library functions, hardware modifications are necessary in order to use the delivery system 200 with existing set top terminal technology.

Figure 16A:
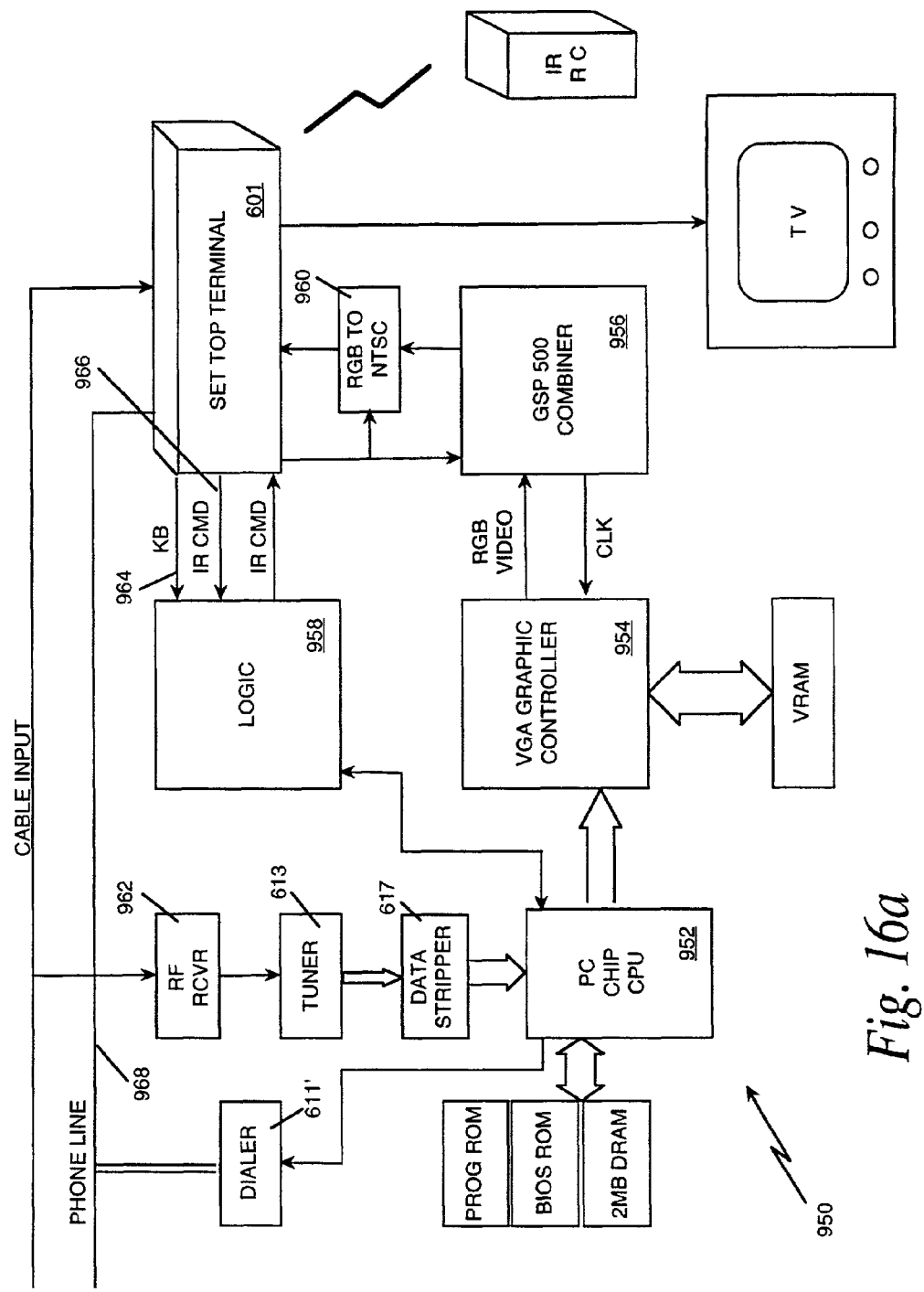
FIGS. 16a and 16b are schematics of hardware modifications or upgrades to a set top terminal.
Figure 16B:
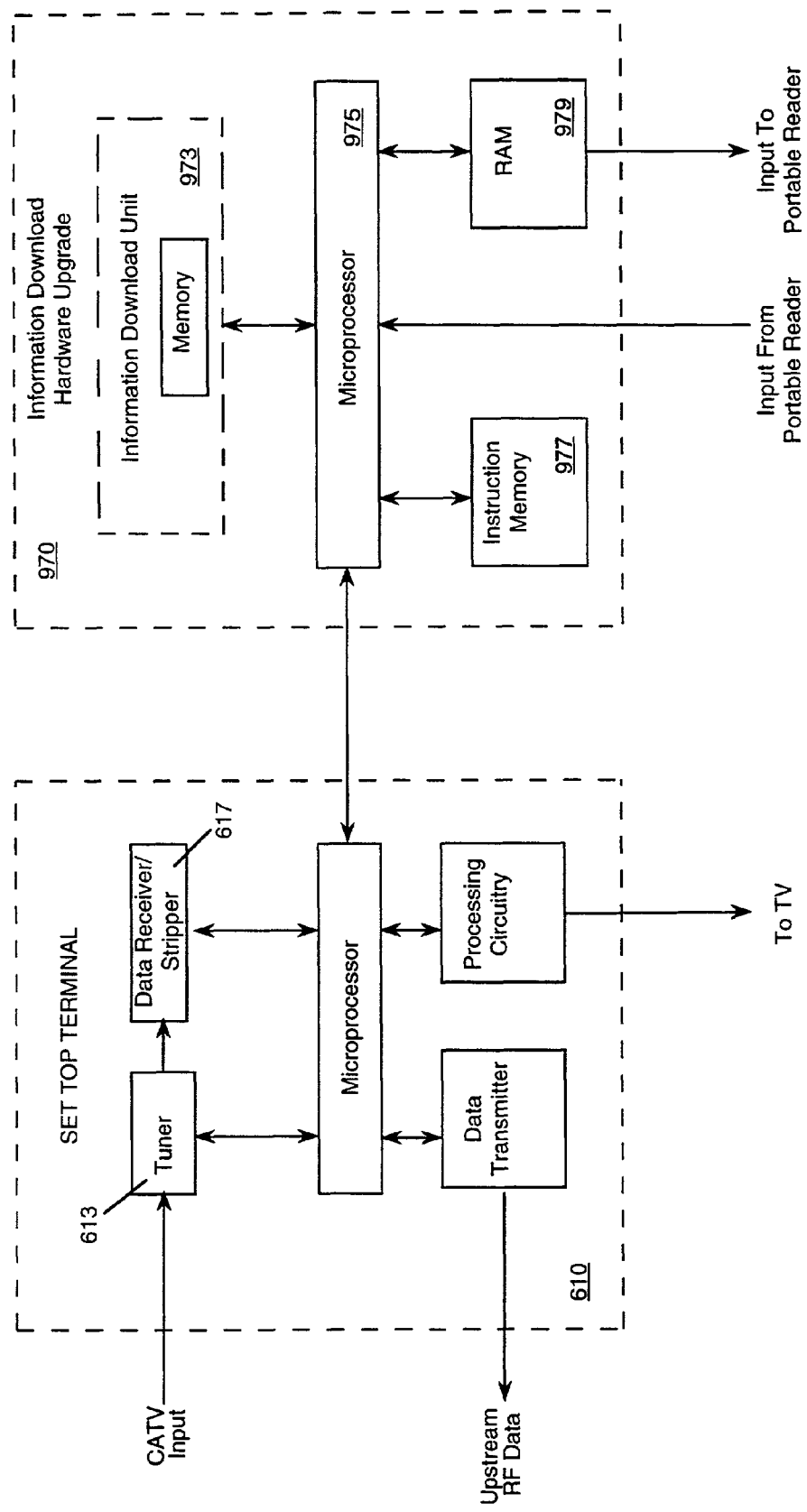

FIGS. 16*a* and 16*b* are examples of hardware modifications or upgrades. A port is used to attach hardware upgrades described below to a set top terminal. Two upgrades are possible to set top terminals 601 to assist in receiving and selecting electronic books. A menu generation card upgrade (FIG. 16*a*) and an information download unit (FIG. 16*b*). Each of these upgrades may be connected to the set top terminal unit through an upgrade port. A four wire cable, ribbon cable, IEEE 1394 firewire, USB interface, or the like may be used to connect the upgrade to the set top terminal 601.

A card addition 950 to a set top terminal 601 is depicted in FIG. 16*a*. The card 950 shown provides the additional functionality needed to utilize the book selection system with existing set top terminal 601 technology. The card 950 may be configured to slip inside the frame of a set top terminal and become part of the set top terminal, an advanced set top terminal. The primary functions the card 950 adds to the set top terminal 601 are the interpreting of data signals, generating of menus, sequencing of menus, and, ultimately, the ability of the subscriber to select an electronic book using either the television or a viewer 266. The card 950 also provides a method for a remote location, such as the cable headend, to receive information on electronic books ordered. The electronic books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top terminal 601. Menu selections made by the viewer 266 on the remote control are received by the set top terminal's 601 IR equipment and passed through to the card 950. The card 950 interprets the IR signal and determines the electronic book (or menu) the subscriber has selected. The card 950 modifies the IR command to send the information to the set top terminal 601. The modified IR command contains the channel information needed by the set top terminal 601. Using the phone line 968 and dialer 611', the card 950 is able to transmit electronic books ordered information to the cable headend. It is also possible to receive the electronic books over the telephone lines and by-pass the video distribution system. In this embodiment, the telephone system may be used to provide access to an Internet web site to order and receive electronic books.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In the preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

An information download hardware upgrade 970 (shown in FIG. 16b) allows the subscriber to download large volumes of information from the operations center 250 or cable headend using the set top terminal 601. The hardware upgrade 970 will enable subscribers to download data, such as electronic books and magazines, to local storage. Primarily, the hardware upgrade 970 is an additional local storage unit 973 (e.g., hard disk, floppy, optical disk or magnetic cartridge and may include a microprocessor 975, instruction memory 977, and a random access memory 979, as shown in FIG. 16b). The viewer 266 also may be provided with the upgrade 970 to enable downloaded text to be read without the use of a TV.

The downloadable information may be text or graphics supplied by the operations center 250 or cable headend. With this upgrade, electronic books may be downloaded and read anywhere with the viewer 266. Using this upgrade, electronic books may be downloaded and stored in compressed form for later decompression. The electronic books would be decompressed only at the time of viewing. Important text that the public desires immediate access may made available through this system. Text such as the President's speech, a new law, or a recent abortion decision rendered by the Supreme Court may be made immediately available.

In an embodiment, electronic book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
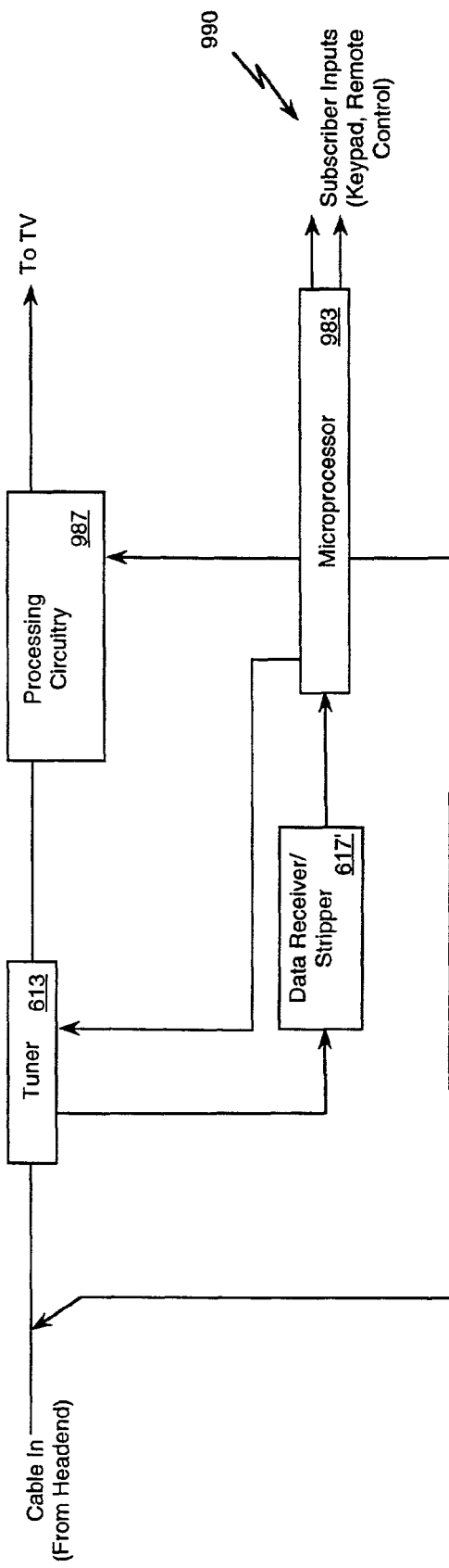
FIG. 17 is a schematic showing a set top terminal that includes a data receiver and data transmitter.

FIG. 17 shows a preferred set top terminal that includes a data receiver 617' and a data transmitter 981. The data transmitter provides upstream data communications capability between the set top terminal 601 and the cable headend. Upstream data transmissions are accomplished using the polling system described and, using a data transmitter 981. Both receiver 617' and transmitter 981 may be built into the set top terminal 601 itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 983, which receives inputs 990, from the subscriber, either through a set top terminal's keypad, a remote control unit or the viewer 266. All cable signals intended for reception on the subscriber's TV are accessed by the tuner 613 and subsequently processed by the processing circuitry 987. This processing circuitry 987 typically includes additional components (not shown) for descrambling, demodulation, volume control and remodulation on a Channel 3 or 4 TV carrier.

Data targeted to individual set top terminals is received by the data receiver 617' according to each set top terminal's specific address or ID. In this way, each addressable set top terminal only receives its own data. The data receiver 617' may receive set top terminal 601 specific data in the information field of the signal frame described or on a separate data carrier located at a convenient frequency in the incoming spectrum.

The received data includes information regarding electronic books and menus available for selection. The subscriber may enter a series of commands 990 using a keypad or remote control in order to choose an electronic book or menu. Upon receipt of such commands, the microprocessor 983 instructs the tuner to tune to the proper frequency of the channel carrying data and subsequently instructs the processing circuitry 987 to begin descrambling of this data.

Upon selection of the electronic book, the microprocessor 983 stores any selection information in local memory (not shown) for later data transmission back to the cable headend. The microprocessor 983 coordinates all CATV signal reception and also interacts with various upstream data transmission components. Typically, the data transmitter 981 operates in the return frequency band between 5 and 30 MHZ. In an alternative embodiment, the frequency band of 10 to 15 MHZ may be used. Regardless, however, of the frequency band used, the data transmitter 981 sends information to the cable headend in the information field of the response frame described. Those skilled in the art will recognize that a number of variations and combinations of the above-described set top terminal hardware components may be used to accomplish upstream data transmissions.

In the preceding described the use of a set top terminal with the electronic book system. All the functionality of the set top terminal may also be incorporated into a card that is a component of a television.

VI. Books-on-Demand System

Figure 18A:
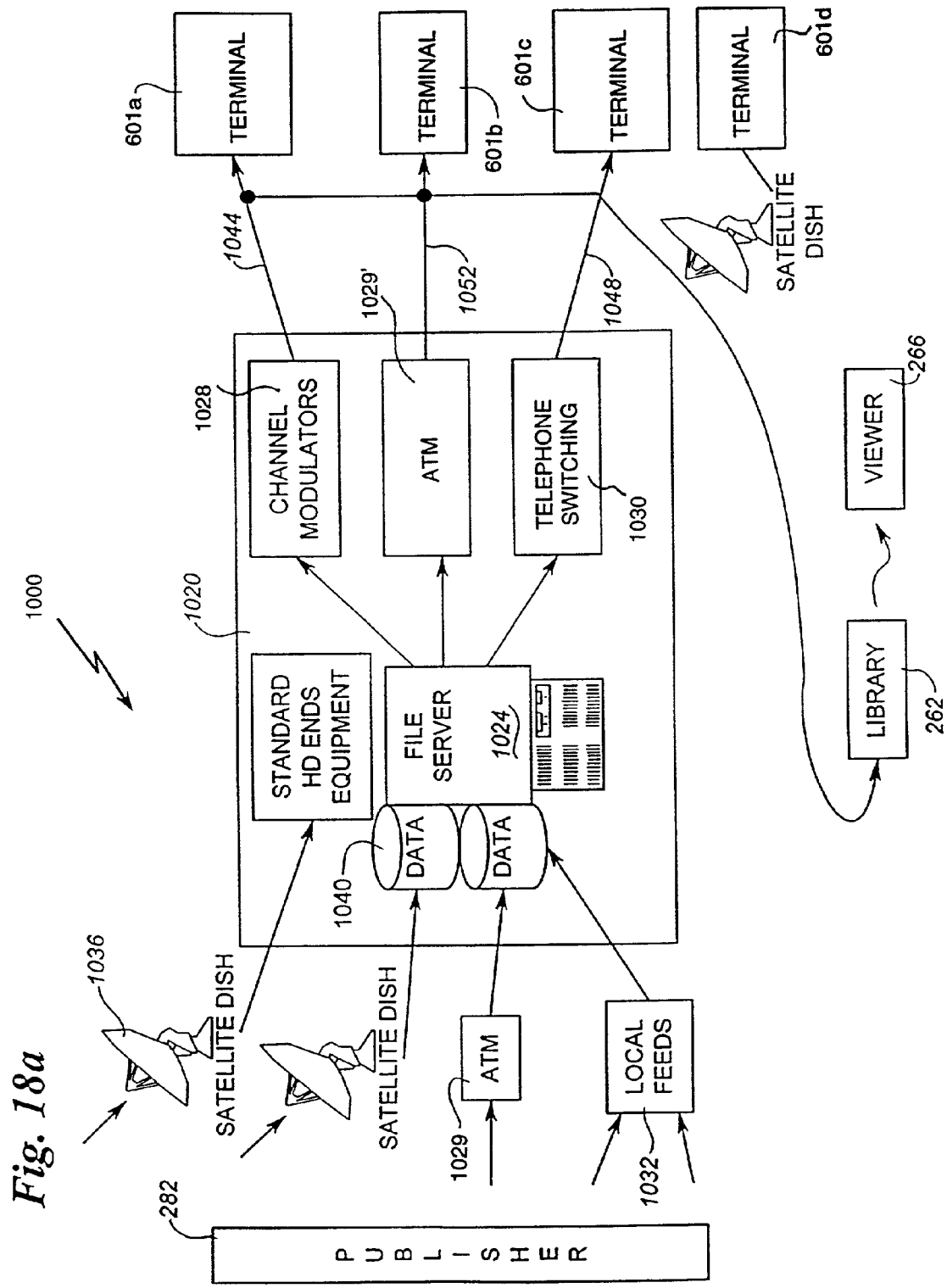
FIG. 18a is a schematic of a book-on-demand system.

Electronic books may be distributed using an electronic book-on-demand system. FIG. 18a shows an embodiment of an electronic book-on-demand system 1000. The electronic book-on-demand system 1000 may use powerful two-way communications between a subscriber's home, a bookstore, a school or a public library, for example, and a distribution site 1020. The distribution site 1020 may include an operations center or a cable headend of a television delivery system, or any other remote location capable of storing and transmitting digital data. The distribution site 1020 may also include or use an Internet web site, such as the Internet web site 279 shown in FIG. 2. In an embodiment, the two-way communication may be provided by the hardware shown in FIG. 17 and described above. The book-on-demand system 1000 may be used in conjunction with the broadcast delivery system 200 described above to create a virtual book-on-demand system. In this embodiment, the broadcast delivery system 200 may be used to send initial portions of some electronic book and the book-on-demand system 1000 may be used to delivery the remaining portions on demand. Additional electronic book ordering and delivery systems and methods related to alternative communication paths are described in co-pending U.S. patent application Ser. No. 09/289,957, entitled Electronic Book Alternative Delivery Systems, filed on Apr. 13, 1999, the disclosure of which is hereby incorporated by reference.

The electronic book-on-demand system 1000 shown in FIG. 18a may use offsite storage to include a current library of electronic books that a subscriber may order. As an intermediary between the subscriber's terminal and the content provider 282 (or other remote site such as a video service provider), the distribution site 1020 performs several functions. The distribution site 1020 provides the primary means for delivering content to individual subscribers. In addition, the distribution site 1020 may prepare the electronic books for delivery. That is, the distribution site 1020 may incorporate the equipment and routines needed to digitize, encrypt, and compress electronic books for transmission to the subscriber terminals. The distribution site 1020 may determine the optimum transmission media, time and date for delivery, and routing plan to send an electronic book to a particular terminal. For example, if a subscriber's terminal accesses the distribution site 1020 using a telephone network, the distribution site may determine the least cost route to transmit the electronic book data. If the subscriber's terminal accesses the distribution site using a cable television system, the distribution site may multiplex the electronic book data with signals and digital information received from the cable television operations center for delivery to the subscriber's terminal. Thus, the distribution site may offer different subscribers different delivery options and may allocate the electronic book data in various manners to accommodate different viewers.

Referring to FIG. 18*a*, in the electronic book-on-demand system 1000, the subscriber selects an electronic book to be downloaded from a menu of available electronic books (see, for example, FIGS. 14*d* and 14*e*). Data for menus of available electronic books may be sent by the distribution site 1020 to a terminal at a subscriber's location. Terminal 601*a* may be the home system 258 described above. Alternatively, terminals 601*b*, 601*c* and 601*d* may be a digital television, a set top terminal and a personal computer, respectfully, or any component capable of receiving digital data, for example. The data for menus may be sent by incorporating the data into a composite video signal, a radio signal, or by using a Public Switched Telephone Network (PSTN), the Internet, an intranet, a local area network, a wired or wireless data network, a wireless telephone network, a satellite distribution system, and by hard copy, for example. The menu data may be used at the home system 258, for example, to generate a menu of available electronic books. Alternatively, the menu data could be presented in the form of a pre-formatted menu. The menu data may also be used to generate a menu of available electronic books that is customized to a particular subscriber. The subscriber can create one or more custom menus by specifying general areas of interest or other data. For example, the subscriber could indicate a preference for mystery novels. In this embodiment, the home system 258 may generate a menu of available electronic books that are classified as mysteries. The subscriber may also be presented with a customized menu based on books read data collected by the terminals 601*a*, 601*b*, 601*c* and 601*d*, the distribution site 1020, or the billing and collection system 278, for example.

The subscriber may select an electronic book to purchase from the menu of available electronic books such as the books you can order menu 878 shown in FIG. 13. To select the electronic book for purchase, the subscriber may use a remote control device to highlight a selection from the menu 878 and then operate a send button (not shown in FIG. 13) to send an order to the distribution site 1020.

After the subscriber's menu selection, information about the subscriber's selection (or order) is communicated to the distribution point 1020 using the two-way cable 1044, the one-way cable 1052, or the telephone system 1048, for example. The electronic book order may also be transmitted by any other suitable means including a LAN, the Internet, and an intranet, for example.

Upon receipt of the electronic book order, the needed textual and graphical information for the electronic book may be spooled and sent to the subscriber. In this manner, electronic books may be sent only when requested by the subscriber. The electronic books may be sent immediately upon demand for the electronic books. Alternatively, the electronic books may be sent after a delay. The length of delay may vary, and may be based on the number of electronic book orders being processed at the distribution site 1020. The delay may also be based on different classes of service. For example, a subscriber may be willing to pay extra for immediate delivery of electronic books.

To support the electronic book-on-demand system 1000, electronic book delivery and distribution may be conducted using a strong nodal architecture distribution system, such as a video-on-demand cable system, a telephone system, individual telephone calls on the PSTN or a wireless telephone system, through the Internet, a local area network, a wired or wireless data network, a wireless telephone network, and a satellite distribution system, for example. The electronic books may also be distributed on storage media such as a CD-ROM, a floppy disk, a PCMCIA card, or a number of other data storage options.

The electronic book-on-demand system 1000 allows for a greater selection of electronic books by the subscriber and limits the amount of communicated electronic book data that is unnecessary or unneeded. The electronic book-on-demand system 1000 also provides the electronic books to the subscriber in a much more timely fashion than other techniques.

The electronic book-on-demand system 1000 may use the distribution site 1020 with sophisticated equipment to access and spool out the electronic books. This can be accomplished using a file server 1024 for storing the electronic books and distribution technology such as cable channel modulators 1028, ATM 1029' or telephone-type switching 1030 to distribute the electronic books. The file server 1024 and distribution technology that may be used in configuring the electronic book-on-demand system 1000 is described in U.S. Pat. No. 5,262,875 and U.S. Pat. No. 5,218,695, cited above.

In addition to electronic books, the electronic book-on-demand system 1000 of FIG. 18*a* may support distribution of nearly any digital data. Books or textual files may be received from a publisher 282 and other sources through local feeds 1032, ATM 1029, and by satellite dish 1036, for example. The data is then stored in a memory 1040 at the file server 1024. In an embodiment, the distribution site 1020 is a cable headend that receives requests from subscribers and delivers text to subscribers over a one-way or a two-way communication system (such as the two-way cable 1044).

Figure 18B:
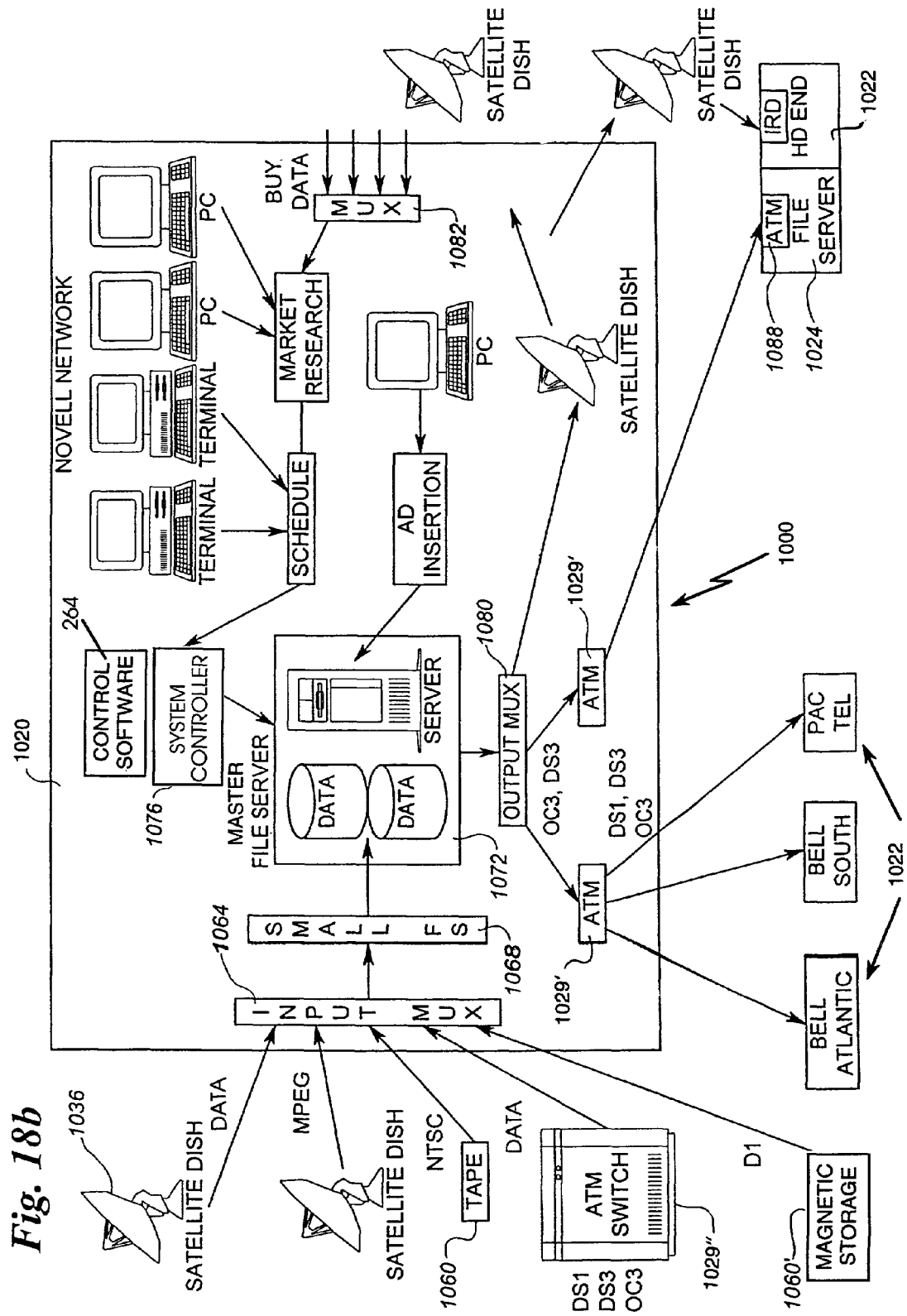
FIG. 18b is a schematic of an operations center supporting a book-on-demand system.

FIG. 18*b* is an expanded view of a distribution site 1020 that supports the electronic book-on-demand system 1000. The distribution site 1020 supports multiple feeds to receive digital information by tape 1060, magnetic storage 1060', the ATM 1029, and the satellite 1036, for example. The information may be processed through an input multiplexer 1064 and a small file server 1068 before reaching a master file server 1072. Digital data such as electronic books received from the publishers 282 then may be stored on the master file server 1072. The digital data may be stored in a standard compressed format, such as PKZIP, for example.

A system controller 1076 provides control over the electronic book-on-demand system 1000. Electronic books may be packaged into groups to provide feeds to various regional distributors. In addition, scheduling and marketing research may be conducted at the distribution site 1020. In order to handle the scheduling and market research, electronic book buy data may be received at the distribution site 1020 through a multiplexer 1082. Electronic book buy information may be provided by the distribution site 1020 to the billing and collection system 278. This data may be used to determine which electronic book should be broadcast more frequently.

The system 1000 may also be coupled to a virtual book-on-demand system (not shown in FIGS. 18*a* and 18*b*). The virtual book-on-demand system functions to deliver books to subscribers in a manner that appears to be on demand, but that in reality uses some type of delayed delivery mechanism. The virtual book-on-demand system may send a signal to the system 1000 to delivery, or broadcast, one or more electronic books to subscribers as a part of the virtual on-demand process. A virtual book-on-demand system will be described in detail later.

The distribution site 1020 also may be equipped to insert messages or advertisements into the file server. These messages or advertisements will eventually be received by the subscribers.

The master file server 1072 uses an output multiplexer 1080 and the ATM 1029' as well as satellite connections to distribute digital data. In an embodiment, the distribution site 1020 is a national distribution site and regional distributors 1022 receive digital data from the master file server 1080 through the output multiplexer 1080 and the ATM 1029'. After receiving the electronic books, the regional distributors 1022 store the electronic books in a local file server 1024.

Figure 19A:
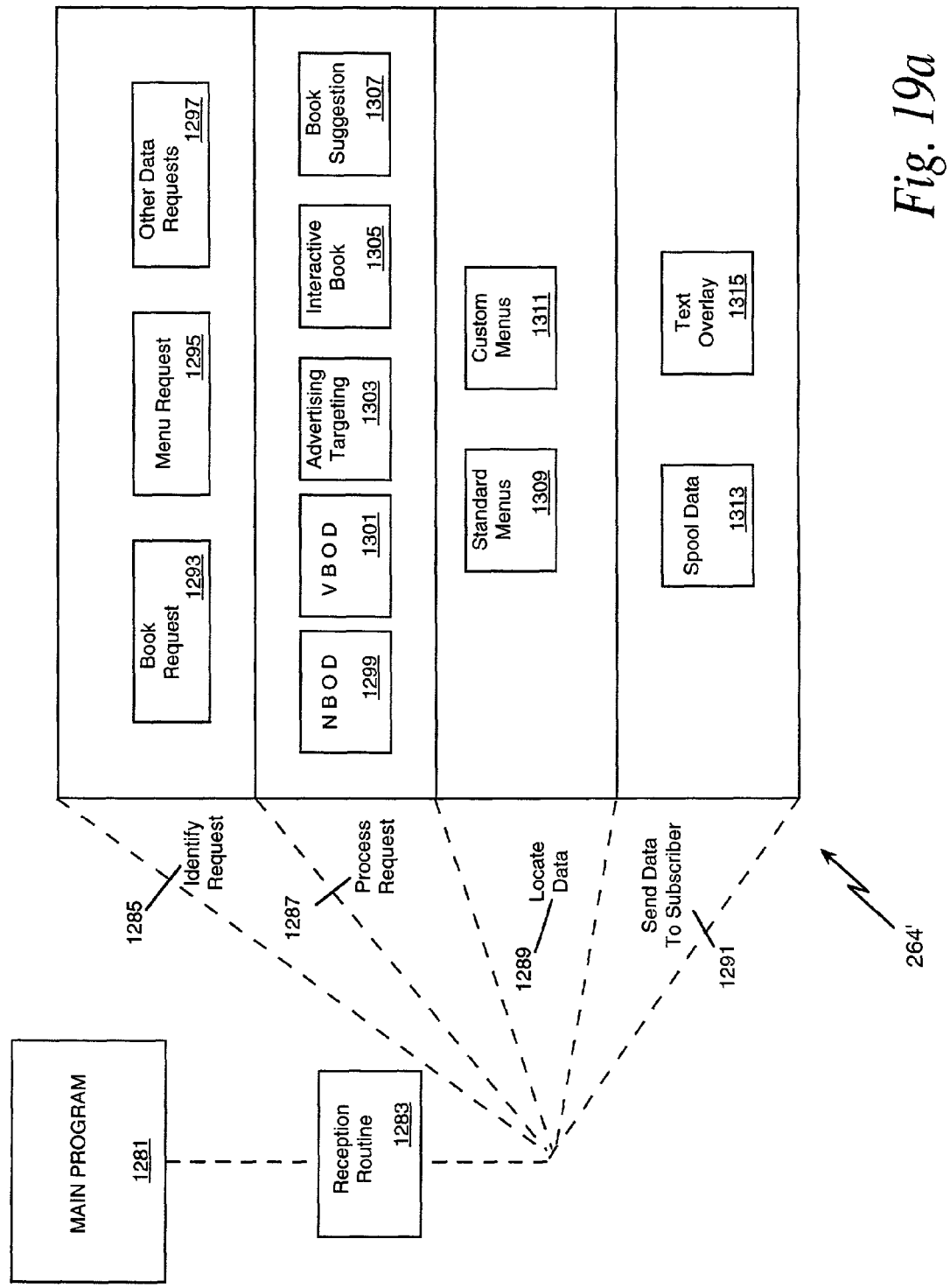
FIG. 19a shows an example of processing routines used with the book-on-demand system of FIGS. 18a and 18b.

The system controller 1076 includes control software 264 and an instruction memory to accomplish the processing capabilities of the distribution site 1020. FIG. 19a illustrates the various levels of processing capabilities that can be performed by the system controller 1076. Specifically, FIG. 19a illustrates an example of the processing routines 264' that are included within the control software 264.

As shown in FIG. 19a, the processing routines 264' include a Main Program 1281 that calls a Reception routine 1283 as subscriber communications are received. The first level of processing involves identifying the subscriber request 1285. This level of processing can use a Book Request routine 1293 and a Menu Request routine 1295 as well as other routines 1297 for other data requests. The second processing level involves processing the subscriber request 1287. This second processing level may make use of several routines, including a near electronic book-on-demand (NBOD) routine 1299, a virtual electronic book-on-demand (VBOD) routine 1301. The NBOD routine 1299 may be used to process electronic book orders with a resulting slight time delay, from a few minutes to a few hours, for example, between order and delivery. The VBOD routine 1301 may be used to process electronic book orders so that subscribers experience no perceptible delay between order and delivery of an electronic book. The second processing level may also include an advertisement targeting routine 1303, an interactive electronic book routine 1305, and an electronic book suggestion routine 1307. The third level of processing involves locating the data that corresponds to the subscriber's communication or request 1289. Typically, this third processing level may involve the use of a Standard Menus routine 1309 and/or a Custom Menus routine 1311. The final processing level involves sending the data located in the previous step to the subscriber 1291. This final level of processing can involve a Spool Data routine 1313 and a Text Overlay routine 1315.

Using such a set of processing levels, the system controller 1076 can use its control software 264 and processing routines 264' to: identify the type of subscriber request 1285 received in the subscriber communications; process the subscriber's request 1287 to determine the data to reply to the identified subscriber request; locate the reply data corresponding to the subscriber's request 1289; and send the located reply data to the subscriber 1291 for local processing by the subscriber's set top terminal. FIG. 19a provides only an example of the various processing capabilities available within the distribution site 1020 and those skilled in the art will recognize that a number of other variations in processing levels and routines are feasible.

Although other routines are feasible, the routines identified in FIG. 19a can be used to perform system controller 1076 monitoring and management functions. The Reception routine 1283 is the initial routine called by the Main Program 1281 upon receiving a subscriber communication. The Reception routine 1283 can be used to interpret the subscriber communication. The Reception routine 1283 designates the type of subscriber communication as an electronic book request, a menu request or, a data services request. Depending on the type of request, the Reception routine 1283 calls either a Electronic Book Request routine 1293, a Menu Request routine 1295, or an Other Data Requests routine 1297.

With reference to FIGS. 18b and 19a, the Electronic Book Request routine 1293 is one of the routines that identifies the type of request carried by the communications from a subscriber. The Program Request routine 1293 is called by the Reception routine 1283, 1283' for all subscriber communications that are related to delivery of an electronic book. The Program Request routine 1283, 1283' identifies the type of electronic book request in real time as a NBOD request, a VBOD request, an interactive electronic book request, and/or a request that may be used in the targeting of advertisements to a subscriber. The Electronic Book Request routine 1293 identifies the request and calls the appropriate routine to process the electronic book request.

The Menu Request routine 1295 is another routine that identifies the type of request carried by the communications received from a subscriber. The Menu Request routine 1295 is called by the Reception routine 1283 for all subscriber communications that are menu related. The Menu Request routine 1295 identities the type of menu request in real time as a standard menu or a custom menu. The Menu Request routine 1295 identifies the request and calls the appropriate routine to process the menu request.

The NBOD routine 1299 is one of the routines that can process an electronic book request. The NBOD routine 1299 is called by the Electronic Book Request routine 1293 in order to process a request for a NBOD. The NBOD routine 1299 determines whether a menu or an electronic book will be provided in response to the subscriber request. Where an electronic book is to be provided, the routine determines the transmission medium for transmission of the requested electronic book. The subscriber will subsequently be sent data that verifies the subscriber's terminal is coupled to that transmission medium. The NBOD routine 1299 calls the appropriate routine to locate and/or send the response to the subscriber.

The VBOD routine 1301 is another routine that processes an electronic book request. The VBOD routine 1301 is called by the Electronic Book Request routine 1293 in order to process a request for VBOD. The VBOD routine 1301 determines whether a menu or an electronic book will be displayed in response to the subscriber request. The VBOD routine 1301 calls the appropriate routine to locate and/or send the response to the subscriber.

The Advertisement Targeting routine 1303 is a routine that generates packages of commercials and advertisements geared towards particular subscribers. The Advertisement Targeting routine 1303 may make use of a subscriber's demographic information and/or reading habits to determine those advertisements that are of most interest to that particular subscriber. In so doing, the routine 1303 outputs packages of advertisements targeted towards each subscriber.

The Interactive Electronic Book routine 1305 is another routine that may process an electronic book request. The Interactive Electronic Book routine 1305 is called by the Electronic Book Request routine 1293 in order to process a request for an interactive electronic book. The Interactive Electronic Book routine 1305 makes use of a look-up table that pre-stores all possible subscriber answers to interactive questions posed by the interactive electronic book. The use of a look-up table enables the routine to process subscriber communications and determine a message or electronic book response that can be rapidly generated in order to perform real time interactivity.

The Electronic Book Suggestion routine 1307 is a routine that responds to a menu request 1295. The Electronic Book Suggestion routine 1307 generates particular menus displaying programs for subscriber selection that are geared towards particular subscribers. The Electronic Book Suggestion routine 1307 may use a subscriber's demographic information and/or reading habits to determine those electronic book or electronic book categories that can be suggested to the subscriber. The routine may also, for example, make use of text searches of electronic book abstracts or query the subscriber for mood in order to determine a suggestion. Thus, the Electronic Book Suggestion routine 1303 can determine whether electronic book data or a menu should be sent to the subscriber in order to carry out the suggestion process.

Once one of the above routines that processes requests has been run, one of routines that can be used to locate data and generate menus can be called. The Standard Menus routine 1309 is a routine that is used to locate data in the file server 1072 and generate a standard or generic menu that can be sent to any subscriber. The Standard Menus routine 1309 makes use of menus that are pre-stored in the file server 1072. The Standard Menus routine 1309 locates the data for the pre-stored menus so that the located data for the menu can be subsequently sent to a subscriber.

The Custom Menus routine 1311 is a routine that is used to locate data and generate a custom menu that is to be sent to a specific subscriber. Because the custom menu must be rapidly created and sent to the subscriber, the Custom Menu routine makes use of a standardized menu format having pre-stored background sections so that video data, such as MPEG 2 data streams, and future MPEG data streams or other encoded data streams can be built for sections of the menu screen in anticipation of the subscriber's communication. In conjunction with the pre-stored menu sections, the routine also makes use of a look-up table that can be used to generate text messages of pre-determined lengths. The routine can then insert or interleave the generated text messages with the pre-built data streams in order to generate a customized menu screen in real time. Alternatively, the menu screen can be built in full and text messages overlaid using text overlaying techniques.

Once a menu has been located or generated or an electronic book request has been otherwise processed, the MPEG 2 data stream or the encoded data stream located or generated must be sent to a subscriber. The Spool Data routine 1313 is a routine that is used to spool such located or generated data. The Spool Data routine 1313 prompts the file server 1072 to send the located or generated data to the subscriber.

The Electronic Book Suggestion routine 1315 is another routine that can be used to send the located or generated data to a subscriber. This routine allows data to be sent to a subscriber in the form of text that can be overlaid on a menu or an electronic book. The routine accommodates both methods of (i) sending text embedded in a signal carrying the menu data, which enables a terminal with a text generator to process the signal and text message and overlay the text onto the menu; and (ii) generating a text message and inserting the text message at the distribution site 1020 into the signal that carries the menu data before the signal is distributed to the terminals.

In addition to the above routines, many other routines 1297 may be used by the system controller 1076 in performing its processing functions. For example, an Account/Billing routine may be run to generate billing reports for each terminal. Those skilled in the art will recognize a number of other routines and processing flows that can be used to perform the same functions.

Figure 19B:
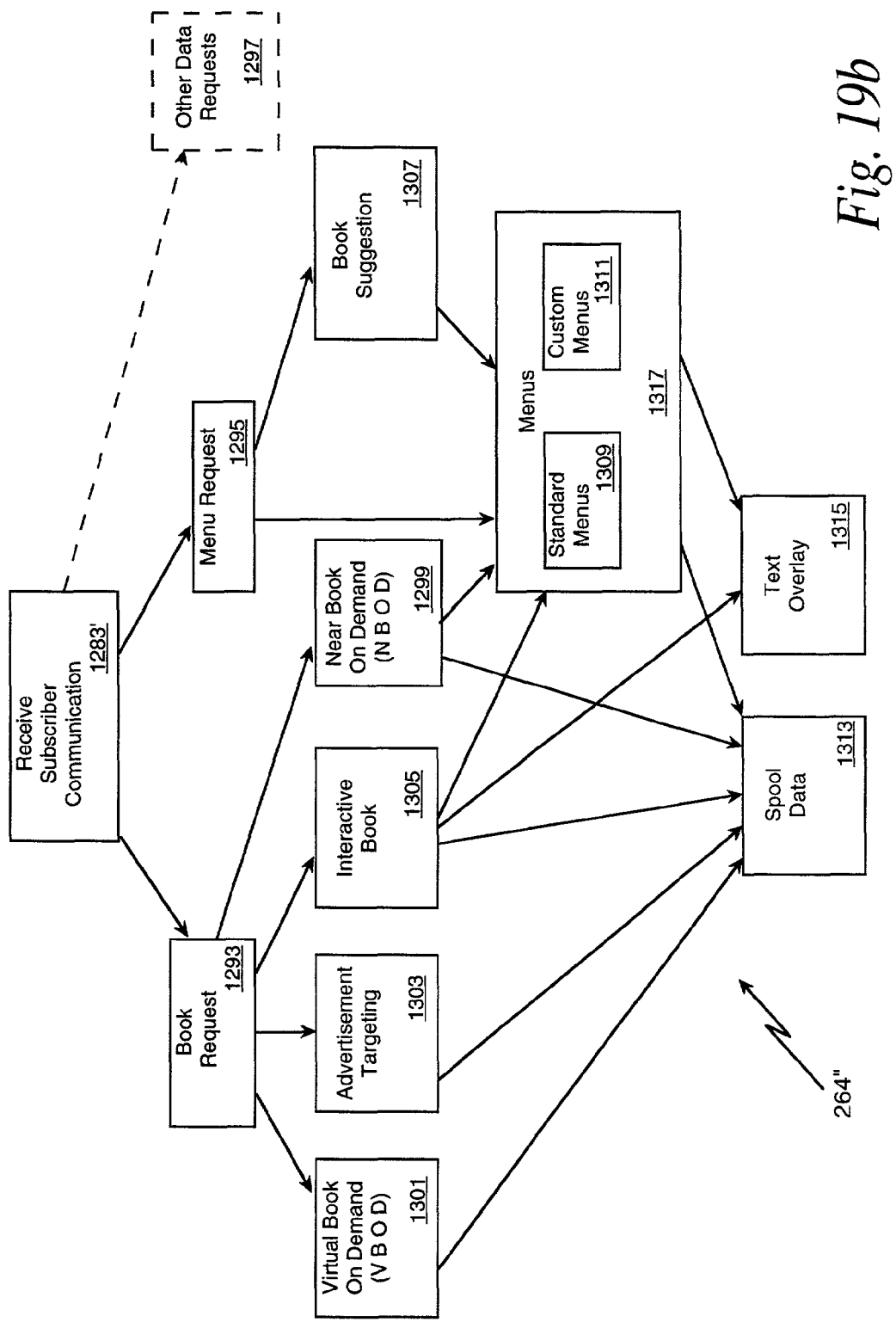

FIG. 19*b* provides a sample decision tree 264" for the various processing routines 1264' that are depicted in FIG. 19*a*. The sample decision tree 264" illustrates the steps that the system controller 1076 may perform in processing subscriber communications. For example, where a subscriber is reading an interactive electronic book and wishes to respond to a question included in the interactive electronic book, the subscriber's answer could be received by a Receive Subscriber Communications routine 1283'. This routine 1283' would interpret the subscriber's communication and identify the subscriber's answer as an electronic book request, calling the Electronic Book Request routine 1293.

The Electronic Book Request routine 1293 could, in turn, call the Interactive Electronic Book routine 1305 in order to process the subscriber's request. The data corresponding to the response to the subscriber's request (or "answer" in this example) would then be located and spooled for distribution to the subscriber by the spool data routine 1313. If the response to the subscriber's answer processed by the Interactive Electronic Book routine 1305 requires the use of a menu or another method for generating a question to the subscriber, the Menus routine 1317 would be called before the data is spooled by the Spool Data routine 1313 or the question is overlaid on the interactive electronic book using the Text Overlay routine 1315. The decision tree 264" in FIG. 19*b* allows all subscriber communications and/or requests to be processed by the various routines 264' that are used with other distribution site 1020 components. Other embodiments of an interactive electronic book are described in detail in copending patent application Ser. No. 09/289,958, entitled INTERACTIVE ELECTRONIC BOOK, filed Apr. 13, 1999, the disclosure of which is hereby incorporated by reference.

As noted above, the Spool Data routine 1313 prompts the file server 1072 to send data to a terminal such as the terminal 601*a*. In an embodiment, the Spool Data routine 1313 prompts the file server 1072 to send a first portion of the requested electronic to the subscriber. In an embodiment, the first portion may correspond to the first chapter of the electronic book, plus any preface or other introductory matter. The duration of transmission for the first portion may be short. In an embodiment, the first portion can be transmitted from the distribution site 1020 in real-time. In another embodiment, the first portion may be downloaded from the distribution site 1020 or the operations center 250 to the terminal 601*a* on a periodic or cyclical basis. If downloaded, the terminal 601*a* may display the first portion of the electronic book by retrieving the first portion from memory. The terminal 601*a* would then send a signal to the distribution site 1020 requesting that the remainder of the selected electronic book be delivered to the terminal 601*a* from memory. In operation, the subscriber would select a desired electronic book preferably from a menu of available electronic books. If the first portion of the desired electronic book has been delivered to and stored in the terminal 601*a*, the terminal 601*a* will decrypt and display the selected electronic book. The terminal 601*a* may then transmit an electronic book order to the distribution site 1020.

In an embodiment, first portions of electronic books may be broadcast or provided to subscribers using various means. In this embodiment, remaining portions of the electronic books may be linked electronically using an electronic link system, which will be described in detail in Section VIII.

Upon receiving the electronic book request, the system controller 1076 at the distribution site 1020 directs the file server 1072 to retrieve a remaining portion of the requested electronic book. The file server 1072 then sends the remaining portion of the requested electronic book to the terminal 601*a*. Alternatively, the file server 1072 may retrieve and send the entire electronic book. Upon receipt at the terminal 601*a*, the entire electronic book may be stored in memory, and may overwrite the first portion of the electronic book or may overwrite other electronic books or portions of electronic books stored in memory.

In another embodiment, the remaining portion of the requested electronic book is retrieved from an archive 275, which can be remotely located. Examples of archives include a library, an off-site storage, a repository, a central server, and an electronic bookstore coupled to the distribution site 1020 and the terminal 601*a* by a telecommunications network, including the Internet. The remaining portion of the requested electronic book is transmitted from the archive 275 directly to the terminal 601*a*. Alternatively, the remaining portion is transmitted to the distribution site 1020. The distribution site 1020 stores the remaining portion in the memory 1040. The distribution site 1020 then transmits the remaining portion to the terminal 601*a* using a high speed data path, such as the data path 1044 shown in FIG. 18*a*. Other examples of such data paths include various ATM networks, satellite transmissions, fiberoptics, personal communications networks, wireless communications, cellular networks, telephone lines, and similar technologies.

FIG. 20*a* shows another embodiment of an on-demand electronic book system 1001 that may be used to distribute electronic books. Original content providers such as the content provider 282 send electronic books to a distribution site. The content provider may be a book, newspaper or magazine publisher, for example. The distribution site could be the operations center 250 of a cable television or satellite television delivery system. The content providers could also send the electronic books to an electronic book club 283 or make the electronic books available using the Internet web site 279. The electronic book club 283 also may deliver electronic books to subscribers using the Internet web site 279 or the operations center 250, for example. The content provider 282 also may send books to a conversion facility 282' that converts hard-copy text and graphics into digital data that forms the electronic book. While FIG. 20 shows the content provider 282, the conversion facility 282', the electronic book club 283 and the operations center 250 as separate components of the electronic book-on-demand system 1001, one or more of these components may be co-located.

Orders for electronic books are received at a remote location such as the operations center 250. The orders could alternately be received at other remote locations such as the cable television headend 251, electronic bookstores 252', libraries 254, the Internet web site 279, a regional distributor 253, the billing and collection system 278, or any other remote location. For example, a subscriber using the home system 258 could send an electronic book order using the telecommunications network 255 to the library 254, the electronic book store 252', the Internet web site 279 or the operations center 250. The telecommunications network 255 may be any network capable of two-way communications, including a public switched telephone network (PSTN) and a local area network (LAN), for example. Alternate delivery and ordering paths are described in detail in copending U.S. patent application Ser. No. 09/289,957, entitled ELECTRONIC BOOK ALTERNATIVE DELIVERY SYSTEMS, filed Apr. 13, 1999, the disclosure of which is hereby incorporated by reference.

Figure 20B:
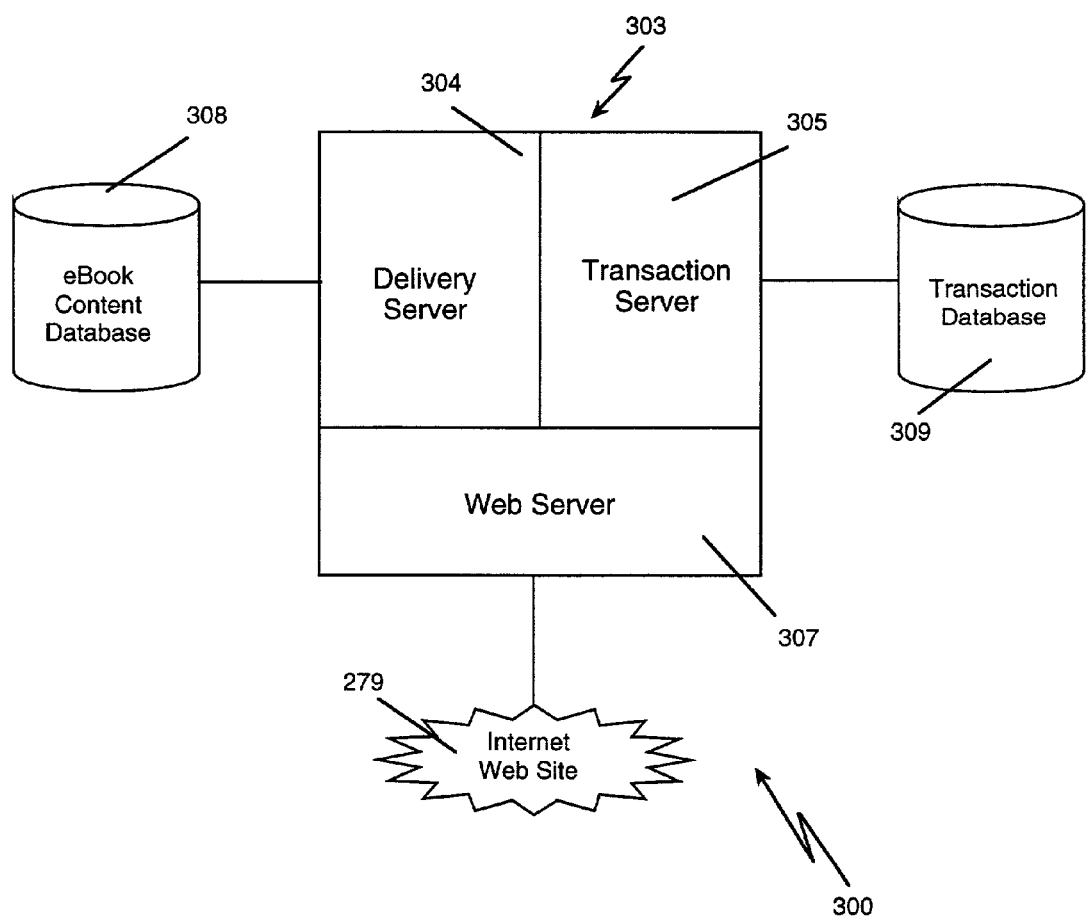

FIG. 20*b* shows an embodiment of an electronic book-on-demand system 300 that operates through the Internet web site 279. The system 300 includes an electronic book content database 308 on which are maintained electronic files of data corresponding to hard copy books, magazines, newspapers and other printed materials. A transactions database 309 maintains information related to subscriber orders, billing and related information. The transaction database 309 may also contain subscriber profiles and other subscriber-specific data, including demographic data and subscriber-entered data, for example. A server platform 303 provides for receipt of electronic book orders, processing, and delivery of electronic books to subscribers through the Internet web site 279. The server platform 303 may include a delivery server 304, a transaction server 305 and a web server 307.

The web server 307 provides access by subscribers using Internet communications including, for example, returning a web page when subscribers access the Internet web site 279.

The transaction server 305 receives electronic book orders from the web server 307. The transaction server 305 then performs several operations, such as verifying the status of a subscriber, verifying a personal identification number (PIN), if used, checking the subscriber account balance, or processing the subscriber's payment, recording the transaction, including the specific electronic book ordered, and providing an authorization code to the delivery server 304. The transaction server 305 may also format and provide messages to the subscriber, including statements of accounts, messages indicating the status of an electronic book order and other electronic mail messages related to the operation of the system 300.

The delivery server 304 receives the electronic book order from the web server 307 and the authorization code and other data from the transaction server 305. The delivery server 304 retrieves the ordered electronic book from the electronic book content database 308 and prepares the ordered electronic book for delivery to the subscriber through the Internet web site 279. This preparation may include formatting, compression, and security processing.

Figure 20C:
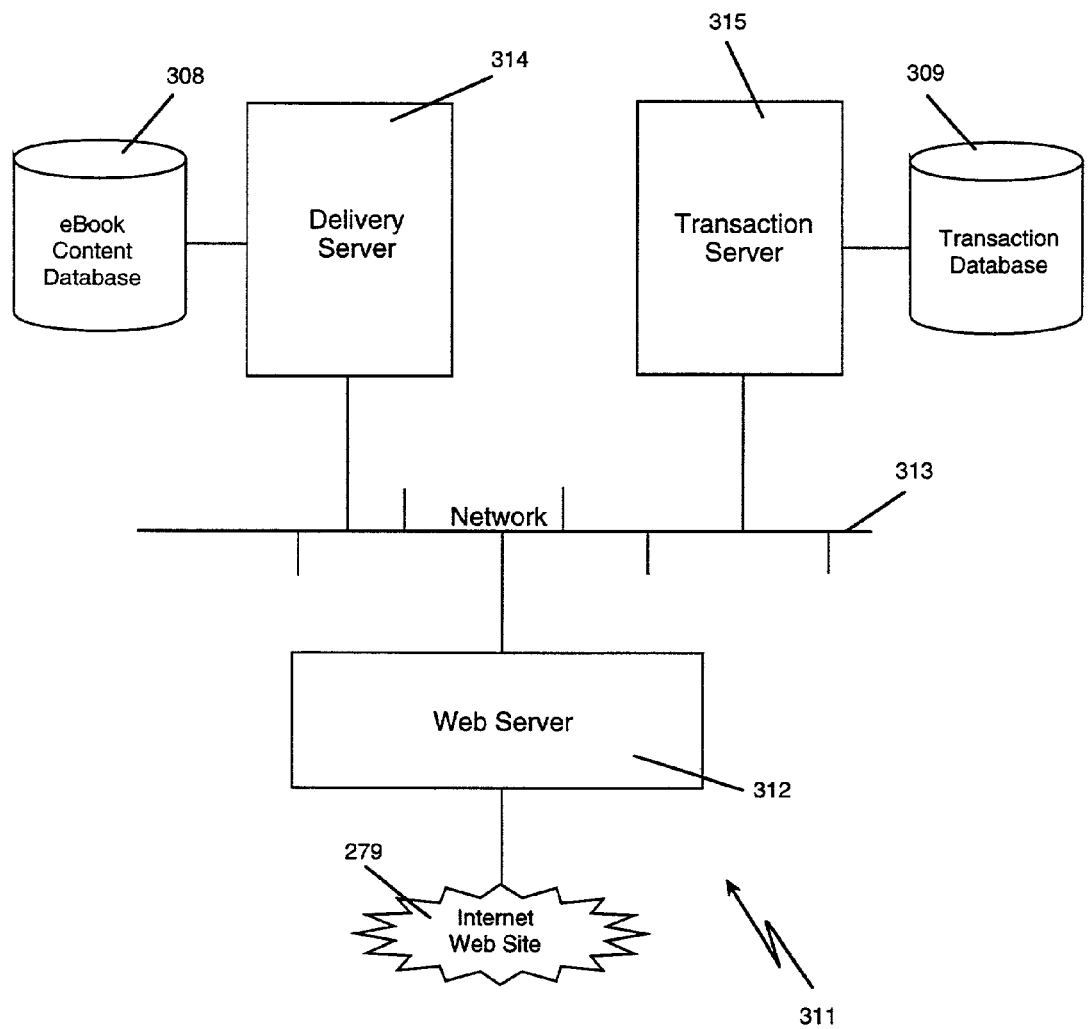

FIG. 20*c* shows another embodiment of an electronic book-on-demand system. In FIG. 20*c*, an electronic book-on-demand system 311 is accessed through the Internet web site 279. The system 311 includes a web server 312 that receives inputs from subscribers through the Internet web site 279 and returns a web page to the subscribers. The web server 312 connects to a high speed network 313. The high speed network may be a local area network, a wide area network on the Internet, for example. Coupled to the network 313 is a transaction server 315. The functions of the transaction server 315 are similar to those of the transaction server 305 described with respect to FIG. 20*b*. The transaction server 315 accesses the transaction database 309 to record information regarding subscriber electronic book orders and to authorize electronic book orders, initiate billing, and provide messages to the subscribers, as appropriate. The network 313 also connects to a delivery server 314. The functions of the delivery server 314 are similar to those of the delivery server 304 described with respect to FIG. 20*b*. The delivery server 314 accesses the electronic book content database 308 to package and deliver requested electronic book to the subscriber through the Internet web site 279.

Figure 20D:
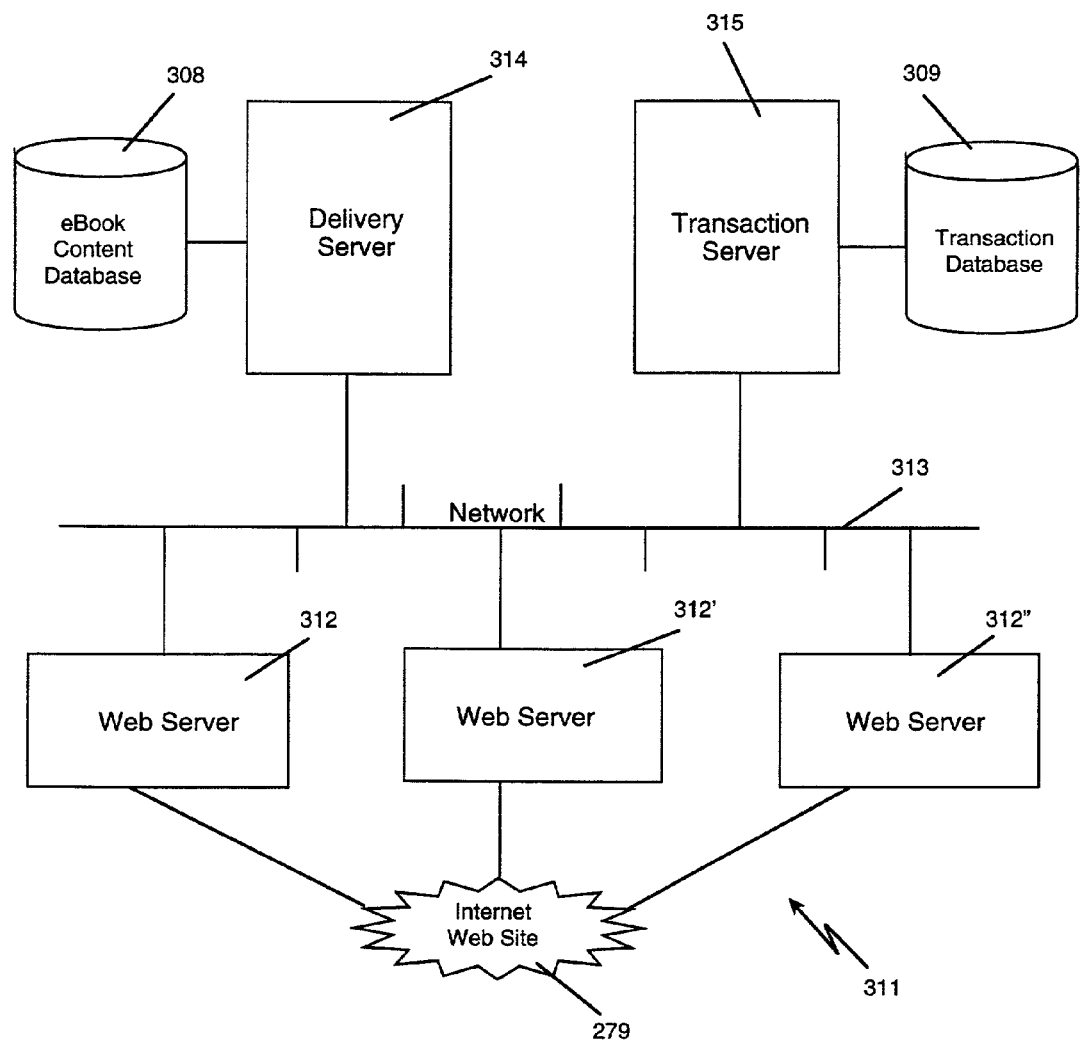

FIG. 20*d* shows another example of an electronic book-on-demand system. In FIG. 20*d*, an electronic book-on-demand system 320 receives electronic book orders from subscribers using the Internet web site 279. The system 320 includes web servers 312, 312' and 312". By using additional web servers, the system 320 may provide faster service to subscribers requesting electronic books and may be able to handle a greater number of concurrent requests for electronic books. Although the system 320 is shown with three web servers 312, 312' and 312", more than or less than three web servers may be incorporated into the system 320. The web servers 312, 312' and 312" perform the same functions as the web server 307 described with respect to FIG. 20*b*. The web servers 312, 312' and 312" are coupled to the delivery server 314 and the transaction server 315 using the high speed network 313.

Figure 20E:
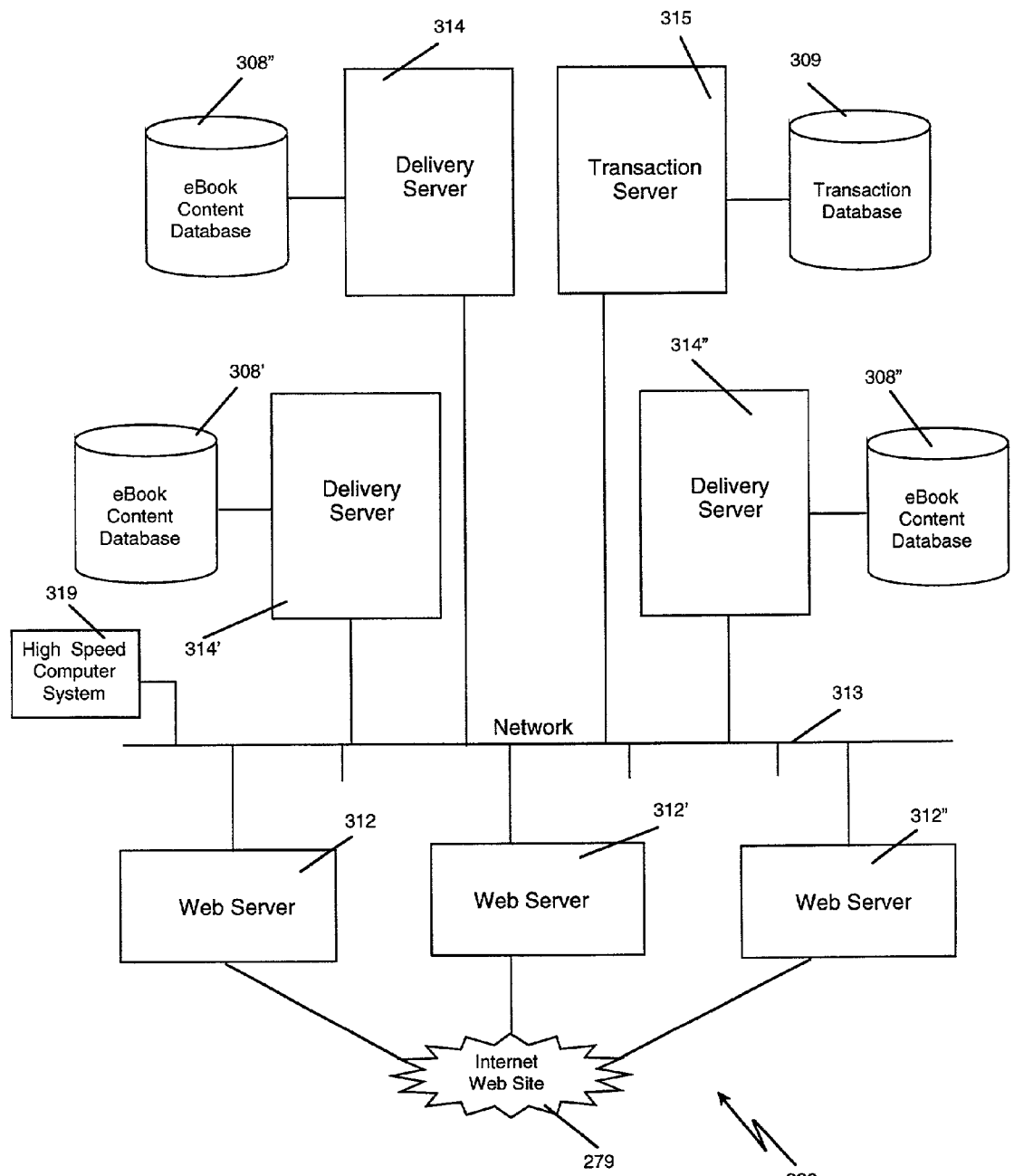

FIG. 20*e* shows yet another embodiment of an electronic book-on-demand system. An electronic book-on-demand system 330 receives electronic book orders using the Internet web site 279. The web servers 312, 312' and 312" function as previously described with respect to FIG. 20*d*. The web servers 312, 312' and 312" connect to the high speed network 313. The transaction server 315 and the transaction database 309 also connect to the network 313. The transaction server 315 and the transaction database 309 function as described with respect to FIG. 20*d*.

Electronic book-on-demand system 330 differs from previous embodiments in that three delivery servers 314, 314' and 314" and associated electronic book content databases 308, 308' and 308" are used to delivery electronic books through the Internet web site 279 to subscribers. To optimize performance of the electronic book-on-demand system 330, the electronic book content databases 308, 308' and 308" may store the same electronic books for delivery. In this arrangement, should the delivery server 314 reach capacity, the delivery server 314', for example, could begin sending electronic books to the subscribers. If both the delivery servers 314 and 314' reach capacity, then the delivery server 314" could begin sending electronic books to the subscribers.

In an alternate arrangement, the electronic books to be delivered to the subscribers by the electronic book-on-demand system 330 could be split among the electronic book content databases 308, 308' and 308". For example, the electronic book content databases 308, 308' and 308" could each store one-third of the available electronic books in the electronic book-on-demand system 330. Other schemes may also be used, such as storing the most popular content at the electronic book content database 308, technical documents such as electronic text books and less popular works on the electronic book content database 308', and electronic magazines and newspapers at the electronic book content database 308". Still other electronic book content storage schemes are available to optimize electronic book-on-demand system 330.

To further optimize performance of the electronic book-on-demand system 330, the system could connect to one or more high speed computer systems such, as the system 319. Should the electronic book-on-demand system 330 reach capacity, servers (not shown) in the computer system 319 can assume the processing and delivery functions of the delivery servers 314, 314' and 314". When the peak demand has subsided, the computer system 319 would cease the processing and delivery functions. Thus, by sharing resources with other high speed computer systems, the electronic book-on-demand system 330 can meet demand, even when that demand exceeds system capacity.

Figure 21A:
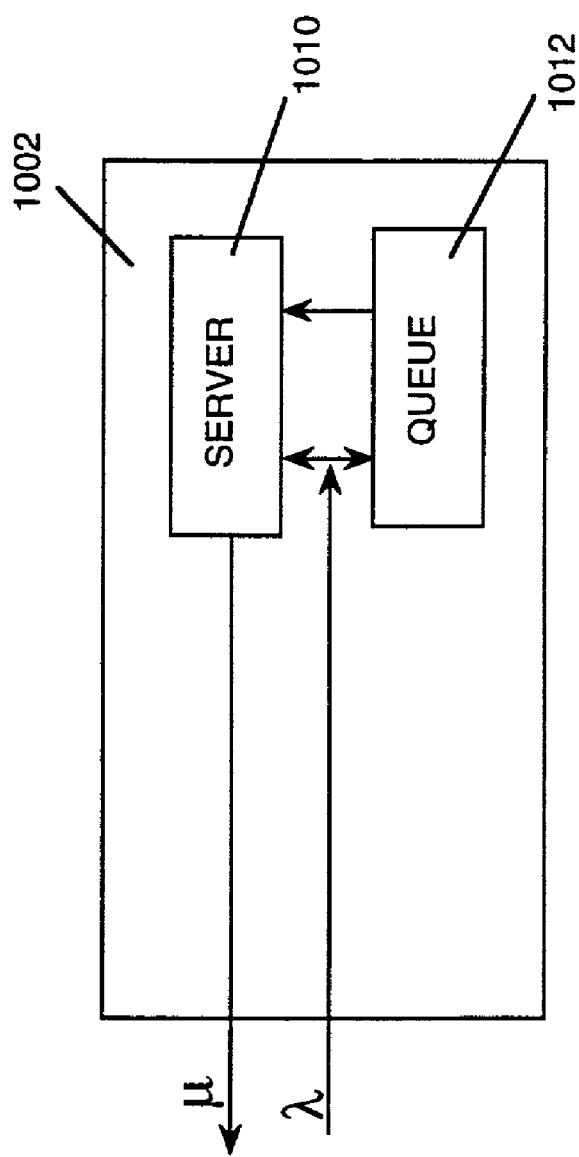
FIG. 21a is a block diagram of an alternative book-on-demand system.

In any electronic system used for delivery of electronic books, some processing delays may occur from the time an electronic book order arrives at a remote location such as the operations center 250 shown in FIG. 2. FIG. 21*a* shows an electronic book-on-demand system 1002 that may be used for near real-time processing and delivery of electronic books. The system 1002 includes a processor or server 1010 that processes the electronic book orders. A queue 1012 stores pending electronic book orders that await processing by the server 1010. If the server 1010 is available for processing, the electronic book order will be serviced immediately. Otherwise, the electronic book order may enter the queue 1012 to await availability of the server 1010. When the server 1010 becomes available, an electronic book order leaves the queue 1012 and is serviced. Queues, such as the queue 1012, may be any type of queue such as a first-in-first-out (FIFO) queue, for example. Alternately, the system 1002 could include more than one queue. Then, one or more of the queues may operate on a priority basis so that orders for certain electronic books or orders placed by certain subscribers may be placed in a higher priority queue that will be accessed in preference to lower priority queues.

A well-known queuing model may be used to explain the fundamental operation of the electronic book on demand system 1002. To describe the basic queuing model that determines the operation of the system 1002 shown in FIG. 21*a* some fundamental quantities of interest are:

L, the average number of orders in the system 1002;
$L_Q$, the average number of orders in a queue;
W, the average amount of time an order spends in the system 1002;
$W_Q$, the average amount of time that an order spends waiting in a queue.

Different models may be created to describe processing of electronic book orders. The simplest model assumes a single server that is able to process the electronic book orders in a serial fashion. Electronic book orders enter the system 1002, and are either immediately processed for delivery, entered into the queue 1012, or are not retained in the system 1002, possibly because the capacity of the queue 1012 is exceeded.

FIG. 21*a* illustrates a single server model in which the electronic book orders arrive at the system 1002 with a Poisson process having rate $\lambda$. That is, the times between successive arrivals are independent exponential random variables having a mean $1/\lambda$. Each electronic book order, upon arrival at the system 1002, goes directly into the server 1010 if the server 1010 is available for processing. If the server 1010 is not available for processing, the electronic book order goes into the queue 1012. The server 1010 is considered available for processing if it is not currently processing an electronic book order for delivery.

The server 1010 processes an electronic book order at a rate $\mu$. When the server 1010 finishes processing the electronic book order, an electronic book leaves the system 1002, and the next electronic book order in the queue 1012, if any, enters the server 1010. Successive service times are assumed to be independent exponential random variables having a mean $1/\mu$.

Figure 21B:
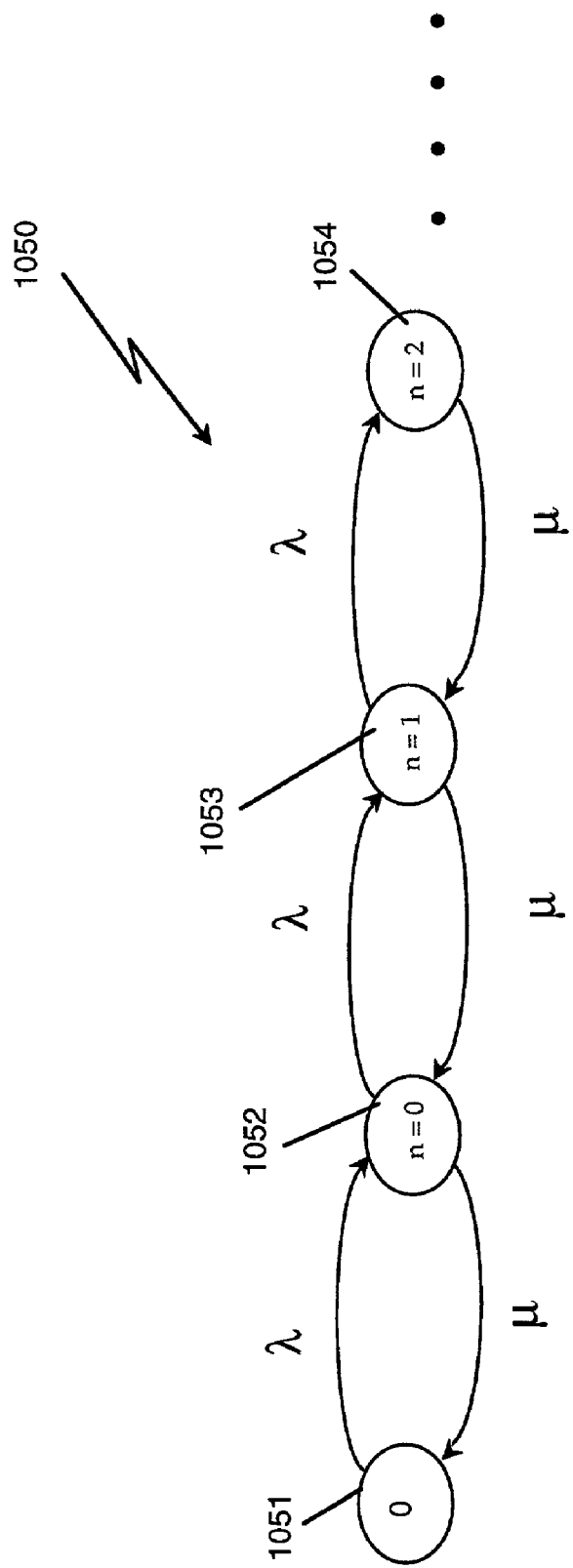

The above queuing model may be called a memoryless or Markovian model because both the interarrival and service distributions are exponential. Such a model may be defined by the states that are allowable. FIG. 21*b* shows a simplified state machine 1050 for the system 1002 having the single server 1010 and the single queue 1012. The system 1002 may operate in one of several states. In state 1051, there are no orders in the system 1002. When a first order is received in the system 1002, the state machine 1050 transitions to state 1052. The transition to state 1052 occurs at the rate $\lambda$, which is the rate associated with arrival of orders in the system 1002. In state 1052, since there is only the first order in the system 1002, the server 1010 immediately begins processing the first order at the rate μ. If the server 1010 completes processing of the first order before another electronic book order enters the system 1002, the state machine 1050 transitions back to state 1051. As shown in FIG. 21*b*, the transition back to the state 1051 occurs at a rate which is just the rate of processing the electronic book order in the server 1010.

From state 1052, the state machine 1050 may also transition to state 1053. In state 1053, the first electronic book order is being processed by the server 1010, and during the processing, a second order arrives at the system 1002. The second order cannot be processed, and so enters the queue 1012.

From the state 1053, the state machine 1050 can transition to the state 1052 at the rate μ, when the server 1010 completes processing the first electronic book order before an arrival of a third electronic order. The state machine 1050 may also transition to the state 1054 at the rate λ, which occurs when a third order arrives in the system 1002 before the server 1010 completes processing the first electronic book order. In the state 1054, the third electronic book order enters the queue 1012 to await processing.

To compute the expected amount of time that an electronic book order remains in the system 1002, an average number of electronic book orders is simply divided by the arrival rate, or:

$$W = L/\lambda \qquad \text{Equation 1.}$$

Equation 1 assumes that all electronic book orders that arrive at the system 1002 are processed by the server 1010.

In the state machine 1050 shown in FIG. 21*b*, all arriving electronic book orders are either immediately processed by the server 1010, or enter the queue 1012. However, if the queue 1012 has a finite capacity, some arriving electronic book orders may not be processed by the server 1010 and may not enter the queue 1012. These electronic book orders could therefore be "lost" in a manner analogous to a man entering a barber shop who sees all chairs filled and too many customers waiting and therefore decides to leave the barbershop. The system 1002 may therefore be designed to process orders (i.e., have sufficient server capacity) and store pending orders (i.e., have sufficient storage capacity in the queues) so that all electronic book orders that enter the system 1002 eventually are processed by the server 1010. Server capacity may be increased by adding additional servers, for example. Additional servers and queue capacity would be added as needed to prevent any lost orders.

Figure 22A:
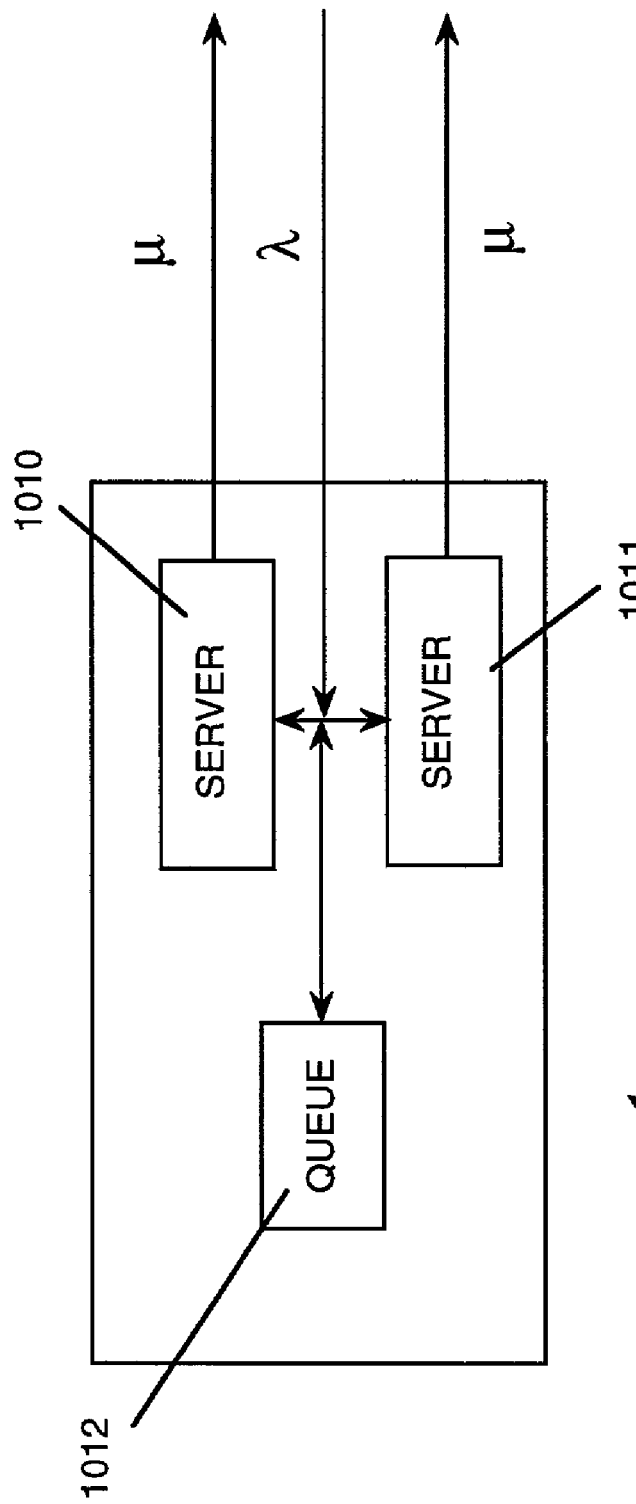
FIG. 22a is a block diagram of an alternative book-on-demand system.

FIG. 22*a* shows an electronic book delivery system 1003 in which two servers are used to process electronic book orders. In FIG. 22*a*, the server 1010 and a second server 1011 may receive electronic book orders, and provide electronic books. If both servers 1010 and 1011 are processing orders, any subsequent electronic book orders will enter the queue 1012. When a server is available, the electronic book orders pending in the queue 1012 may be processed in a FIFO manner, for example.

Figure 22B:
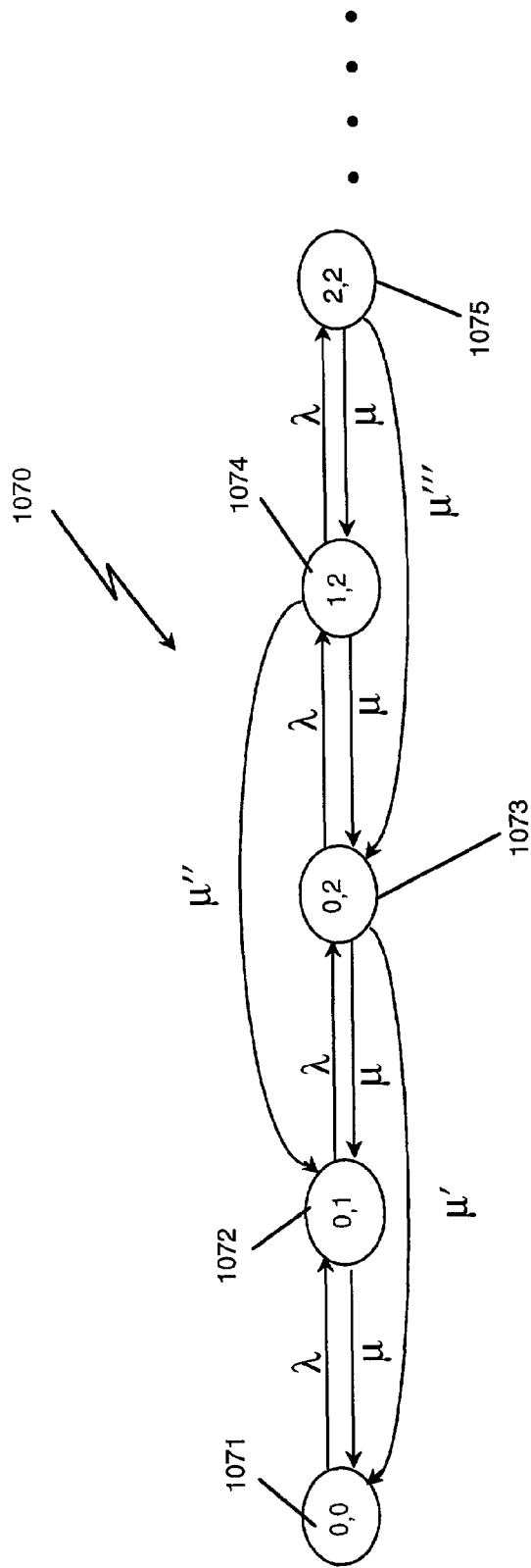

FIG. 22*b* shows a state machine 1070, for use in the system 1003, in which the two servers 1010 and 1011 are used to process orders. The system 1003 may include a number of different states related to the number of electronic book orders that are pending. Electronic book orders arrive at a rate λ and are processed at a rate μ. In state 1071, the system 1003 exists with no pending electronic book orders. The state machine 1070 may remain in state 1071 or transition to state 1072 with probability, or rate, λ. In state 1072, the system 1003 exists with a first electronic book order, which is immediately processed by the server 1010. From the state 1072, the state machine 1070 may return to the state 1071 with probability μ, the rate of processing an electronic book order in the system 1003. The state machine 1070 returns to the state 1071 if the first electronic book order is processed before the arrival of a second electronic book order. If the second electronic book order arrives at the system 1003 while the first electronic book order is being processed, the state machine transitions to state 1073, and the server 1011 begins processing the second electronic book order. From the state 1073, the state machine 1070 may transition to the states 1071, 1072 or to state 1074. The state machine 1070 transitions to the state 1074 if a third electronic book order arrives at the system 1003 while the first and the second electronic book orders are being processed. In the state 1074, the third electronic book enters the queue 1012 because no servers are available. The state machine 1070 transitions to the state 1071 if the processing of the first and the second electronic book orders completes at the same time. The transition probability μ' from state 1073 to 1071 may be the same as, or different from the transition probability μ. Otherwise, the state machine transitions to the state 1072, with one electronic book order (either the first or the second) remaining in the system 1003 and being processed. The process continues through state 1075 and subsequent states, assuming the queue 1012 has an infinite capacity or that the arrival rate λ is greater than the processing rate μ. That is, electronic book orders are processed slower than they arrive.

In an electronic book delivery system, electronic book orders may undergo more than one distinct processing step. That is, an electronic book order may enter an authorization subsystem, and may be queued in that system. After processing in the authorization subsystem, the electronic book order may arrive at a processing subsystem and be queued at the processing subsystem.

In the discussion above regarding FIGS. 21*a* to 22*b*, the servers 1010 and 1011 were considered to be unavailable for processing any electronic book orders arriving at the electronic book delivery system if the servers 1010 and 1011 were engaged in processing an existing electronic book order. That is, the servers 1010 and 1011 could only process one electronic book order at a time. In an embodiment, a server may processes many electronic book orders in parallel. That is, a server may include several parallel processors that execute tasks associated with filing an electronic book order. For example, a server may include several parallel processors tied to a common processor bus. The processor bus is coupled to a memory controller and to one or more input/output (I/O) controllers. However, the server may have a finite capacity. The server models shown in FIGS. 21*a* to 22*b* apply equally to the situation in which the server processes several electronic book orders simultaneously.

As described above, to ensure that all received electronic book orders are processed, the electronic book delivery system may incorporate a buffer, or queue. The queue stores electronic book orders that have entered the system while the processing system is occupied processing other electronic book orders. The memory capacity of the queue may be chosen so that no electronic book orders are "lost." However, such a queue may need to have a prohibitively large capacity. The queue capacity could also be chosen based on market surveys or other information that indicates what a peak load on the system may be. If the expected peak load is exceeded, then electronic book orders may be lost. Alternatively, the system may incorporate switching features that use extra memory capacity in other memory areas of the system, or in other connected systems. For example, if the queue fills, the processor may signal intermediate delivery modules not to accept (not to forward) the electronic book order. In this example, cable headends, such as the cable headend 251 shown in FIG. 18*b*, for example, may store pending electronic book orders until the operations center 250 signals that it is again available to receive requests. The operations center 250 may provide a confirmation menu to the ordering terminal, such as the home system 258, that indicates how much time is expected before the delivery of the electronic book can be completed.

In another embodiment, a processor associated with the electronic book delivery system, such as the systems 1002 and 1003, could survey orders in a queue to determine if any orders were for a same electronic book. In this case, a server could process all such orders for the same electronic book at one time. The electronic books could then be distributed to the multiple requesting subscribers using broadcast distribution and addressing. The broadcast electronic books may also be encoded on a per user bases to provide security from unauthorized use. For example, the broadcast electronic book may be encoded such that it can be decrypted by any of the targeted users having an appropriate decryption key.

VII. Virtual on-Demand Electronic Book Delivery System and Method

The systems described above work well to distribute electronic books in a pull-type arrangement, i.e., a system in which subscribers initiate all electronic book orders. In a push-type electronic book delivery system, content, in the form of one or more electronic books and other related data, may be continually or periodically sent, or broadcast, to subscribers.

A virtual on-demand electronic book (VBOD) system includes mechanisms for providing content, or electronic books, from centralized sources to terminals, such as the terminals 601a, 601b, or 601c, which may include the viewer 266 and the library 262. The general approach to providing the content may follow two fundamental models. First, popular content may be broadcast on a cyclical basis and may be available to multiple subscribers at any time. Popular content may be content that is requested by a large number of subscribers or is promoted heavily by content providers. Second, less-popular content may be transmitted upon specific request by subscribers. For example, an electronic version of a New York Times "best seller" may be transmitted cyclically while an electronic version of an obscure classroom textbook may be transmitted only on request by a specific subscriber. In this model, content can be viewed as a queuing model, where the broadcast medium (or media) services the queued content elements. As with any queued system, there are queuing delays from the time an element is requested until the element can be sent. These delays are variable, based on the number of elements queued and the number of concurrent or overlapping requests to queue new elements. As such, during non-busy times, requests for specific content are likely to be serviced on-demand, that is, there will be a very small delay due to queuing. However, with traditional approaches, at busy times the delay may be substantial, and the service may not be able to meet the subscriber's expectation of on-demand service.

By moving the content from a central broadcast point to the electronic book viewer 266 or the library 262, the queuing delay problem may be avoided. For example, if a subscriber's electronic book viewer 266 or library 262 was downloaded with all of the popular content, the subscriber would have true on-demand access to this content without the need to download the content upon subscriber request. Actual access to the content could still be controlled by use of an access code, for example, such that the subscriber would have to pay for the content (i.e., the electronic book) and receive an authorization code from the content provider in order to view a specific electronic book.

In an alternative embodiment, a selection of electronic books could be broadcast to a requester or subscriber and stored in the viewer 266. The subscriber could then access one or more of electronic books from the selection of electronic books. By accessing an electronic book from the selection of electronic books, the subscriber may then register an electronic book sales transaction. The transaction is stored in memory in the viewer 266 until the next time the viewer communicates with the electronic book delivery system, or alternatively, with the billing and collection system 278. Software in the viewer's microprocessor may then initiate a message that is transmitted to the electronic book delivery system, thereby finalizing the sales transaction.

Although the approach of mass broadcasting may work well from a subscriber's perspective, the approach may require extensive storage capacity in the electronic book viewer 266 or library 262.

In an alternate embodiment, the electronic book viewer 266 could be provided with the first "n" pages of content from each popular electronic book (a "First Section" or "Auxiliary Section" rather than the entire electronic book). A subscriber could begin accessing the content immediately, while the remaining content (a "Section Section" or "Main Section") is queued for transmission (or captured as a cyclical transmission by the viewer 266) based on the subscriber's interest in the content.

This alternate embodiment may use the approach of broadcasting the first section of multiple content elements, storage of the first sections in the electronic book viewer 266 or library 262, and subsequent queuing and reduced cyclical broadcasting of content in a background mode rather than an on-demand mode. True on-demand broadcasts are then reserved for the first sections of less-popular (i.e., content that does not warrant any cyclical broadcasting) electronic books specifically requested on-demand by electronic book system subscribers or requesters.

Figure 23A:
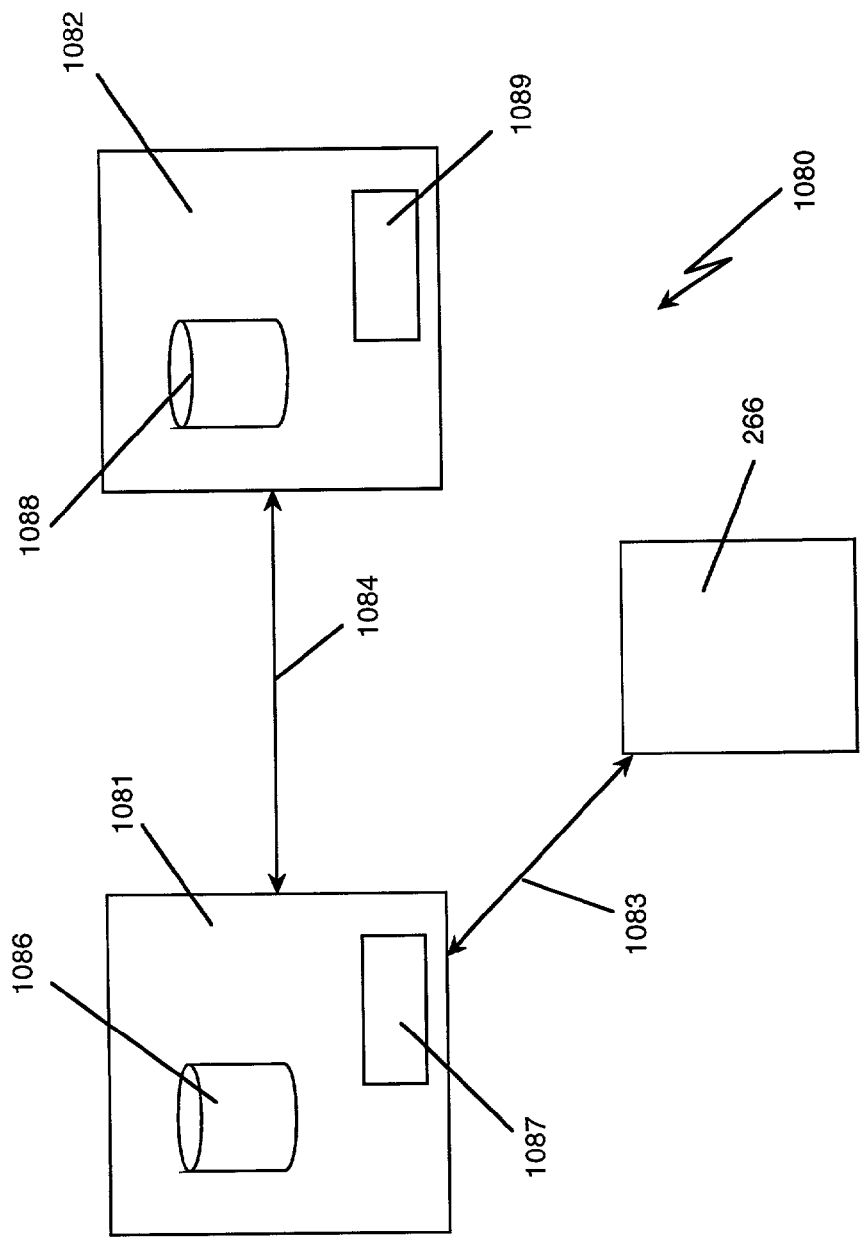
FIGS. 23a and 23b are block diagrams of alternate virtual book-on-demand systems.

FIG. 23a shown an embodiment of an electronic book delivery system 1080 that can provide electronic books in a virtual on-demand manner. The viewer 266 communicates using communication path 1083 with an auxiliary module 1081. The auxiliary module 1081 includes an auxiliary memory 1086 and an auxiliary interface/processor 1087. The auxiliary module 1081 communicates with a main module 1082 using communication path 1084. The main module 1082 includes a main memory 1088 and a main interface/processor 1089. The auxiliary module 1081 may provide "Auxiliary Sections," or "First Sections," of electronic books to the viewer 266 using the communications path 1083. The auxiliary section of the electronic book may be the first chapter of the electronic book, for example. The auxiliary module 1081 may provide the auxiliary sections to the viewer 266 upon a request from the viewer 266 transmitted over the communication path 1083. Alternately, the auxiliary module 1081 may broadcast selected auxiliary sections of electronic books using the auxiliary interface/processor 1087 and the communications path 1083. The auxiliary module 1081 may also receive requests from the viewer 266 for one or more specific main sections of electronic books. The main sections of the electronic books may correspond to auxiliary sections of electronic books already received by the viewer 266. Alternately, the main sections of the electronic books may be selected from a menu provided to the viewer 266 by the auxiliary module 1081.

Upon receiving a request for a main section of an electronic book, the auxiliary module 1081 communicates with the main module 1082 using the communication path 1084. The main sections of the electronic books are stored in the main memory 1088. The main interface/processor 1089 receives the request for the main section, retrieves the main section from the main memory 1088 and sends the main section to the auxiliary module 1081. The auxiliary interface/processor 1087 then transmits the requested main section to the viewer 266. As shown in FIG. 23*a*, the auxiliary module 1081 and the main module 1082 may be separate components of the electronic book delivery system 1080. However, the auxiliary module 1081 and the main module 1082 may be co-located. Additionally, the auxiliary memory 1086 and the main memory 1088 may also be co-located in the same memory device.

The communication path 1084 and the communication path 1083 may be any communication path capable of transmitting electronic book content. For example, the communication path 1083 may be a telecommunications path such as a telephone network, a wireless telephone network, a satellite television network, a cable television network, a broadcast television network or a local area network. The communication path 1084 may be configured in a manner similar to that of the communication path 1083. The auxiliary module 1081 or the main module 1082 may be located at a bookstore or a newsstand. For example, the auxiliary module 1081 and the main module 1082 may be accessed using a kiosk located at a bookstore. The auxiliary module and the main module may also be accessed by accessing an Internet web site such as the Internet web site 279. The auxiliary module and the main module may be part of a university library system or a community library system, for example.

Figure 23B:
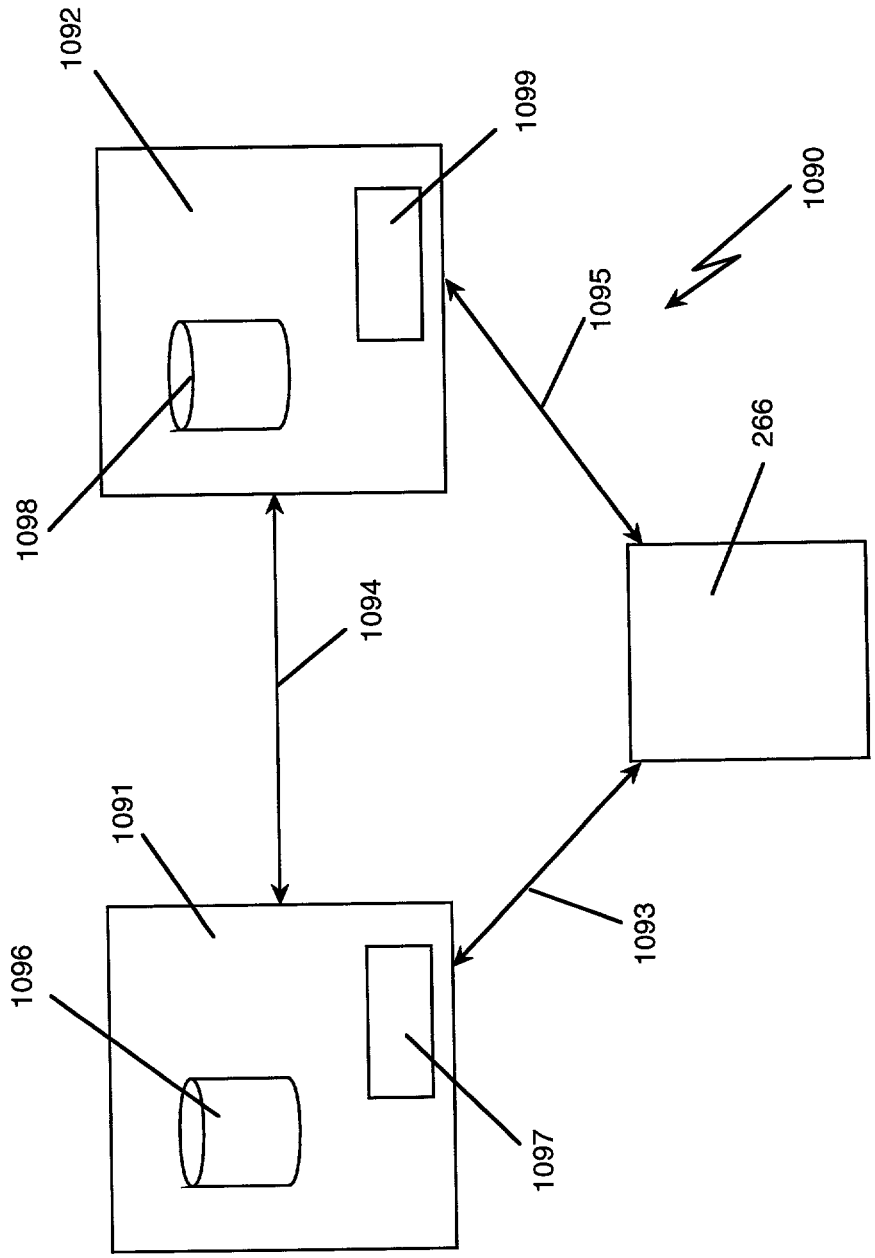

FIG. 23*b* shown an alternate arrangement for an electronic book delivery system 1090 providing virtual book-on-demand services. The system 1090 includes the viewer 266 that communicates with an auxiliary module 1091 using the communication path 1093. The auxiliary module includes an auxiliary memory 1096 and an auxiliary interface/processor 1097. The auxiliary module 1091 communicates with a main module 1092 using the communication path 1094. The main module 1092 includes a main memory 1098 and a main interface/processor 1099. The viewer 266 also communicates with the main module using the communication path 1095.

In the system 1090 shown in FIG. 23*b*, main sections of electronic books may be stored in the main memory 1098 and auxiliary sections stored in the auxiliary memory 1096. The auxiliary module 1091 may provide auxiliary sections, or first sections, of electronic books to the viewer 266. For example, the auxiliary interface/processor may broadcast auxiliary sections of selected electronic book to the viewer 266. The auxiliary sections may be broadcast on a periodic basis, such as monthly, for example. The viewer 266 may store the auxiliary sections for a selected time period and a requester or subscriber, may view the auxiliary sections without incurring a charge. If the subscriber using the viewer 266 decides to request a specific main section corresponding to one of the received auxiliary sections, the viewer 266 may be used to transmit a request to the auxiliary module 1091. Auxiliary module 1091 receives the request at the auxiliary interface/processor 1097 and transmits the request to the main module 1092. The main module 1092 receives the request at the main interface/processor 1099. The main interface/processor 1099 then retrieves the requested main section from the main memory 1098 and provides the requested main section to the viewer 266 using the communication path 1095. Alternately, the viewer 266 can communicate a request for a main section to the main module 1092 using the communication path 1095.

As shown in FIG. 23*b*, the auxiliary module 1091 and the main module 1092 may be separate units. Alternately, the auxiliary module 1091 and the main module 1092 may be co-located. In addition, the auxiliary memory 1096 and the main memory 1098 may be subcomponents of a overall memory unit. Furthermore, the auxiliary interface/processor 1097 and the main interface/processor 1099 may be subcomponents of a main interface/processor. In an embodiment, the main module may be located in a kiosk at a bookstore or newsstand, for example. The auxiliary module may be located remotely from the book stores, such as at an operations center or television delivery system or may be accessed through an Internet web site, for example. The main module 1092 may alternately be located at a library, such as a university library or a community library. Alternately, the main module 1092 may be accessed through a telecommunications network such as a wired telephone network, a wireless telephone network, a television network, an Internet web site, a local area network and any other telecommunications network capable of transmitting electronic book content.

Figure 24A:
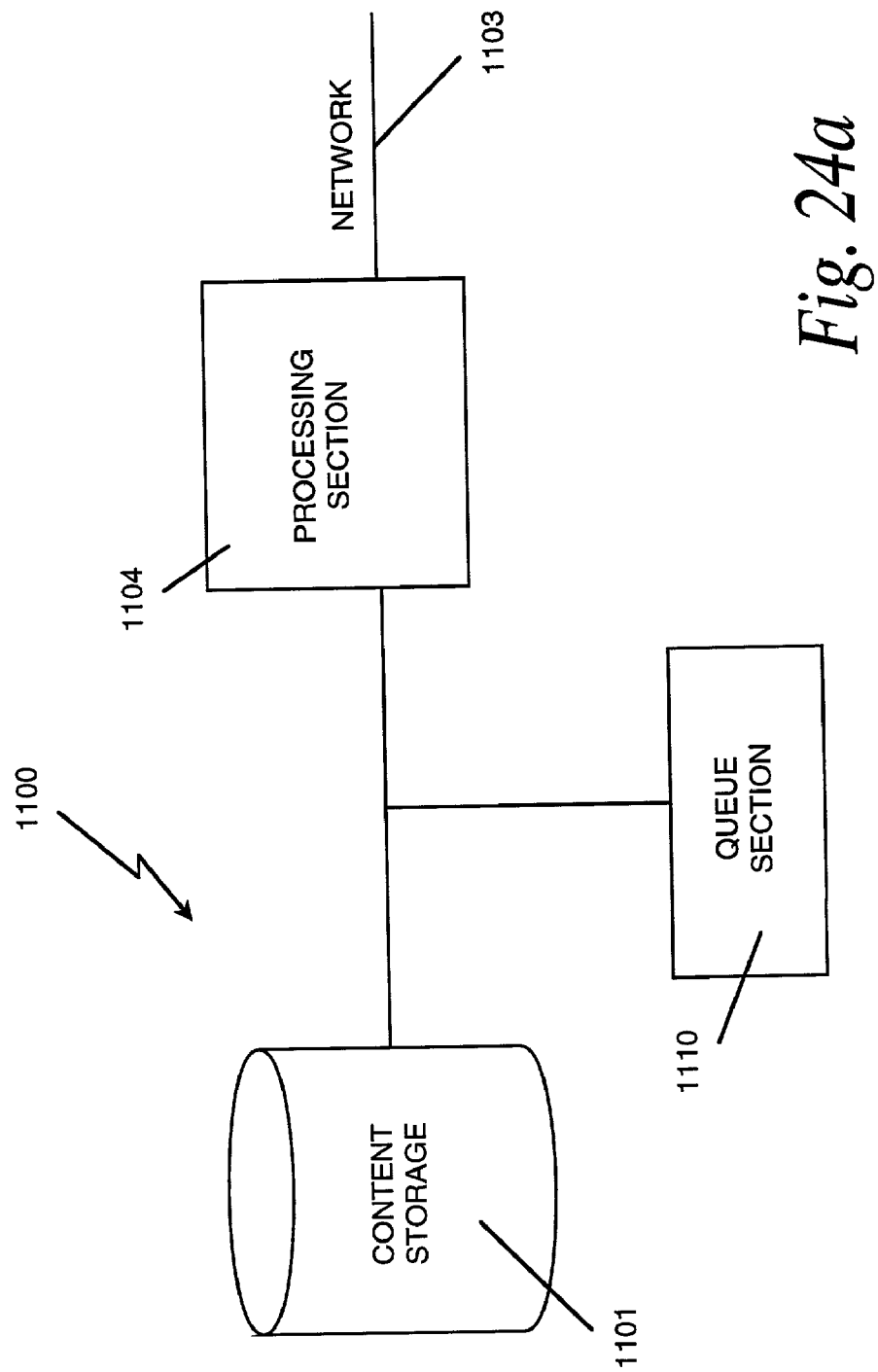
FIGS. 24a and 24b are block diagrams of another virtual book-on-demand system.

FIG. 24*a* shows another VBOD delivery system 1100 used to queue and prioritize content elements, or electronic books, for transmission from a storage repository to terminals such as the home systems 258, libraries 254, and electronic bookstores 252 shown in FIG. 19*b*. The VBOD delivery system 1100 works for all transmission media and techniques disclosed in copending U.S. patent application Ser. No. 09/289,957, filed Apr. 13, 1999, entitled ELECTRONIC BOOK ALTERNATIVE DELIVERY SYSTEMS, the disclosure of which is hereby incorporated by reference. Content storage 1101 stores electronic books, magazines and newspapers, and other digital data. The content storage 1101 may store data on a digital storage media such as a hard disc, tape, optical disc and other storage media, for example. A queue section 1110 stores content for delivery to subscribers connected to a network 1103. A processor section 1104 controls access to the content storage 1101, processing of content in the queue section 1110, and delivery of the content to the subscribers. The processor section 1104 may monitor electronic book orders to determine if multiple electronic book orders are for a same electronic book. The processor section 1104 may then aggregate the multiple electronic book orders, and, using individual addressing, broadcast the electronic book to multiple subscribers.

Figure 24B:
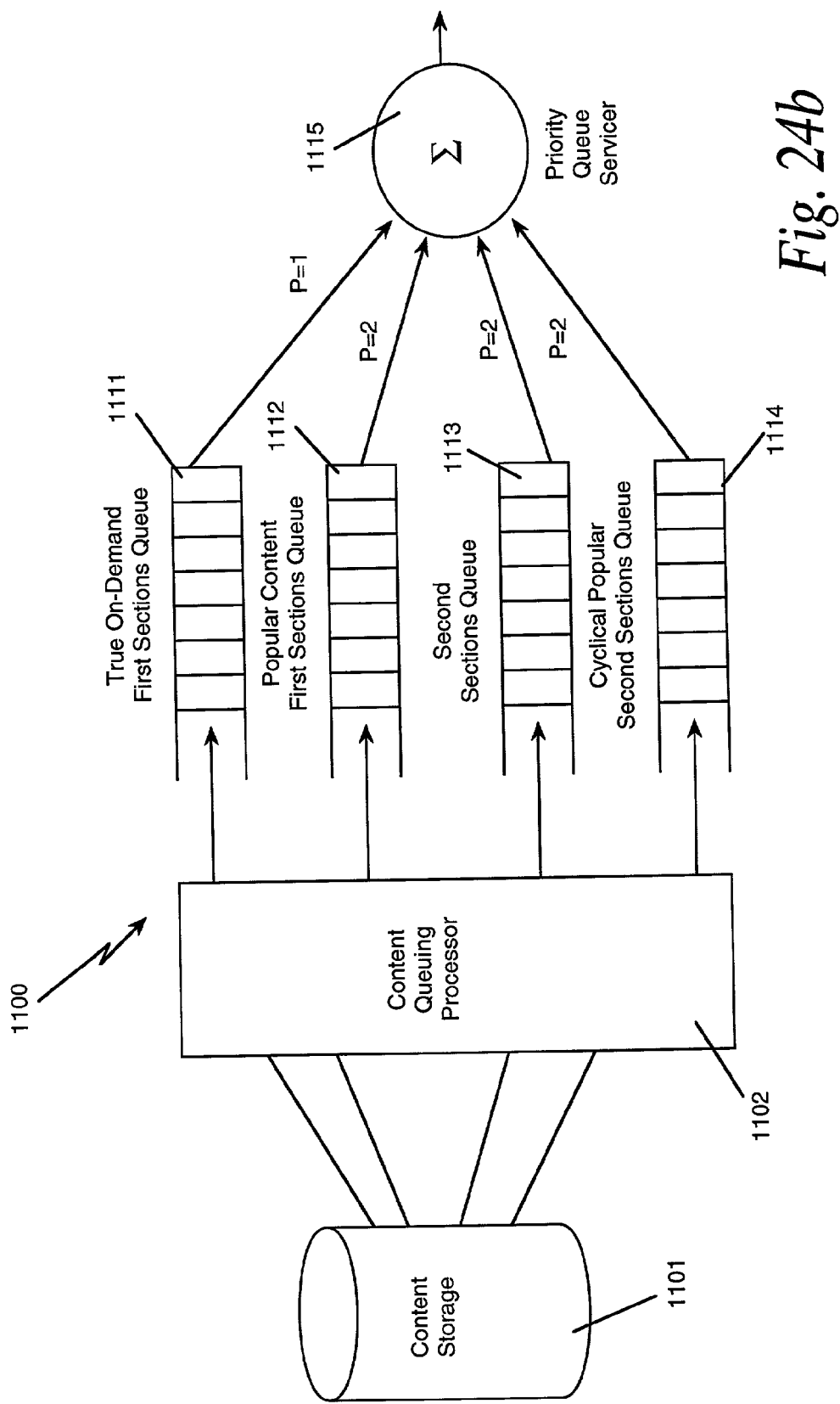

FIG. 24*b* shows the VBOD delivery system 1100 in more detail. The processor section 1104 includes a content queuing processor 1102 that selects and moves content to appropriate queues in the queue section 1110. In the example shown, there are four queues, one for each of four types of content:

true on-demand first sections queue 1111,
popular content first sections queue 1112,
true on-demand second sections queue 1113, and
popular content second sections queue 1114.

The queues 1111-1114 are serviced (i.e., selected for broadcast) by the priority queue server 1115 on a priority basis, where the true on-demand first sections queue 1111 has the highest priority and the three other queues 1112-1114 have lower priority. In an implementation, the highest priority queue (i.e., the queue 1111) will always be serviced first if there are any elements in the queue 1111 (i.e., priority P=1). Also, in an implementation, the three remaining queues 1112, 1113 and 1114 are serviced in a round-robin fashion with equal priority P=2 among the three queues 1112-1114. In other implementations, more complex queue servicing algorithms may be employed. For example, the length of each queue may be taken into account in determining priority rather than just the priority of the queue. Similarly, one implementation may combine the three lower-priority queues into a single queue, and the ordering of this single queue would be provided by the content queuing processor 1102 instead of the priority queue server 1115. A time element may be incorporated into the queue servicing algorithm such that a queue will be serviced if a content item has been stored in that queue for a specified maximum time. The specified maximum queue time may be chosen so that service time guarantees are met. In other words, if the system 1100 guarantees a content delivery time for certain content, then the appropriate queue may be service out of order so that the guaranteed content delivery time is met. Several other variations can be used to optimize the balance of performance of the system. For example, as noted above, additional server capacity from non-related activities may be used to bolster delivery capacity during peak demand periods.

Available storage in the viewer 266 and the library 262 will constantly be updated with the first sections of popular content titles and/or those content titles that are being specifically promoted by content suppliers and/or service providers. The goal is to ensure that any "empty" storage in the viewer 266 or the library 262 is filled with the first sections of content that is likely to be viewed by subscribers. More advanced approaches to filling this content and selecting the appropriate first sections can include algorithms based on "books viewed" data and content suggestion based on books viewed, geo-demographic data related to subscribers, and other schemes detailed in the related targeted advertising and content suggestion disclosures.

This invention can be applied to the virtual on-demand nature of any content form and any distribution medium. For example, the same invention applies to books, text, images, television, motion picture, multimedia and interactive content. It applies anywhere a balance of on-demand performance and infrastructure efficiency is desired.

In a broadcast model, electronic books, or electronic book first sections, may be queued in the queue 1112 for broadcast delivery to subscribers. For example, the first sections of the top ten New York Times best sellers are placed in the queue 1112 and are subsequently broadcast to all of the subscribers of the system 1100. Alternatively, the first sections are broadcast to a selected group of the subscribers of the system 1100. The selected group of subscribers may be determined by reference to gathered books read data, demographic data or subscribers preferences, for example.

The VBOD delivery system 1100 allows for electronic books to be broadcast to subscribers based on the use of subscriber data, electronic books data, and subscriber-entered data, such as mood indicators entered by the subscribers and used in an electronic book suggestion algorithm. Alternatively, input from subscribers collected through form-based questionnaires may be used to further define a subscriber's preferences. The system 1100 may optimize the electronic book delivery process by ensuring that specific electronic books are provided to the desired subscribers. One method uses electronic book targeting. For example, first sections of electronic books may be broadcast to a group of subscribers based on subscriber profile data. Specifically, electronic books, electronic magazines and periodicals, and electronic newspapers, or first sections of the same, can be sent to those subscribers most likely to buy the electronic content.

Figure 14K:
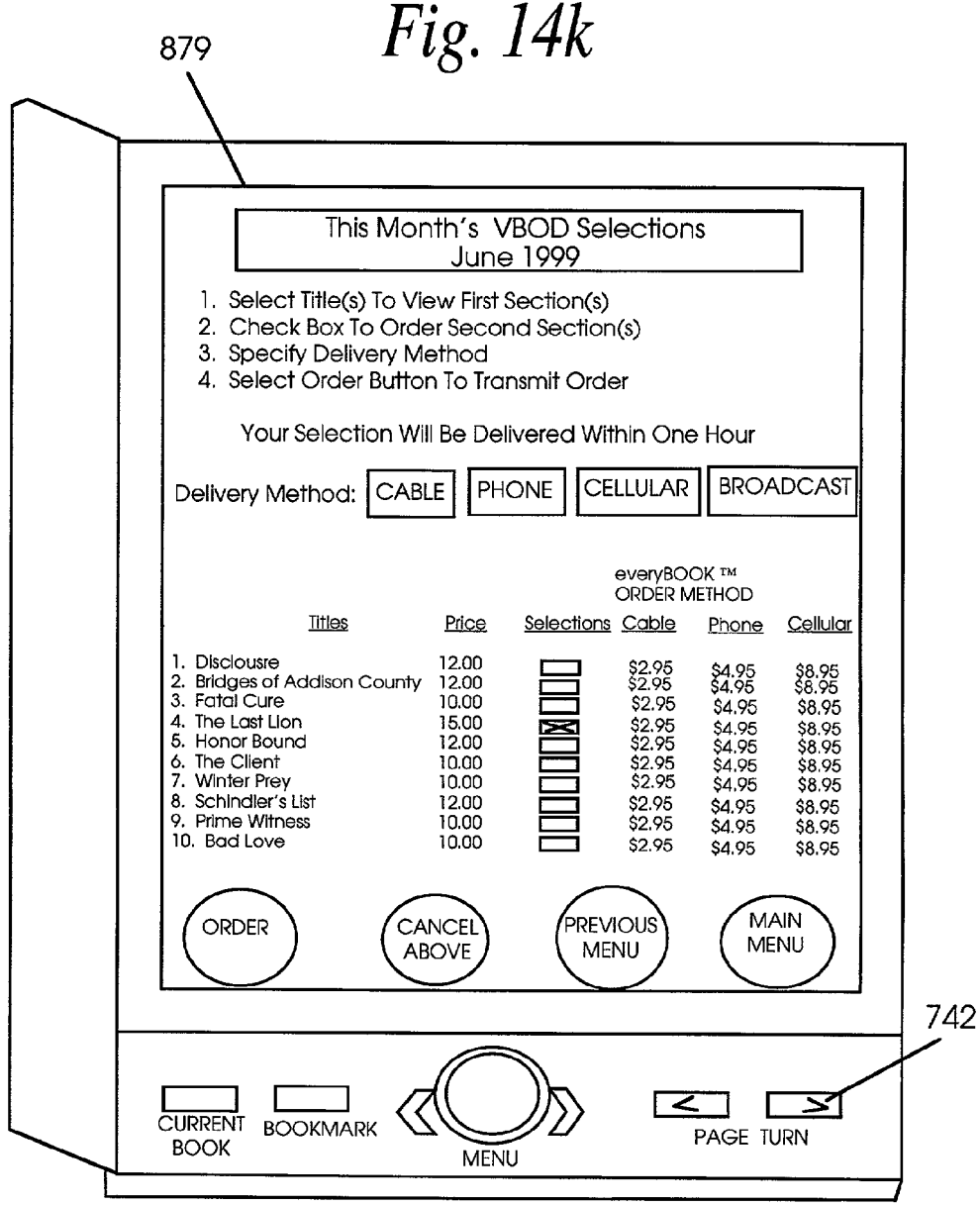

Electronic books and other electronic media can be broadcast in a variety of formats. First, a cyclical broadcast of the first sections may be accompanied by menu data that is used to generate a VBOD menu, based on templates residing on the library 262 on the viewer 266. Referring to FIG. 14*k*, a menu 879 may be in the form of a full screen textual, textual with audio background, graphical, graphical with audio background, or video image. To view, or read, a broadcast first section of an electronic book, the subscriber uses a remote control or other control feature to highlight a desired selection, and then operates a select button. Upon operation of the select button, a first page of the selected first section is displayed on the viewer 266. Subsequent pages are displayed when the next page button 742, for example, is used.

To order a second section of an electronic book, the subscriber returns to the main menu screen 879 and indicates a purchase option by selecting an appropriate box next to the desired selection. The electronic book order is then relayed to the system 1100 (see FIG. 24*b*), and the second section is processed for delivery to the subscriber. Alternatively, if the first section is read or is open for a specified time, or if a specified page or an electronic link in the first section is displayed, a request for a corresponding section or remaining section of the electronic book may be generated in the viewer 266. The request is then transmitted to the system 1100 automatically and immediately or may be transmitted the next time the viewer 266 is coupled to the system 1100. An order for a section may be indicated to the subscriber using a notice menu that informs the subscriber that an order has been placed. Alternatively, a confirmation menu may be used to prevent automatic ordering and to allow the subscriber to initiate the order. Finally, a book delivered menu may be displayed on the viewer 266 to indicate delivery of the second section. The book delivered menu may persist until acknowledged by the subscriber.

In a second format, the system 1100 may broadcast entire electronic books to subscribers. In this alternative arrangement, the entire electronic book could include a first section that could be viewed by the subscriber at no cost. A second section would then be available for viewing provided the subscriber executed an appropriate purchase option. For example, the subscriber could order one of the broadcasted electronic books. The system 1100 would then return a code or encryption key that would allow the subscriber to access the second portion of the electronic book. Such a code could be broadcast, or sent directly to the subscriber over a telephone network or cable television network, for example. Methods and systems for providing such a code are described in detail in copending U.S. application Ser. No. 09/289,952, filed Apr. 13, 1999, entitled ELECTRONIC BOOK ALTERNATIVE DELIVERY SYSTEMS, the disclosure of which are incorporated by reference.

Regardless of which format is used, after a specified or preset time, for example ten days, the first sections and the second sections that are stored in the home system 258, and that are not subsequently purchased by the subscriber, may be deleted from memory, thereby freeing storage space in the home system 258 for additional electronic book broadcasts. Alternatively, the first sections may be overwritten by more recently delivered first sections.

The second section queues 1113 and 1114 may contain only the second sections corresponding to the first sections in the first section queues 1111 and 1112, respectively. Alternatively, the second section queues 1113 and 1114 may contain the entire electronic book. In this embodiment, the content delivered from the second section queues 1113 or 1114 may overwrite the corresponding first sections stored in a viewer 266, for example.

The first sections described above may be a first portion of an electronic book, such as an introduction, table of contents (if provided), and a first chapter, for example. The first portion could also include critical reviews, book summaries, and other descriptive material including graphical display, JPEG images and MPEG 2 videos, for example. The first portions may include suggestions for additional reading and may include targeted advertisements. The targeted advertisements may include descriptions of additional available electronic books. Alternatively, the targeted advertisements may include advertisements that are unrelated to the electronic books, but which market surveys or other similar information indicate might appeal to specific subscribers or to specific subscriber groups. Finally, the first sections may contain electronic links to related content or to corresponding second or remaining sections of electronic books as described in Section VIII below.

Figure 25:
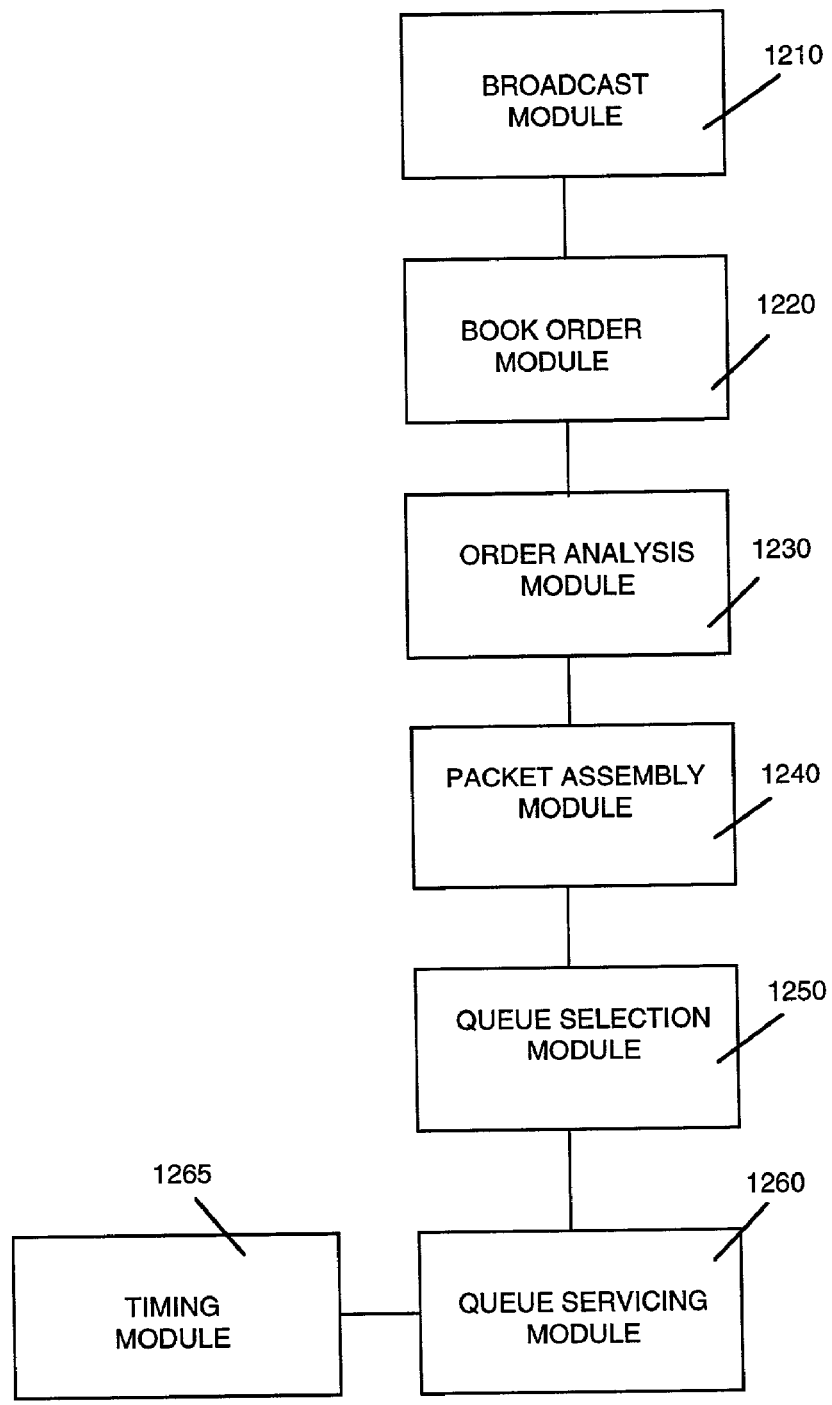
FIG. 25 is a block diagram of the processing performed by the system of FIG. 24b.

FIG. 25 is a flowchart illustrating some of the processing routines that may be used with the electronic book delivery system 1100 of FIG. 2*b*. The flowchart illustrates operation of the system 1100 having the queues 1111-1114, with the queue 1111 serviced first and the queues 1112-1114 serviced on a round robin basis. The processing routines consist of software modules, firmware and hardware operating on, or in conjunction with the processors 1104 of the electronic book delivery system 1100, and the processor 621 of the viewer 266, for example. The process begins with broadcast module 1210 operating on the processors 1104. Content, in the form of one or more electronic books, is broadcast to specific subscribers of the system 1100. The electronic books could be electronic counterparts of books, magazines, newspapers, or any other printed medium. The content may include text, graphics, images, both JPEG and MPEG 2, data, graphs, and any other information that could be presented in an interactive viewing medium. The content may also include audio files, including a complete audio version of a book, for example. Different subscribers may receive different electronic books. For example, a first subscriber may receive an electronic version of the New York Times every day, while a second subscriber may receive popular fiction books on a periodic basis, such as monthly. The broadcast may also include any encryption/decryption devices needed to protect the electronic books while letting authorized subscribers access the electronic books. In an example, a selection of new mystery books is shipped, or transmitted, to the second subscriber every month and a selection of new history books is transmitted to a third subscriber every month. The second and third subscribers then store the transmitted electronic books in the home system 258 until the first and the second subscribers desire to access one or more of the electronic books. After a specified time without initial access, the electronic books may be automatically deleted from memory or may be overwritten.

In an alternative arrangement, to provide a near on-demand electronic book service, the system 1100 could broadcast only first sections of the mystery books and first sections of the history books to the second and the third subscribers, respectively.

In book order module 1220, the system 1100 has received an electronic book order from a subscriber or a link from the subscriber corresponding to an order. The order may be for a complete electronic book, or may be for a second section of a book already sent to a subscriber. The electronic book order will include an identity of the subscriber requesting the second section or the complete electronic book. The processor 1102 then uses order analysis module 1230 to determine the type and identity of the ordered electronic book. For example, the processor 1102 determines if the electronic book is for a second section of a book already transmitted to the subscriber. The type and identity of the ordered electronic book determine in which queue of the system 1100 the electronic book is to be placed. For example, if the electronic book order is for a second section of a popular book, the processor 1102 determines to place the second section in the popular content second sections queue 1114. In response to the electronic book order, the processor 1102, executing packet assembly module 1240 will assemble a data packet including the electronic book content, targeted advertisements and header information that may include the electronic address of the subscriber who originated the electronic book order and appropriate decryption and access codes, for example. The processor 1102 will then execute a routine using a queue selection module 1250 that causes the data packet to be placed in the appropriate queue. In the example described above, the data packet is placed in the popular content second sections queue 1114.

In queue servicing module 1260, the priority queue server 1115 determines if any of the queues 1111-1114 is currently storing any content for delivery. If the queue 1111 includes at least one electronic book, the server 1115 will service the queue 1111 to send the corresponding data packet to the appropriate subscriber. If any of the queues 1112-1114 include at least one electronic book, the server 1115 will next service that queue. The servicing will be in a round robin fashion. For example, if the queue 1111 includes one electronic book and the queues 1112-1114 each include two electronic books, the server 1115 will first send the electronic book in the queue 1111 to the subscriber who ordered it. The server 1115 will then send an electronic book from the queues 1112, the queue 1113 and the queue 1114, in that order, for example, before starting over with the queue 1112. When all the queues are empty, and no other electronic book orders are in the system 1100, the processor 1102 ends the processing functions associated with near on-demand electronic book order and delivery.

The queue servicing module 1260 may include a timing module 1265. The timing module 1265 may monitor a length of a queue, or alternatively, an amount of time a packet resides in the queue. In either event, the timing module 1265 may be used to signify that a data packet has resided in the queue longer than a desired time, that may be linked to a service guarantee. In this case, the data packet may be delivered out of the normal sequence. That is, the priority model may include an override function that advances the delivery of a particular data packet in order to meet service guarantees.

The priority queue server 1115 or another processor (not shown in FIG. 24*b*) in the system 1100 may monitor multiple requests for a same electronic book or for a same second or remaining section of an electronic book. The processor may then determine if any orders are for the same electronic book or the same second section, process all such orders at one time and, using broadcast distribution and addressing, the system 1100 could deliver the electronic books or the second sections to the multiple requesting subscribers.

VIII. Electronic Book Link System

Electronic book links allow the subscriber to use the electronic book viewer 266 to traverse pre-defined paths between content in their currently viewed electronic book to related information contained either elsewhere in the electronic book, elsewhere on the viewer 266, or external to the viewer 266, including in the library 262 or in a connected Internet web site. These links provide an organized and methodical method for the subscriber to quickly access related topic areas or seek clarification of the currently viewed material.

An electronic book includes first locations, or components, such as words, phrases, sentences, sections of text, paragraphs, pages, chapters, figures, drawings, maps, video clips, and audio clips. Links to second and subsequent locations, or components, contained in the same electronic document or in another related electronic document, file, or database can be associated with each of these first components. First components with underlying links can be highlighted and displayed on the viewer display 602 or on the connected television 259 or a personal computer 261 (see FIG. 2). First components that have underlying links associated with them may be identified by assigning them a unique identifier. The unique identifier can be a word or phrase, an alpha-numeric value, a coordinate point, or other unique identifier. In an embodiment, each such first location may be assigned an identifying index value.

Second components can include second sections, main sections, or remaining portions of electronic books that correspond to first sections or auxiliary sections delivered by a virtual book-on-demand system such as the system 1100 shown in FIG. 24*b*. A link in the first section of the electronic book links to the second component, or second section of the electronic book. Accessing the link may cause an electronic book order to be placed with the system 1100 and the content to be delivered automatically or upon request.

The use of the index value allows the first components to maintain links with other components, even if the electronic book is altered. For example, a subscriber may use a cut and paste edit feature to move a block of text containing a first component. Cutting and pasting will not affect the status of the first component and its links to other components. Similarly, changing font style or font size will not affect the status of the links.

In the creation of an electronic book, or subsequently, the electronic book may undergo a process that maps identifying index values to each of the first components. These index values can then be accessed by software directives that drive the presentation of alternative or linked material (e.g., material at one of the second locations) once a selection is made. For each electronic book, these index values may be contained in a hidden table that maps the identifying index values of all first components with underlying links to the location of the linked material (the second location). Moreover, each such first component may be linked to one or many linked material locations. That is, the first component may be linked to a second component, a third component and so on. An example of a hidden table is presented below.

As shown in the table, a first location "Cezzanne" has an identifying index value 135. "Cezzanne" has three links. A link to a first location is to an art encyclopedia. A link to a second location is to an electronic dictionary that provides a pronunciation guide. A link to a third location is to an audio file that plays a short biography of the artist. Each of the first, second and third locations have their own index values.

| Identifying Index Value(s) | Component Identifier | Link Number | Linked Material Identifier | Linked Material Description | Linked Material Location (file location/file name/ corresponding index value) |
|---|---|---|---|---|---|
| 135 | "Cezzanne" | 1 | More on Cezzanne | Reference material on Cezzanne | Art-Encyclopedia.com/ FrenchArtists/Index Value = 1 |
| 135 | "Cezzanne" | 2 | Pronunciation | Pronunciation of the word | Websters.com/ Websters E-Dictionary/Index Value = 56221 |
| 135 | "Cezzanne" | 3 | Audio Clip | Audio file providing condensed Cezzanne's biography | Viewer/ Current file/Index Value = 199384 |
| 133-135 | "PorchScene by Cezzanne" | 1 | Graphic File | JPEG file presenting Cezzanne's PorchScene painting | Viewer/ Current file/Index Value = 9382 |
| 5673 | "reactivism" | 1 | Definition | Definition of the word | Websters.com/ Websters E-Dictionary/Index Value = 564 |
| 4948-4950 | "Order Little Women" menu item | 1 | Book Order | Order the book Little Women | Discovery.com/ Little Women Order/Index Value = 672 |
| 4949-4950 | "Little Women" | 1 | Book review | Review of the book "Little Women" | LiteraryWorks.com/ Little Women/Index Value = 1 |
| 90462 | "Dental diseases" | 1 | TOC link to Document Body | Link from Table of Contents to desired chapter | Viewer/ Current file/Index Value = 69980 |
| 1342 | "Dental diseases" | 2 | Related discussion group | Access to Web discussion group on gum diseases | NoMoreCavities.com/ Index Value = 1 |
| 572 | "VegieMaster" | 1 | Product Order | Order the product "VegieMaster" | HomePurchases.com/ KitchenProducts/Index Value = 1 |
| 14 | "Chesapeake" | 1 | Video | Video clip of interview with J. Michener on writing of Chesapeake | Viewer/ Current file/Index Value = 38677 |
| 14 | "Chesapeake" | 2 | Narration | Audio file - narration of Chesapeake by J. Michener | Viewer/ Current file/Index Value = 38678 |

Linked material location information (i.e., the location of second and subsequent components) can include source location, book name, chapter, page, line, and word as identified by their index value. The source location will provide the delivery system 200 the necessary information to contact the operations center 250, the Internet web site 279 (see FIG. 2) or another electronic database and request the appropriate material for retrieval and download if it currently does not reside on the viewer 266 or the home system 258. In the case that the linked material resides on the Internet web site 279 or on another electronic database, the location information in the hidden table allows the operations center 250 or home system 258 to retrieve the desired material from the Internet web site 279 or from the electronic database. Linking of a first section of an electronic book to a corresponding second or remaining section of the electronic book may initiate an electronic book order.

If the second component, or linked material, is located at the viewer 266, the processor in the viewer 266 can cause the linked material to be displayed without any communications with an outside source. For example, if the first component is the name "Cezzanne" and the linked material, or second location, is in an electronic dictionary stored in the viewer 266, the viewer 266 can display the electronic dictionary entry for "Cezzanne." This linked material may be displayed full screen, in a picture-in-picture window, or as an overlay, for example. The entry can also remain hidden, until a subscriber of the viewer 266 commands the entry to be displayed.

Upon selection of a component with underlying links, the software directive determines the identifying index values associated with the selected component, searches the table for the index values of the selection made, looks up the corresponding linked location, accesses the location, and displays the linked material on the viewer 266. The linked material can be displayed on the viewer 266 in place of the original source material, or simultaneously with the original source material by displaying the linked material in a picture-in-picture window, via a split screen, or via a screen overlay.

Figure 26:
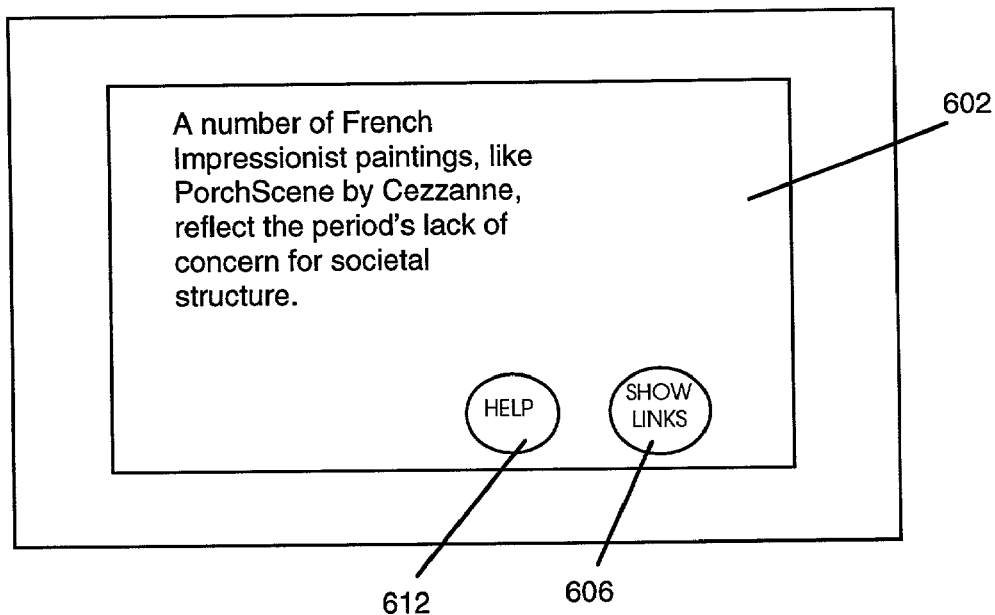
FIG. 26 is a schematic of a page of an electronic book having electronic links.

FIG. 26 shows a portion of a page of electronic text having one or more electronic links. The display 602 may include a show links button 606 and a help button 612. The show links button 606 may be used to display a link menu 971 (see FIG. 13 and FIG. 27). That is, the viewer 266 can be commanded, via the show links button 606, to display all components that have underlying links. The components may be displayed in a highlighted mode, in a different color, in a unique font, bold or italic typeface, underlined, outlined, or in reverse background mode, for example. To make a selection of a component to view the underlying linked material, the cursor 745 is used to identify the desired selected item. The ball 743 is used to guide the cursor 745 across the page to the desired selected item, and the selection button is used to make the selection. Alternatively, cursor movement for screen navigation can be provided via devices such as a fingerpad, mouse, or joystick. Selection can also be made by incorporating a touch-sensitive screen into the viewer 266.

Figure 27:
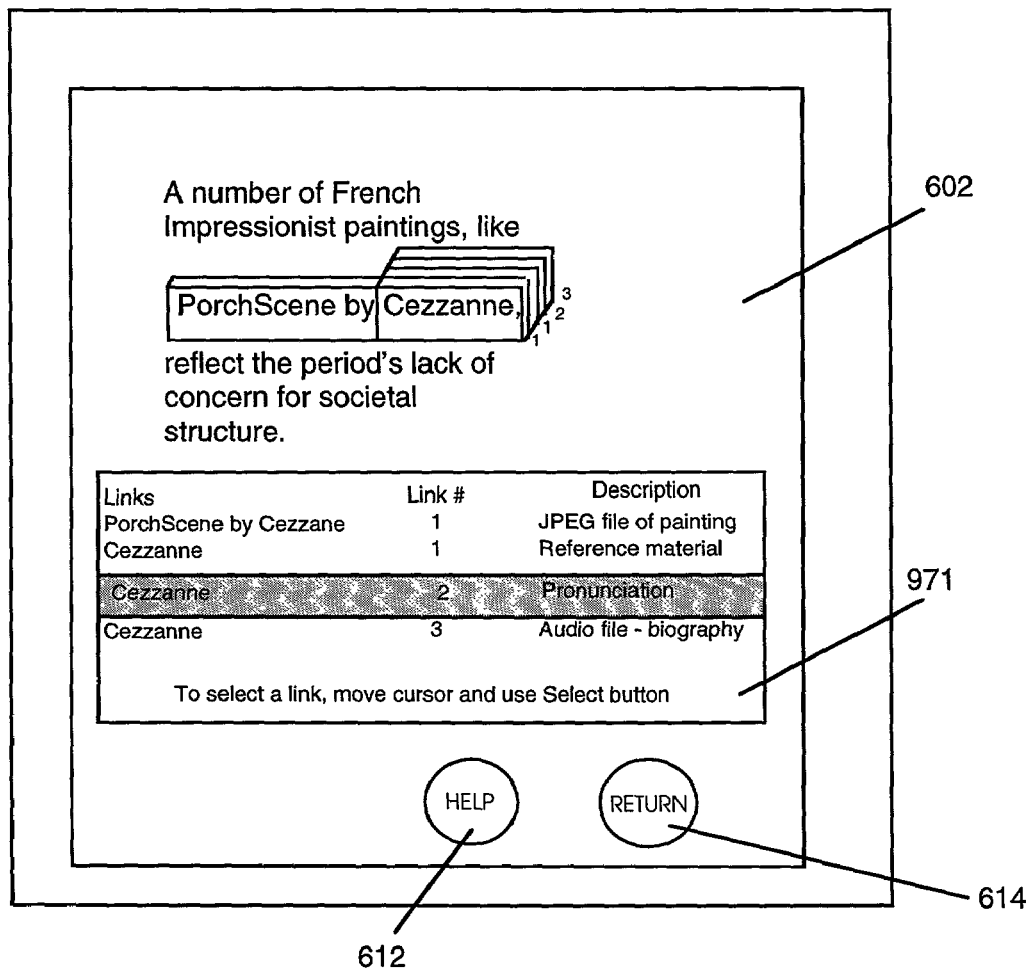
FIG. 27 is a schematic of a page of an electronic book with the electronic links shown.

FIG. 26 depicts the display before commanding the viewer 266 to show links. FIG. 27 shows the display once the request has been made to display all underlying links. FIG. 27 shows the link menu 971, a help button 612, and a multi-function button, or pull-down menu, 614. The multi-function button 614 can be used as a return button, a hide active links button, and a restore active links button, for example. Alternately, several additional buttons may be provided to select these features. The multi-function button 614 may be active when the show links button 606 has been operated. In FIG. 27, the components having underlying links are "PorchScene by Cezzanne" and "Cezzanne." The component "PorchScene by Cezzanne" is shown with one link and the component "Cezzanne" is shown with three links. Also shown in FIG. 27 is the link menu 971 that lists the links, or components, the link number and a description of the linked material. For example, the material linked to the component "PorchScene by Cezzanne" is a JPEG video file showing the painting.

Once a link is selected, an on-screen return button 614 allows the subscriber to return from the linked material back to the originally viewed text. The show links button 606 (see FIG. 26) can be displayed on the viewer 266 either at all times that an electronic book is open, any time an underlying link exists, or only when commanded to do so from the viewer's menu system 851.

When linked material is displayed (for example, in an overlay fashion) the subscriber can command the linked material to be placed in a hidden state by operating the hide active link button 614 or by use of the menu system 851. When an active link is hidden, the restore active link button 614 is displayed. Operation of the restore active link button 614 will display the material linked by the active link.

Figure 28:
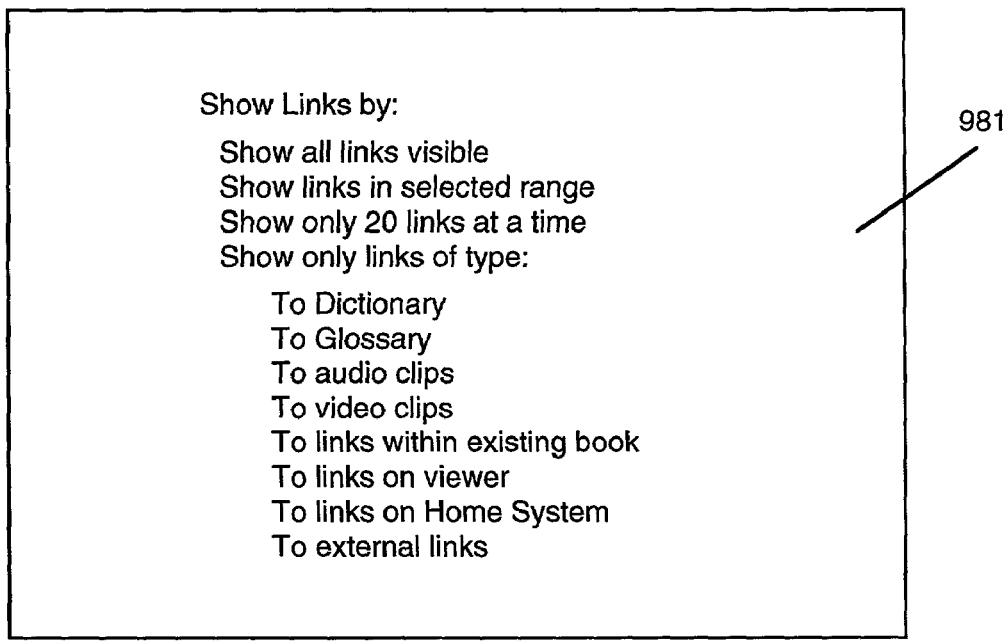
FIG. 28 is a schematic of a show links submenu.

Alternatively, the on screen "Help" menu 887 (see FIG. 13) provides access to further assistance when selecting links. The Help menu 887 is accessed by operation of the on-screen help button 612. Related link options will be available for display on the viewer 266 by selecting the Help menu 887, using the cursor 745 to do so. The "Help" function allows the subscriber to select which specific links to be displayed on-screen. The links when displayed may be simply highlighted portions of text, or text in different colors. All links for the displayed page can be selected to be displayed. Alternatively, by selecting a range of content in an electronic book that may have multiple underlying links, only links associated with the components within the selected range will be presented on the viewer 266 for the subscriber to select the specific link desired. Alternatively, a fixed number of links may be selected to be displayed on the screen at a time. Alternatively, only a certain type of link may be selected to be displayed. The types of links that are available for display may be listed in a pop-up menu. The subscriber can choose from this pop-up menu which of the links to display. For example, the pop-up menu could list links for a dictionary and links to an Internet web site. The subscriber could choose to display only the dictionary links. FIG. 28 depicts the menu screen 981 used to manage the subscriber's filtering of links to view.

Figure 29:
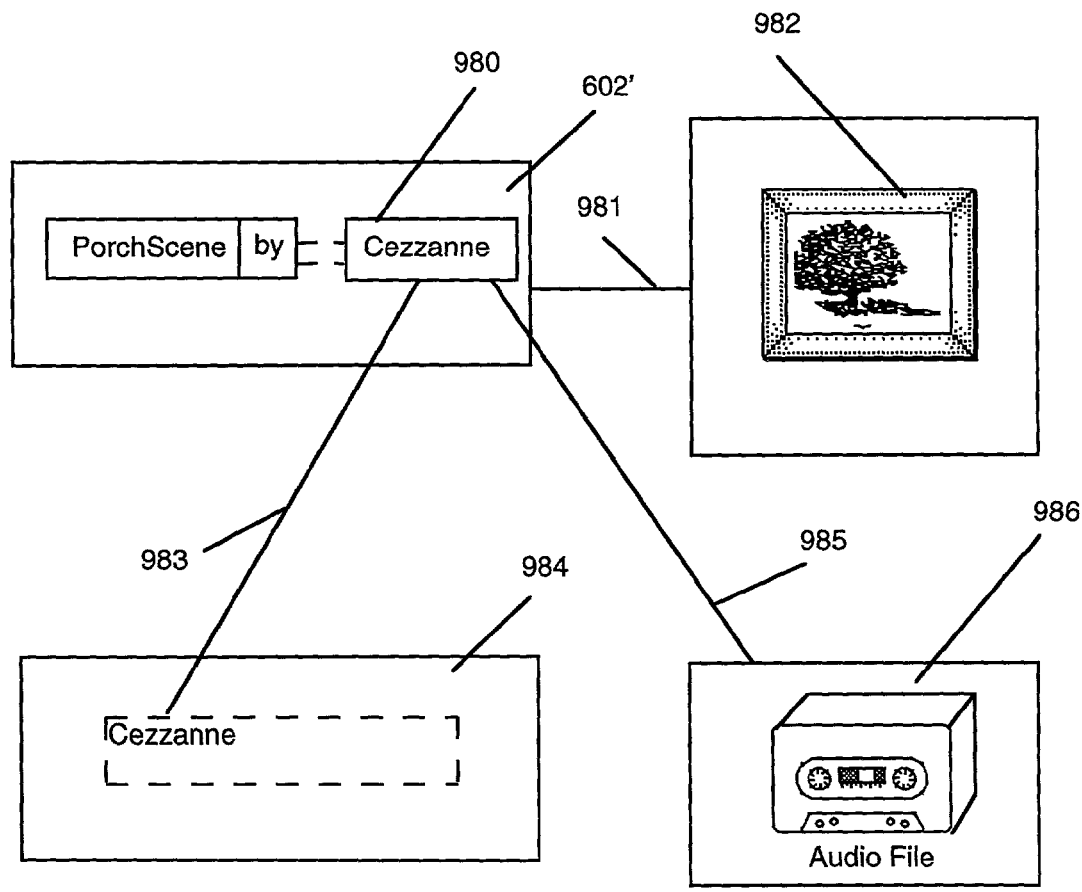
FIG. 29 is an example of links in an electronic book.

FIG. 28 is a logical representation of the components and links for the example first component "Cezzanne" shown in FIG. 26. In FIG. 29, the text block (page) 602' containing the first component Cezzanne 980 is shown linked to components in other electronic files or documents. A first link 981 links Cezzanne 980 to a reference material component 982, which is an encyclopedic entry related to the artist. A second link 983 links Cezzanne 980 to a dictionary entry 984 that includes a pronunciation key for the artist's name. A third link 985 links Cezzanne 980 to an audio clip 986, which provides an audio file describing the artist's life. If the subscriber chooses the audio clip 986, the audio file will immediately begin playing and will be broadcast on a speaker in the viewer 266, or the attached television or the attached personal computer, as applicable. The subscriber can stop the playback by operating the hide active link button 614.

The links described above may also function in two directions. A biography of Cezzanne could include a link to the JPEG file showing PorchScene. The JPEG file PorchScene could be one of several still videos of the artist's work. This JPEG file could be linked to an appropriate section of the Cezznne biography. Then, if the subscriber were viewing the JPEG file for PorchScene, the subscriber could display the link to the biography and, upon activating the link, have displayed that portion of the biography that discusses Porch-Scene. In this example, the same link is used to display either the JPEG file or text from the biography. The same hidden table can be used with the two electronic files (i.e., the biography and the JPEG file). Alternately, each electronic file may have its own hidden table. In this alternative, the same link may be referenced in each of the hidden tables.

In the discussion above, each first component is linked to one or more other components. However, the other components (i.e., the second and third components, for example) may also be linked together. In addition, other components linked to one first component may be crossed-linked to other components that are linked to a second first component (identifying secondary or tertiary cross-links). For example, the JPEG file of PorchScene referred to in FIG. 27 may be cross-linked to the audio file-biography shown in FIG. 27. Displaying the JPEG file will result in a cross-link being identified that links the JPEG file to the audio file.

The cross-link may be indicated by highlighting, underlining, outlining, using a bold or an italics typeface, using a different font, and using different color text. If the cross-linked material is selected, that material will then be displayed. In the example described above, the JPEG video file that shows the painting PorchScene can be cross-linked with Cezzanne and its identity would be displayed on the viewer 266. The video file could be displayed full screen or in a picture-in-picture format. The video file could also be displayed on the attached television 259 or the personal computer 261 (see FIG. 2). Finally, the video file could be printed by sending the video data and a print command to a printer 262 attached to the home unit 258 or to the personal computer 261.

In the table previously shown, all the links for a number of electronic books were provided in one hidden table. In an alternate arrangement, many hidden tables may be provided. For example, each electronic book may be provided with a hidden table. In this alternative, the many hidden tables could form a relational database of linked material. As an example, several different electronic medical text books could each be provided with its own hidden table. An electronic general medical encyclopedia could also be provided with a hidden table. Terms that are listed in one of the several medical electronic text books could then be linked, in a relational fashion to the electronic medical encyclopedia. The several electronic medical text books could also be relationally linked to each other, to on-line databases and to other electronic files. For example, an electronic medical text book could be electronically linked to electronic books, databases and other electronic files maintained at a medical school's library.

The hidden table (either for many electronic books, or individually for each electronic book) may be provided by the central provider or distributor as an additional feature that is paid for separately from purchasing an electronic book. The distributor may offer many different levels of service, such as only linking material (components) stored on a viewer, only linking material within a particular electronic book, or linking one or more electronic books to electronic files outside the home system 258 (e.g., linking an electronic book to a database maintained by the distributor at an Internet web site).

Downloading the most current links table for an electronic book from the operations center 250 or the Internet web site 279 refreshes the hidden links table, that is, any new links that have been generated by the operations center 250, for example, are added to the hidden links table. The current links table may be downloaded in conjunction with downloading a new electronic book. Alternately, the current links table may be provided periodically by the operations center 250.

Subscribers can create their own links by adding new entries to the hidden links table, using Hypertext Markup Language (HTML) or other standard programming language or by using a simple graphical subscriber interface, for example. In an embodiment, an on-screen, software-based, menu-driven facility is provided, accessible through the menu system 851 (see FIG. 13), that allows the subscriber to select the desired source components to define an underlying link, to select the desired linked components and define their location, and to create the remaining table entries. Creation of table entries can be supported via either an on-screen, simulated keyboard, the attached keyboard 267, or the remote keyboard 268 (see FIG. 6*a*). To ease creation of links, default table entry items may be offered to the subscriber by the menu system 851 where ever possible. The desired linked components can be accessed and displayed simultaneously with the desired source components via the use of a picture-in-picture window, via a split screen, or via a screen overlay. Alternatively, if the material to be linked is to be created by the subscriber, the subscriber can create a new content file on the viewer 266 and link directly to components in that newly created file. This allows the subscriber to create customized annotations and notes that are directly associated with the specific components of an electronic book. Text entry into the newly created file is handled via either the on-screen, simulated keyboard, the attached keyboard 267, or the remote keyboard 268.

As noted above, links within electronic books may be self-contained in nature, where all the material to be linked to is resident within the same electronic book file. Additionally, links may also be provided between material residing on the viewer 266. Also, links may be provided to material that currently resides on the home system 258, if separate from the viewer 266. Finally, links may be provided to material that must be accessed through a communications network. For example, material that is ordered or must be downloaded from the operations center 250 or the Internet web site 279 may be linked to an electronic book or to a first section of the electronic book. On screen menus can also be supported on the viewer 266 in the form of electronic book files, serving as a book or product catalog or service catalog that allows the subscriber to link to the operations center 250 or the Internet web site 279 to order additional electronic books or products and services at any time by selecting the desired component from the text.

If the content that is to be linked to is currently not available on the electronic book viewer 266, the viewer 266 may prompt the subscriber to decide whether to: 1) retrieve the corresponding material immediately from the home system 258, the operations center 250, or the Internet web site 279; 2) wait until the next communication opportunity with the home system 258 or operations center 250 to retrieve the material; 3) commence direct outside communications with another communications system (e.g., a telephone in a PSTN); or 4) stop.

In one embodiment, the first components on the viewer 266 are a Table of Contents and List of Figures for a book. Making a selection from the Table of Contents and List of Figures automatically links to and displays the selected page within the electronic book file. In another embodiment, the first components on the viewer 266 may be an Index of an electronic book. Selecting the desired topic and associated page will cause that page to be displayed on the viewer 266. In yet another embodiment, the first component is a footnote or endnote. When the footnote is selected, the viewer 266 provides a display of material that further addresses the reference. In another embodiment, the first component is a word or phrase that has a further definition or clarification associated with it. By selecting the first component, the corresponding dictionary definition, foreign translation, or glossary entry will be displayed on the viewer 266. The dictionary definition or foreign translation may also be provided via an audio file. In this embodiment, electronic books can be bundled with other standard reference material or alternatively, stand-alone reference material like dictionaries or encyclopedias may be accessed from within multiple electronic book files.

In another embodiment, the first component is a reference to another electronic book altogether. By selecting the first component, the selected book is displayed on the viewer 266. In another embodiment, on-screen menu buttons will be displayed on the viewer screen 602 that allow for a quick link to the Table of Contents, Index, glossary, and other key electronic book sections by simply selecting the item on the viewer screen 602 with the cursor 745. In yet another embodiment, the selected first component links the subscriber to a book review or series of book reviews, providing additional information to assist in the decision of selecting a new electronic book. In another embodiment, the selected first component is a book title, chapter title, or text in the body of a book that is linked to an audio file that serves as an audio narration of the selection that is played on the viewer 266. In yet another embodiment, the selected first component links to a video file (JPEG or MPEG) that can be displayed on the viewer screen 602. Another embodiment is a first component that links to textual annotations and notes that have been created by the subscriber.

One embodiment includes first or subsequent components that are electronic book titles that, when selected, links the subscriber to the operations center 250 or the Internet web site 279 to allow for the ordering of the selected electronic book or sections of the electronic book. In a similar embodiment, the selected component consists of a product that, when selected, link the subscriber to the operations center 250 site or an Internet web site to allow for the ordering of the selected product. Lastly, in another embodiment, the selected component is a topic on which there is a link to an Internet-based discussion group that addresses the topic in more detail.

When a link is provided to link a word or phrase to a foreign language dictionary, the viewer 266 may display a foreign language selection feature. The subscriber may then indicate which language to use when activating the link. For example, an English word or phrase in the electronic book may be linked to a French, Spanish or German dictionary. The subscriber may specify which of these foreign language dictionaries to link to.

While this invention has been described in conjunction with the specific embodiment outlined above, it is evident that many alterations, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

The invention claimed is:

1. A virtual on-demand electronic book system, comprising:
    a main memory located at a local library that stores electronic books for delivery to electronic book viewers of subscribers in the system via at least one of an internet network, a cable telephone network, and a broadcasting network, wherein the electronic books are received from at least one remote provider, and each of the electronic book viewers of the subscribers includes a local memory;
    a queuing processor coupled to the main memory that receives electronic book orders from the subscribers and determines a queue location for an ordered electronic book, wherein each electronic book is divided into a plurality of sections;
    first queues that temporarily store first sections of electronic books; and
    second queues that temporarily store second sections of electronic books,
    wherein the electronic books include order-on-demand electronic books and predetermined popular electronic books selected based on one of a request rate and a promotion level, the order-on-demand electronic books are received from the at least one remote provider upon requests from the subscribers and the popular electronic books are pre-loaded into at least one of the main memory and the local memory of the electronic book viewers of the subscribers,
    wherein the first sections of electronic books are delivered to the subscribers without charge and the second sections of electronic books are delivered when an order for the electronic books is made by a subscriber,
    wherein the first sections of the electronic books stored in the local memory of the electronic book viewer are deleted if the second sections of the electronic books are not requested by the subscriber after a predetermined period of time,
    wherein the first queues further include a true on-demand first sections queue, a popular content first sections queue; and
    wherein the second queues further include a true on-demand second sections queue and a popular content second sections queue, in which the true on-demand first section queue has a highest priority,
    and wherein the virtual on-demand electronic book system further comprises a priority queue server coupled to the first and the second queues, wherein the priority queue server empties the first and the second queues based on a priority model.

2. The system of claim 1, wherein the priority model comprises instructions to
    empty the on-demand first section queue and the popular content first section queue, the on-demand second sections queue and the popular content second sections queue in a round robin manner.

3. The system of claim 1, wherein the priority model includes a timing module, wherein the timing module determines a time an electronic book is stored in the first and the second queues and wherein when a maximum time is exceeded, the priority queue server transmits the electronic book out of order.

4. The system of claim 1, wherein the priority model comprises instructions to
    determine a length of each queue; and
    transmit an electronic book from a queue having a longest length.

5. The system of claim 1, wherein the priority model comprises instructions to
    search queues for electronic book orders of a same electronic book or a same section of the ordered electronic book; and
    broadcast completed electronic book orders simultaneously to the subscribers in the system.

6. The system of claim 1, further comprising:
an Internet web site;
a web server coupled to the Internet web site;
a delivery server coupled to the web server; and
a transaction server coupled to the web server, wherein the queuing processor receives electronic book orders from the transaction server and the delivery server receives ordered electronic books from the queue priority server.

7. The system of claim 1, further comprising:
a service time guarantee; and
a network coupling the processor to an associated data processing system, wherein the processor determines a pending service time, wherein if the pending service time exceeds the guarantee, the processor establishes a connection with the associated data processing system, and wherein the associated data processing system processes electronic book orders.

8. The system of claim 1, further comprising:
an electronic book viewer comprising:
  a receiver that receives electronic books,
  a transmitter that transmits electronic book orders, and
  a memory coupled to the receiver that stores the electronic books; and
  a processor coupled to the receiver and the memory that controls processing on the electronic book viewer, wherein the receiver receives broadcasts of first sections of electronic books and stores the first sections in the memory.

9. The system of claim 8, wherein when a first section stored in the memory is accessed, the processor generates an order for a corresponding second section, and the transmitter transmits the order.

10. The system of claim 8, wherein a first section of the electronic book includes a link, wherein when the link is accessed, the processor generates an order for a corresponding second section of the electronic book.

11. The system of claim 1, wherein the electronic books comprise an electronic version of one or more of a printed book, a magazine, a catalog, a periodical and a newspaper.

12. The system of claim 1, wherein specified electronic books are broadcast on a cyclical basis.

13. The system of claim 1, wherein first sections of specified electronic books are broadcast on a cyclical basis.

14. The system of claim 13, wherein the first sections to be broadcast are determined by reference to one of electronic books read data, demographic data, and subscriber preferences.

15. The system of claim 1, further comprising a virtual on-demand menu, the virtual on-demand menu broadcast with a broadcast of one of an electronic book and a first section of an electronic book, wherein the virtual on-demand menu lists electronic books available on the virtual on-demand electronic book system.

* * * * *